US009072094B2

(12) United States Patent
Das et al.

(10) Patent No.: US 9,072,094 B2
(45) Date of Patent: *Jun. 30, 2015

(54) SUPPORT FOR SIGNALING OVER FLEXIBLE BANDWIDTH CARRIER

(71) Applicant: QUALCOMM Incorporated, San Diego, CA (US)

(72) Inventors: Soumya Das, San Diego, CA (US); Roy Franklin Quick, Jr., San Diego, CA (US); Edwin C. Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 13/765,727

(22) Filed: Feb. 13, 2013

(65) Prior Publication Data

US 2014/0105187 A1     Apr. 17, 2014

Related U.S. Application Data

(60) Provisional application No. 61/714,096, filed on Oct. 15, 2012.

(51) Int. Cl.
| | |
|---|---|
| *H04L 12/28* | (2006.01) |
| *H04W 72/04* | (2009.01) |
| *H04L 5/00* | (2006.01) |
| *H04W 28/22* | (2009.01) |
| *H04W 28/06* | (2009.01) |
| *H04W 72/00* | (2009.01) |

(52) U.S. Cl.
CPC ......... *H04W 72/0446* (2013.01); *H04L 5/0053* (2013.01); *H04L 5/0064* (2013.01); *H04W 28/06* (2013.01); *H04W 28/22* (2013.01); *H04W 72/00* (2013.01)

(58) Field of Classification Search
None
See application file for complete search history.

(56) References Cited

U.S. PATENT DOCUMENTS

| 7,953,119 B2 | 5/2011 | Cho et al. |
|---|---|---|
| 8,213,367 B2 | 7/2012 | Papasakellariou |
| 2002/0147020 A1 | 10/2002 | Iguchi et al. |

(Continued)

FOREIGN PATENT DOCUMENTS

CN    102195864 A    9/2011

OTHER PUBLICATIONS

International Search Report and Written Opinion—PCT/US2013/065082—ISA/EPO—Jan. 27, 2014.

*Primary Examiner* — Bunjob Jaroenchonwanit
(74) *Attorney, Agent, or Firm* — Jeffrey D. Jacobs

(57) ABSTRACT

Methods, systems, and devices are provided that may support signaling, such as a Signaling Radio Bearer (SRB), over a flexible bandwidth carrier. For example, an SRB rate for a SRB over for a normal bandwidth carrier may be identified. A Transmission Time Interval (TTI) may be determined for the SRB over for the flexible bandwidth carrier that facilitates a SRB rate of the SRB over the flexible bandwidth carrier that maintains at least the SRB rate for the SRB over the normal bandwidth carrier. The determined TTI may be utilized for the SRB over the flexible bandwidth carrier, which may help avoid increased call setup delay, increased latency for handover, etc. that may be introduced in flexible bandwidth carrier systems. Some embodiments may include reducing spreading factors, increasing transmission power, and/or concatenating multiple transport blocks with respect to the SRB over the flexible bandwidth carrier.

60 Claims, 21 Drawing Sheets

(56) References Cited

U.S. PATENT DOCUMENTS

| | | | |
|---|---|---|---|
| 2003/0156580 A1* | 8/2003 | Abraham et al. | 370/389 |
| 2003/0223454 A1* | 12/2003 | Abraham et al. | 370/465 |
| 2008/0123836 A1* | 5/2008 | Flensted-Jensen et al. | 379/229 |
| 2008/0212693 A1* | 9/2008 | Razzell | 375/260 |
| 2011/0164620 A1 | 7/2011 | Jinno et al. | |
| 2011/0268071 A1 | 11/2011 | Siew et al. | |
| 2012/0021753 A1 | 1/2012 | Damnjanovic et al. | |
| 2012/0033554 A1 | 2/2012 | Shiva et al. | |
| 2013/0114473 A1* | 5/2013 | Awoniyi et al. | 370/280 |
| 2013/0114566 A1* | 5/2013 | Awoniyi et al. | 370/331 |
| 2013/0115967 A1* | 5/2013 | Soliman et al. | 455/452.1 |
| 2013/0115991 A1* | 5/2013 | Awoniyi et al. | 455/509 |
| 2013/0115994 A1* | 5/2013 | Awoniyi et al. | 455/517 |
| 2013/0121265 A1* | 5/2013 | Awoniyi et al. | 370/329 |
| 2013/0148520 A1* | 6/2013 | Das et al. | 370/252 |
| 2013/0148527 A1* | 6/2013 | Awiniyi et al. | 370/252 |
| 2013/0148576 A1* | 6/2013 | Huang et al. | 370/328 |
| 2013/0148579 A1* | 6/2013 | Das et al. | 370/328 |
| 2014/0105187 A1* | 4/2014 | Das et al. | 370/336 |
| 2014/0274091 A1* | 9/2014 | Das et al. | 455/452.1 |

* cited by examiner

← 600

Transport block

| MAC Header | RLC Header | RLC Payload |

Transport block with CRC

| MAC Header | RLC Header | RLC Payload | CRC |

Concatenation of Transport blocks with CRC

| MAC Header | RLC Header | RLC Payload | CRC |
| MAC Header | RLC Header | RLC Payload | CRC |

FIG. 6

Transport block

| MAC Header | RLC Header | RLC Payload |
|---|---|---|

Transport block with CRC

| MAC Header | RLC Header | RLC Payload | CRC |
|---|---|---|---|

Concatenation of Transport blocks with CRC

| MAC Header | RLC Header | RLC Payload | CRC |
|---|---|---|---|
| MAC Header | RLC Header | RLC Payload | CRC |
| MAC Header | RLC Header | RLC Payload | CRC |
| MAC Header | RLC Header | RLC Payload | CRC |

Transport block

| MAC Header | RLC Header | RLC Payload |
|---|---|---|

Transport block with CRC

| MAC Header | RLC Header | RLC Payload | CRC |
|---|---|---|---|

Concatenation of Transport blocks with CRC

| MAC Header | RLC Header | RLC Payload | CRC |
|---|---|---|---|
| MAC Header | RLC Header | RLC Payload | CRC |

FIG. 10

SUPPORT FOR SIGNALING OVER FLEXIBLE BANDWIDTH CARRIER

RELATED APPLICATIONS

The present Application for Patent claims priority to Provisional Application No. 61/714,096 entitled "SUPPORT FOR SIGNALING RADIO BEARER OVER FLEXIBLE BANDWIDTH CARRIER" filed Oct. 15, 2012, and assigned to the assignee hereof and hereby expressly incorporated by reference herein for all purposes.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiple of channel bandwidths, hence there may be unutilized parts of the spectrum. As the use of wireless devices has increased, the demand for and value of this spectrum has generally surged, as well. Nonetheless, in some cases, wireless communications systems may not utilize portions of the allocated spectrum because the portions are not big enough to fit a standard or normal waveform. The developers of the LTE standard, for example, recognized the problem and decided to support many different system bandwidths (e.g., 1.4, 3, 5, 10, 15 and 20 MHz). Another approach may be to utilize flexible bandwidth carrier systems that may involve wireless communications systems that utilize portions of spectrum that may not fit a normal waveform. However, utilizing flexible bandwidth may have different impacts including dilating slot duration, frame duration, sub frame duration, radio frame duration, and/or Transmission Time Interval, which may impact data rates and may introduce delay.

SUMMARY

Methods, systems, and devices are provided that support signaling over a flexible bandwidth carrier. Some embodiments address problems that may be introduced through the use of flexible bandwidth carrier systems, such as additional delay due to time scaling in the flexible bandwidth carrier system, which may result in reduced signaling rates with respect to a normal bandwidth carrier. Some embodiments provide tools and techniques to maintain signaling rates, for example, where a flexible bandwidth carrier system may typically result in a reduced signaling rate that may impact the delay in the signaling procedures as it increases transmission time of signaling messages over the air. These tools and techniques may be applicable to different signaling including, but not limited to, signaling radio bearers (SRBs), control channels, control messaging, broadcast channels, and/or broadcast messages in general. Furthermore, these methods, systems, and devices may also be utilized for some normal bandwidth carrier systems.

Methods, systems, and devices are provided for supporting signaling over a flexible bandwidth carrier. A signaling rate for signaling, such as an SRB, over a normal bandwidth carrier may be identified. A unit of time, such as a Transmission Time Interval (TTI), for signaling over the flexible bandwidth carrier may be identified to facilitate a signaling rate of the signaling over the flexible bandwidth carrier that maintains at least the signaling rate for the signaling over the normal bandwidth carrier or a fraction of the signaling rate for the signaling over the normal bandwidth carrier. The fraction of the signaling rate for the signaling over the normal bandwidth carrier may exceed a dilated rate based on a bandwidth scaling factor or chip rate divider for the flexible bandwidth carrier system. The determined unit of time may be utilized for the signaling over the flexible bandwidth carrier.

For example, methods, systems, and/or devices that support a SRB rate for a SRB over a flexible bandwidth carrier may include identifying a SRB rate for a SRB over a normal bandwidth carrier. A TTI may be determined for the SRB over the flexible bandwidth carrier that facilitates a SRB rate of the SRB over the flexible bandwidth carrier that maintains at least the SRB rate for the SRB over the normal bandwidth carrier or a fraction of the SRB over the normal bandwidth carrier. In some cases, a spreading factor of a physical channel carrying the SRB over the flexible bandwidth carrier may be utilized to help maintain the same SRB rate p. The determined TTI may be utilized for the SRB over the flexible bandwidth carrier, which may help avoid increased call setup delay, increased latency for handover, etc. that may be introduced in flexible bandwidth carrier systems. The determined TTI may be a valid TTI in the normal bandwidth carrier system and/or a valid TTI enumeration. The determined TTI may be for a transport channel to which the SRB over the flexible bandwidth carrier is mapped. Some embodiments may include increasing transmission power, and/or concatenating multiple transport blocks with respect to the SRB over the flexible bandwidth carrier. Similar techniques may be applied for control channels and/or broadcast channels in general.

Flexible bandwidth carrier systems may involve wireless communications systems that may utilize portions of spectrum that may not be big enough to fit a normal waveform utilizing flexible waveforms. A flexible bandwidth carrier system may be generated with respect to a normal bandwidth carrier system through dilating, or scaling down, the time or the chip rate of the flexible bandwidth carrier system with respect to the normal bandwidth carrier system. In some embodiments, a flexible bandwidth carrier system may be generated with respect to a normal bandwidth carrier system through dilating the frame lengths, or scaling down, the bandwidth of the flexible bandwidth carrier system with respect to the normal bandwidth carrier system. Some embodiments increase the bandwidth of a flexible waveform through expanding, or scaling up the time or the chip rate of the flexible bandwidth carrier system. Some embodiments increase the bandwidth of a flexible waveform through decreasing the frame lengths, or scaling up the bandwidth of the flexible bandwidth carrier system. Some embodiments may utilize a bandwidth scaling factor or a chip rate divider to facilitate a flexible bandwidth carrier system. The bandwidth scaling factor and the chip rate divider may be numerically equivalent to each other.

Some embodiments include a method for supporting signaling over a flexible bandwidth carrier. The method may include: identifying a signaling rate for signaling over a normal bandwidth carrier; determining a unit of time for signaling over the flexible bandwidth carrier to facilitate a signaling rate for the signaling over of the flexible bandwidth carrier that maintains at least the signaling rate for the signaling over the normal bandwidth carrier or a fraction of the signaling rate for the signaling over the normal bandwidth carrier; and/or utilizing the determined unit of time for the signaling over the flexible bandwidth carrier.

In some embodiments, the signaling over the normal bandwidth carrier includes a signaling radio bearer (SRB) over the normal bandwidth carrier, the signaling over the flexible bandwidth carrier includes an SRB over the flexible bandwidth carrier, the signaling rate for the signaling over the normal bandwidth carrier includes an SRB rate for the SRB over the normal bandwidth carrier, and/or the signaling rate for the signaling over the flexible bandwidth carrier includes an SRB rate for the SRB over the flexible bandwidth carrier. In some embodiments, the unit of time includes a Transmission Time Interval (TTI).

Some embodiments include determining the TTI for the SRB over the flexible bandwidth carrier to facilitate a SRB rate for the SRB over of the flexible bandwidth carrier that maintains at least the SRB rate for the SRB over the normal bandwidth carrier or a fraction of the signaling rate for the SRB over the normal bandwidth carrier that may include: identifying at least a bandwidth scaling factor for the flexible bandwidth carrier; and/or utilizing at least the bandwidth scaling factor to determine the TTI for the SRB over the flexible bandwidth carrier. Determining the TTI for the SRB over the flexible bandwidth carrier to facilitate a SRB rate for the SRB over of the flexible bandwidth carrier that maintains at least the SRB rate for the SRB over the normal bandwidth carrier or a fraction of the signaling rate for the SRB over the normal bandwidth carrier may include: identifying a TTI for the SRB over for the normal bandwidth carrier; and/or utilizing at least a bandwidth scaling factor associated with the flexible bandwidth carrier to determine the TTI for the SRB over the flexible bandwidth carrier based on the TTI for the SRB over the normal bandwidth carrier.

Some embodiments include reducing a spreading factor of a physical channel carrying the SRB over the flexible bandwidth carrier. Reducing the spreading factor of the physical channel carrying the SRB over the flexible bandwidth carrier may include dividing a normal spreading factor by a bandwidth scaling factor for the flexible bandwidth carrier, where the normal spreading factor includes a spreading factor of the physical channel carrying the SRB over the normal bandwidth carrier. Some embodiments include increasing a transmission power for the SRB over the flexible bandwidth carrier with respect to a normal bandwidth carrier system with a same power spectrum density. Increasing the transmission power may compensate for at least the reduced spreading factor.

In some embodiments, the bandwidth scaling factor for the flexible bandwidth carrier equals a chip rate divider for the flexible bandwidth carrier. The determined TTI may include a valid TTI with respect to a normal bandwidth carrier system.

Some embodiments include concatenating multiple transport blocks to facilitate maintaining the SRB rate for the SRB over the flexible bandwidth carrier. The multiple concatenated transport blocks may include two or more transport blocks from a same logical channel. The multiple concatenated transport blocks may include at least two transport blocks from different logical channels.

In some embodiments, the fraction of the signaling rate for the signaling over the normal bandwidth carrier exceeds a dilated rate based on a bandwidth scaling factor or chip rate divider for the flexible bandwidth carrier.

Some embodiments include a wireless communications system that may include: means for identifying a signaling rate for signaling over a normal bandwidth carrier; means for determining a unit of time for signaling over the flexible bandwidth carrier to facilitate a signaling rate for the signaling over of the flexible bandwidth carrier that maintains at least the signaling rate for the signaling over the normal bandwidth carrier or a fraction of the signaling rate for the signaling over the normal bandwidth carrier; and/or means for utilizing the determined unit of time for the signaling over the flexible bandwidth carrier.

In some embodiments of the system, the signaling over the normal bandwidth carrier includes a signaling radio bearer (SRB) over the normal bandwidth carrier, the signaling over the flexible bandwidth carrier includes an SRB over the flexible bandwidth carrier, the signaling rate for the signaling over the normal bandwidth carrier includes an SRB rate for the SRB over the normal bandwidth carrier, and/or the signaling rate for the signaling over the flexible bandwidth carrier includes an SRB rate for the SRB over the flexible bandwidth carrier. The unit of time may include a Transmission Time Interval (TTI).

Some embodiments include the means for determining the TTI for the SRB over the flexible bandwidth carrier to facilitate a SRB rate of the SRB over of the flexible bandwidth carrier that maintains at least the SRB rate for the SRB over the normal bandwidth carrier or a fraction of the signaling rate for the SRB over the normal bandwidth carrier that may include: means for identifying at least a bandwidth scaling factor for the flexible bandwidth carrier; and/or means for utilizing at least the bandwidth scaling factor to determine the TTI for the SRB over the flexible bandwidth carrier. The means for determining the TTI for the SRB over the flexible bandwidth carrier to facilitate a SRB rate of the SRB over of the flexible bandwidth carrier that maintains at least the SRB rate for the SRB over the normal bandwidth carrier or a fraction of the signaling rate for the SRB over the normal bandwidth carrier may include: means for identifying a TTI for the SRB over for the normal bandwidth carrier; and/or means for utilizing at least a bandwidth scaling factor associated with the flexible bandwidth carrier to determine the TTI for the SRB over the flexible bandwidth carrier based on the TTI for the SRB over the normal bandwidth carrier.

Some embodiments include means for reducing a spreading factor of a physical channel carrying the SRB over the flexible bandwidth carrier. The means for reducing the spreading factor of the physical channel carrying the SRB over the flexible bandwidth carrier may include means for dividing a normal spreading factor by a bandwidth scaling factor for the flexible bandwidth carrier, wherein the normal spreading factor comprises a spreading factor of the physical channel carrying the SRB over the normal bandwidth carrier. Some embodiments include means for increasing a transmission power for the SRB over the flexible bandwidth carrier with respect to a normal bandwidth carrier system with a same power spectrum density. The means for increasing the transmission power may compensate for at least the reduced spreading factor.

In some embodiments, the bandwidth scaling factor for the flexible bandwidth carrier equals a chip rate divider for the flexible bandwidth carrier. The determined TTI may include a valid TTI with respect to a normal bandwidth carrier system.

Some embodiments include means for concatenating multiple transport blocks to facilitate maintaining the SRB rate for the SRB over the flexible bandwidth carrier. The multiple concatenated transport blocks may include two or more transport blocks from a same logical channel. The multiple concatenated transport blocks may include at least two transport blocks from different logical channels. The fraction of the signaling rate for the signaling over the normal bandwidth carrier may exceed a dilated rate based on a bandwidth scaling factor or chip rate divider for the flexible bandwidth carrier.

Some embodiments include a computer program product for wireless communications systems that may include a non-transitory computer-readable medium that may include: code for identifying a signaling rate for signaling over a normal bandwidth carrier; code for determining a unit of time for signaling over the flexible bandwidth carrier to facilitate a signaling rate for the signaling over of the flexible bandwidth carrier that maintains at least the signaling rate for the signaling over the normal bandwidth carrier or a fraction of the signaling rate for the signaling over the normal bandwidth carrier; and/or code for utilizing the determined unit of time for the signaling over the flexible bandwidth carrier.

The signaling over the normal bandwidth carrier may include a signaling radio bearer (SRB) over the normal bandwidth carrier, the signaling over the flexible bandwidth carrier may include an SRB over the flexible bandwidth carrier, the signaling rate for the signaling over the normal bandwidth carrier may include an SRB rate for the SRB over the normal bandwidth carrier, and/or the signaling rate for the signaling over the flexible bandwidth carrier may include an SRB rate for the SRB over the flexible bandwidth carrier. In some embodiments, the unit of time may include a Transmission Time Interval (TTI).

The code for determining the TTI for the SRB over the flexible bandwidth carrier to facilitate a SRB rate of the SRB over of the flexible bandwidth carrier that maintains at least the SRB rate for the SRB over the normal bandwidth carrier or a fraction of the signaling rate for the SRB over the normal bandwidth carrier may include: code for identifying at least a bandwidth scaling factor for the flexible bandwidth carrier; and/or code for utilizing at least the bandwidth scaling factor to determine the TTI for the SRB over the flexible bandwidth carrier. The code for determining the TTI for the SRB over the flexible bandwidth carrier to facilitate a SRB rate of the SRB over of the flexible bandwidth carrier that maintains at least the SRB rate for the SRB over the normal bandwidth carrier or a fraction of the signaling rate for the SRB over the normal bandwidth carrier may include: code for identifying a TTI for the SRB over for the normal bandwidth carrier; and/or code for utilizing at least a bandwidth scaling factor associated with the flexible bandwidth carrier to determine the TTI for the SRB over the flexible bandwidth carrier based on the TTI for the SRB over the normal bandwidth carrier.

The non-transitory computer-readable medium further may include code for reducing a spreading factor of a physical channel carrying the SRB over the flexible bandwidth carrier. The code for reducing the spreading factor of the physical channel carrying the SRB over the flexible bandwidth carrier may include code for dividing a normal spreading factor by a bandwidth scaling factor for the flexible bandwidth carrier, wherein the normal spreading factor comprises a spreading factor of the physical channel carrying the SRB over the normal bandwidth carrier. The non-transitory computer-readable medium further may include code for increasing a transmission power for the SRB over the flexible bandwidth carrier with respect to a normal bandwidth carrier system with a same power spectrum density.

In some embodiments, increasing the transmission power compensates for at least the reduced spreading factor. In some embodiments, the bandwidth scaling factor for the flexible bandwidth carrier equals a chip rate divider for the flexible bandwidth carrier. In some embodiments, the determined TTI is a valid TTI with respect to a normal bandwidth carrier system.

The non-transitory computer-readable medium further may include code for concatenating a plurality of transport blocks to facilitate maintaining the SRB rate for the SRB over the flexible bandwidth carrier. The multiple concatenated transport blocks may include two or more transport blocks from a same logical channel. The multiple concatenated transport blocks may include at least two transport blocks from different logical channels. In some embodiments, the fraction of the signaling rate for the signaling over the normal bandwidth carrier exceeds a dilated rate based on a bandwidth scaling factor or chip rate divider for the flexible bandwidth carrier.

Some embodiments include a wireless communications device that may include at least one processor that may be configured to: identify a signaling rate for signaling over a normal bandwidth carrier; determine a unit of time for signaling over the flexible bandwidth carrier to facilitate a signaling rate for the signaling over of the flexible bandwidth carrier that maintains at least the signaling rate for the signaling over the normal bandwidth carrier or a fraction of the signaling rate for the signaling over the normal bandwidth carrier; and/or utilize the determined unit of time for the signaling over the flexible bandwidth carrier. The device may also include at least one memory coupled with the at least one processor.

In some embodiments of the wireless communications device, the signaling over the normal bandwidth carrier includes a signaling radio bearer (SRB) over the normal bandwidth carrier, the signaling over the flexible bandwidth carrier includes an SRB over the flexible bandwidth carrier, the signaling rate for the signaling over the normal bandwidth carrier includes an SRB rate for the SRB over the normal bandwidth carrier, and/or the signaling rate for the signaling over the flexible bandwidth carrier includes an SRB rate for the SRB over the flexible bandwidth carrier. In some embodiments, the unit of time includes a Transmission Time Interval (TTI).

The at least one processor configured to determine the TTI for the SRB over the flexible bandwidth carrier to facilitate a SRB rate of the SRB over of the flexible bandwidth carrier that maintains at least the SRB rate for the SRB over the normal bandwidth carrier or a fraction of the signaling rate for the SRB over the normal bandwidth carrier may be configured to: identify at least a bandwidth scaling factor for the flexible bandwidth carrier; and/or utilize at least the bandwidth scaling factor to determine the TTI for the SRB over the flexible bandwidth carrier.

The at least one processor configured to determine the TTI for the SRB over the flexible bandwidth carrier to facilitate a SRB rate of the SRB over of the flexible bandwidth carrier that maintains at least the SRB rate for the SRB over the normal bandwidth carrier or a fraction of the signaling rate for the SRB over the normal bandwidth carrier may be configured to: identify a TTI for the SRB over for the normal bandwidth carrier; and/or utilize at least a bandwidth scaling factor associated with the flexible bandwidth carrier to determine the TTI for the SRB over the flexible bandwidth carrier based on the TTI for the SRB over the normal bandwidth carrier.

The at least one processor may be further configured to reduce a spreading factor of a physical channel carrying the SRB over the flexible bandwidth carrier. The at least one processor configured to reduce the spreading factor of the physical channel carrying the SRB over the flexible bandwidth carrier may be further configured to divide a normal spreading factor by a bandwidth scaling factor for the flexible bandwidth carrier, wherein the normal spreading factor comprises a spreading factor of the physical channel carrying the SRB over the normal bandwidth carrier.

The at least one processor may be further configured to increase a transmission power for the SRB over the flexible bandwidth carrier with respect to a normal bandwidth carrier system with a same power spectrum density. The at least one processor configured to increase the transmission power may compensate for at least the reduced spreading factor.

In some embodiments the bandwidth scaling factor for the flexible bandwidth carrier equals a chip rate divider for the flexible bandwidth carrier. The determined TTI may include a valid TTI with respect to a normal bandwidth carrier system.

The at least one processor may be further configured to: concatenate a plurality of transport blocks to facilitate maintaining the SRB rate for the SRB over the flexible bandwidth carrier. The multiple concatenated transport blocks may include two or more transport blocks from a same logical channel. The multiple concatenated transport blocks may include at least two transport blocks from different logical channels. The fraction of the signaling rate for the signaling over the normal bandwidth carrier may exceed a dilated rate based on a bandwidth scaling factor or chip rate divider for the flexible bandwidth carrier.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6 shows an example of concatenation of Transport Blocks for 13.6 kbps SRB in N=2 or ½ BW UMTS in accordance with various embodiments;

FIG. 8 shows an example of concatenation of Transport Blocks for 13.6 kbps SRB in N=4 or ¼ BW UMTS in accordance with various embodiments;

FIG. 10 shows an example of concatenation of Transport Blocks for 13.6/2 kbps SRB in N=4 or ¼ BW UMTS in accordance with various embodiments;

DETAILED DESCRIPTION

Figure 1:
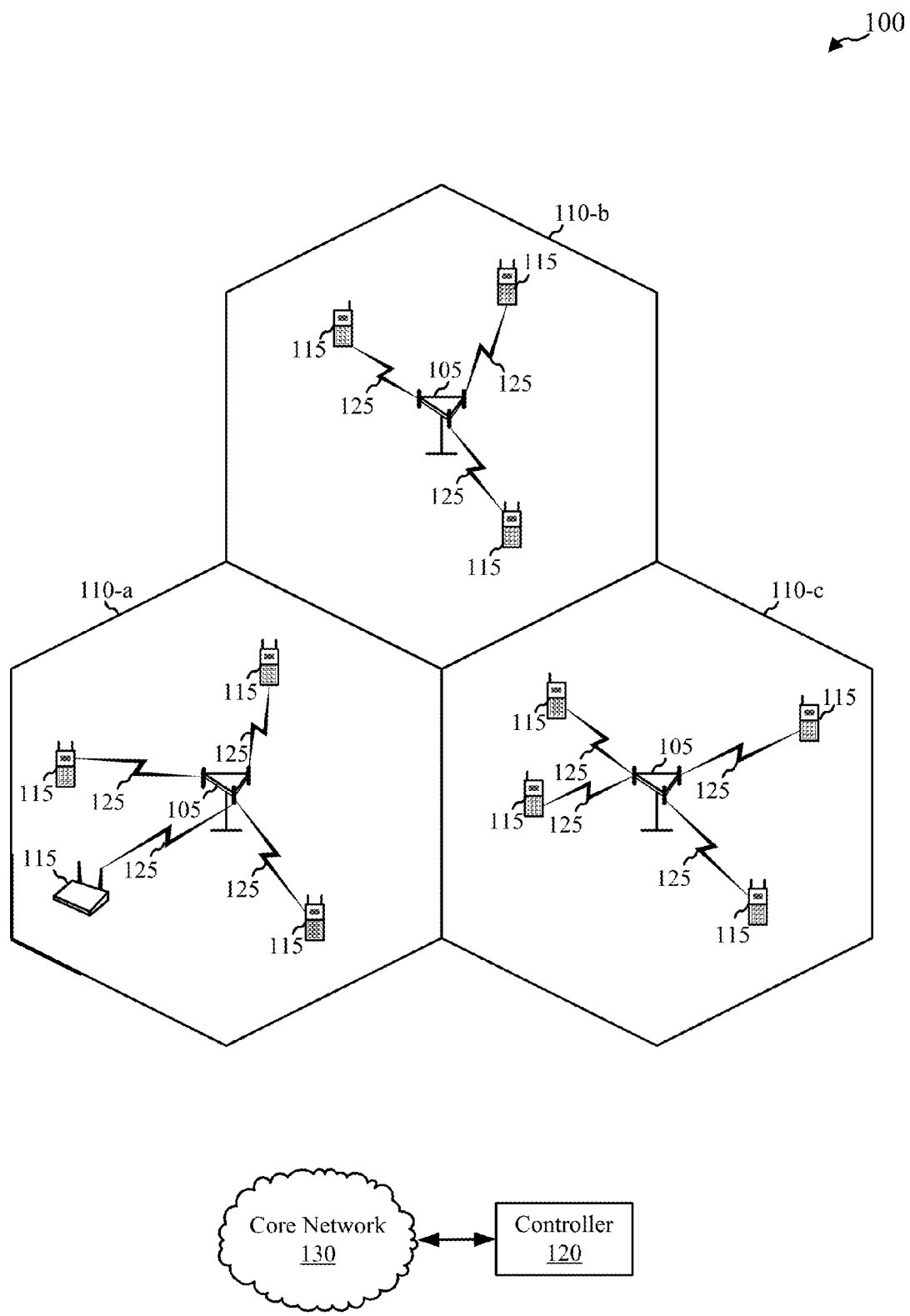
FIG. 1 shows a block diagram of a wireless communications system in accordance with various embodiments.

Methods, systems, and devices are provided that support signaling over a flexible bandwidth carrier. Some embodiments address problems that may be introduced through the use of flexible bandwidth carrier systems, such as additional delay due to time scaling in the flexible bandwidth carrier system, which may result in reduced signaling rates with respect to a normal bandwidth carrier. Some embodiments provide tools and techniques to maintain signaling rates, for example, where a flexible bandwidth carrier system may typically result in a reduced signaling rate that may impact the delay in the signaling procedures as it increases transmission time of signaling messages over the air. These tools and techniques may be applicable for different signaling including, but not limited to, signaling radio bearers (SRBs), control channels, control messaging, broadcast channels, and/or broadcast messages in general. Furthermore, these methods, systems, and devices may also be utilized for some normal bandwidth carrier systems.

Methods, systems, and devices are provided for supporting signaling over a flexible bandwidth carrier. A signaling rate for signaling, such as an SRB, over a normal bandwidth carrier may be identified. A unit of time, such as a Transmission Time Interval (TTI), for signaling over the flexible bandwidth carrier may be determined to facilitate a signaling rate of the signaling over of the flexible bandwidth carrier that maintains at least the signaling rate for the signaling over the normal bandwidth carrier or a fraction of the signaling rate for the signaling over the normal bandwidth carrier. The fraction of the signaling rate for the signaling over the normal bandwidth carrier may exceed a dilated rate based on a bandwidth scaling factor or chip rate divider for the flexible bandwidth carrier system. The determined unit of time may be utilized for the signaling over the flexible bandwidth carrier.

For example, methods, systems, and/or devices are provided that support a SRB rate for a SRB over a flexible bandwidth carrier may include identifying a SRB rate for a SRB over a normal bandwidth carrier. A TTI may be determined for the SRB over the flexible bandwidth carrier that facilitates a SRB rate of the SRB over the flexible bandwidth carrier that maintains at least the SRB rate over the normal bandwidth carrier or a fraction of the SRB rate over the normal bandwidth carrier. In some cases, a spreading factor of a physical channel carrying the SRB over the flexible bandwidth carrier may be utilized to help maintain the same SRB rate. The determined TTI may be utilized for the SRB over the flexible bandwidth carrier, which may help avoid increased call setup delay, increased latency for handover, etc. that may be introduced in flexible bandwidth carrier systems. The determined TTI may be a valid TTI in the normal bandwidth carrier system. The determined TTI may be for a transport channel to which the SRB over the flexible bandwidth carrier may be mapped. Some embodiments may include increasing transmission power, and/or concatenating multiple transport blocks with respect to the SRB over the flexible bandwidth carrier. Similar techniques may be applied for control channels and/or broadcast channels in general.

Reducing the spreading factor for the physical channel carrying the SRB over for the flexible bandwidth carrier may include dividing a spreading factor of the SRB over the normal bandwidth carrier by at least a bandwidth scaling factor or a chip rate divider for the flexible bandwidth carrier. Some embodiments include increasing a transmission power for the SRB over the flexible bandwidth carrier. In some cases, increasing power with respect to a flexible bandwidth system may involve utilizing the same power spectral density as a normal bandwidth system, such as a normal UMTS system. In some cases, it may be the same as a normal bandwidth system. In some cases, this may be done to compensate for at least the reduced spreading factor. The transmission power may be increased not only when spreading factor is reduced but even when spreading factor is kept the same.

In some aspects, multiple transport blocks may be concatenated to help maintain the SRB rate over the SRB for the flexible bandwidth carrier. The multiple concatenated transport blocks may include two or more transport blocks from a same logical channel. The multiple concatenated transport blocks may include at least two transport blocks from different logical channels. In some cases, when multiple transport blocks are concatenated, code block segmentation may be utilized also, for example, if the size of the code block for convolutional coding is greater than for a normal bandwidth system.

Flexible bandwidth carrier systems may involve wireless communications systems that may utilize portions of spectrum that may not be big enough to fit a normal waveform utilizing flexible waveforms. A flexible bandwidth carrier system may be generated with respect to a normal bandwidth carrier system through dilating, or scaling down, the time or the chip rate of the flexible bandwidth carrier system with respect to the normal bandwidth carrier system. In some embodiments, a flexible bandwidth carrier system may be generated with respect to a normal bandwidth carrier system through dilating the frame lengths, or scaling down, the bandwidth of the flexible bandwidth carrier system with respect to the normal bandwidth carrier system. Some embodiments increase the bandwidth of a flexible waveform through expanding, or scaling up the time or the chip rate of the flexible bandwidth carrier system. Some embodiments increase the bandwidth of a flexible waveform through decreasing the frame lengths, or scaling up the bandwidth of the flexible bandwidth carrier system. Some embodiments may utilize a bandwidth scaling factor or a chip rate divider to facilitate a flexible bandwidth carrier system. The bandwidth scaling factor and the chip rate divider may be numerically equivalent to each other.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, user equipment 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The user equipment 115 may be any type of mobile station, mobile device, access terminal, subscriber unit, or user equipment. The user equipment 115 may include cellular phones and wireless communications devices, but may also include personal digital assistants (PDAs), smartphones, other handheld devices, netbooks, notebook computers, etc. Thus, the term user equipment should be interpreted broadly hereinafter, including the claims, to include any type of wireless or mobile communications device.

The base stations 105 may wirelessly communicate with the user equipment 115 via a base station antenna. The base stations 105 may be configured to communicate with the user equipment 115 under the control of the controller 120 via multiple carriers. In GSM, for example, the controller 120 may be referred to as the base station controller (BSC); in UMTS, the controller may be known as the Radio Network Controller (RNC). Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the user equipment 115, the base stations 105, the core network 130, and/or the controller 120 may be configured to utilize flexible bandwidth carriers and waveforms in accordance with various embodiments. System 100, for example, shows transmissions 125 between user equipment 115 and base stations 105. The transmissions 125 may include uplink and/or reverse link transmission, from a user equipment 115 to a base station 105, and/or downlink and/or forward link transmissions, from a base station 105 to a user equipment 115. The transmissions 125 may include flexible and/or normal waveforms. Normal waveforms may also be referred to as legacy and/or normal waveforms.

The different aspects of system 100, such as the user equipment 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the user equipment 115, the base stations 105, the core network 130, and/or the controller 120 may be configured to adapt the chip rates and/or scaling factors to generate and/or utilize flexible bandwidth and/or waveforms. Some aspects of system 100 may form a flexible subsystem (such as certain user equipment 115 and/or base stations 105) that may be generated with respect to a normal subsystem (that may be implemented using other user equipment 115, controller 120, and/or base stations 105 through dilating, or scaling down, the time (e.g., frame length) or the chip rate of the flexible subsystem with respect to the normal subsystem. In some embodiments, a flexible subsystem may be generated with respect to a normal subsystem through dilating the frame lengths, or scaling down, the bandwidth of the flexible subsystem with respect to the normal subsystem. Some embodiments increase the bandwidth of a flexible waveform through expanding, or scaling up the time (e.g., frame length) or the chip rate of the flexible subsystem. Some embodiments increase the bandwidth of a flexible waveform through decreasing the frame lengths, or scaling up the bandwidth of the flexible subsystem.

The different aspects of system 100, such as the user equipment 115, the base stations 105, the core network 130, and/or the controller 120 may be configured for supporting signaling over a flexible bandwidth carrier. For example, user equipment 115 and/or base stations 105 may be configured to identify signaling rate for a signaling, such as an SRB, over a normal bandwidth carrier. A unit of time, such as a Transmission Time Interval (TTI), for signaling over the flexible bandwidth carrier may be determined to facilitate a signaling rate of the signaling over of the flexible bandwidth carrier that maintains at least the signaling rate for the signaling over the normal bandwidth carrier or a fraction of the signaling rate for the signaling over the normal bandwidth carrier. The fraction of the signaling rate for the signaling over the normal bandwidth carrier may exceed a dilated rate based on a bandwidth scaling factor or chip rate divider for the flexible bandwidth carrier system. The determined unit of time may be utilized for the signaling over the flexible bandwidth carrier by the user equipment 115 and/or base stations 105. Similar techniques may be applied for control channels and/or broadcast channels in general.

In some embodiments, the different aspects of system 100, such as the user equipment 115, the base stations 105, the core network 130, and/or the controller 120 may be configured for supporting a SRB rate over a flexible bandwidth carrier. For example, user equipment 115 and/or base stations 105 may be configured to: identifying a SRB rate for a SRB over a normal bandwidth carrier; determining a TTI for a SRB over a flexible bandwidth carrier that facilitates a SRB rate of the SRB over the flexible bandwidth carrier that maintains at least the SRB rate for the SRB over the normal bandwidth carrier; and/or utilizing the determined TTI for the SRB over the flexible bandwidth carrier.

In some cases, user equipment 115 and/or base stations 105 may be configured for: identifying at least bandwidth scaling factor or a chip rate divider for the flexible bandwidth carrier; and/or utilizing at least the bandwidth scaling factor or the chip rate divider to determine the TTI for the SRB over the flexible bandwidth carrier. User equipment 115 and/or base stations 105 configured for: identifying a TTI for the SRB over the normal bandwidth carrier; and/or utilizing at least a bandwidth scaling factor or a chip rate divider to determine the TTI for the SRB over the flexible bandwidth carrier based on the TTI for the SRB over the normal bandwidth carrier.

User equipment 115 and/or base stations 105 may be configured for reducing a spreading factor of a physical channel carrying the SRB over the flexible bandwidth carrier. Reducing the spreading factor of the physical channel carrying the SRB over the flexible bandwidth carrier may include dividing a normal spreading factor by a bandwidth scaling factor for the flexible bandwidth carrier, where the normal spreading factor includes a spreading factor of the physical channel carrying the SRB over the normal bandwidth carrier.

User equipment 115 and/or base stations 105 may be configured for increasing a transmission power for the SRB over the flexible bandwidth carrier with respect to a normal bandwidth carrier system with a same power spectrum density. In some cases, this transmission power increase may compensate for at least the reduced spreading factor. User equipment 115 and/or base stations 105 configured for concatenating multiple transport blocks to help maintain the SRB rate of the SRB over the flexible bandwidth carrier. The multiple concatenated transport blocks may include two or more transport blocks from a same logical channel. The multiple concatenated transport blocks may include at least two transport blocks from different logical channels.

User equipment 115 and/or base stations 105 may be configured for, but not limited to, SRB rates of 13.6 kbps, 13.6/2 kbps, 3.4 kbps, and/or 1.7 kbps. The user equipment 115 and/or the base stations 105 may be configured to utilize different bandwidth scaling factors and/or chip rate dividers including, but not limited to, 2 and/or 4.

Some embodiments may include user equipment 115 and/or base stations 105 that may generate flexible waveforms and/or normal waveforms. Flexible waveforms may occupy less bandwidth than a normal waveform. For example, at a band edge, there may not be enough available spectrum to place a normal waveform. For a flexible waveform in some embodiments, as time gets dilated, the frequency occupied by a waveform goes down, thus making it possible to fit a flexible waveform into spectrum that may not be broad enough to fit a normal waveform. Flexible waveforms may also be generated in some embodiments through using a scaling factor. In some embodiments, a flexible bandwidth carrier may be utilized to carry the flexible waveform. Other embodiments may generate a flexible waveform to fit a portion of spectrum through altering a rate or chip rate (e.g., a spreading factor may change). Some embodiments may change a frequency of processing to change a chip rate or utilize a scaling factor. Changing frequency of processing may include changing an interpolation rate, an interrupt rate, and/or a decimation rate. In some embodiments, a chip rate may be changed or a scaling factor utilized through filtering, by decimation, and/or by changing a frequency of an ADC, a DAC, and/or an offline clock. A divider may be used to change the frequency of at least one clock. In some embodiments, a chip rate divider (Dcr) may be utilized. In some embodiments, a scaling factor for a flexible bandwidth carrier may be referred to as a bandwidth scaling factor.

In some embodiments, a flexible system or waveform may be a fractional system or waveform. Fractional systems and/or waveforms may or may not change bandwidth for example. A fractional system or waveform may be flexible because it may offer more possibilities than a normal system or waveform (e.g., N=1 system). A normal system or waveform may refer to a standard and/or legacy system or waveform.

Figure 2A:
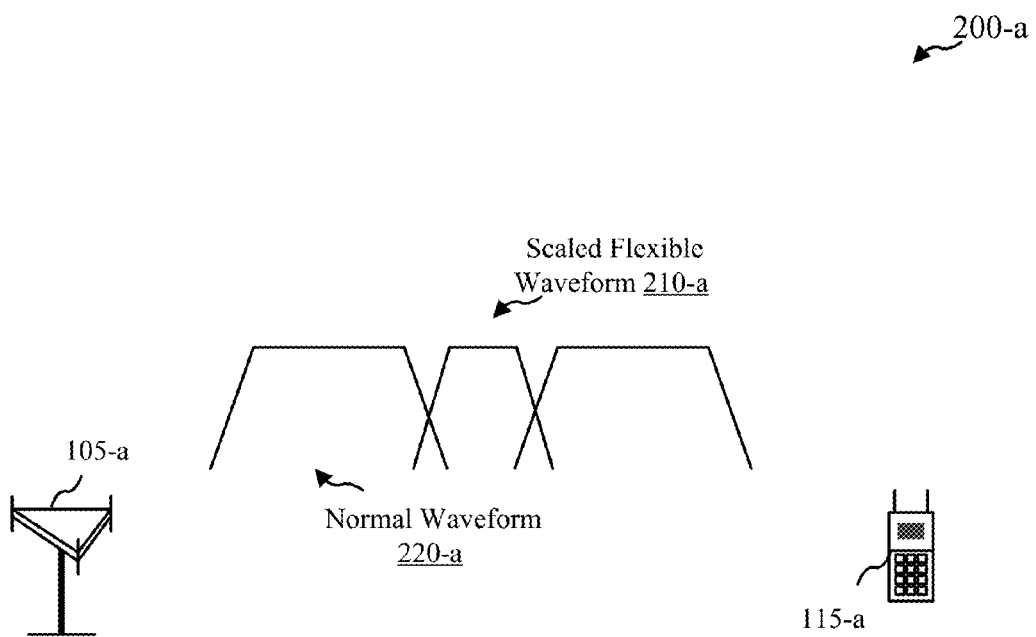
FIG. 2A shows an example of a wireless communications system where a flexible waveform fits into a portion of spectrum not broad enough to fit a normal waveform in accordance with various embodiments.
Figure 2B:
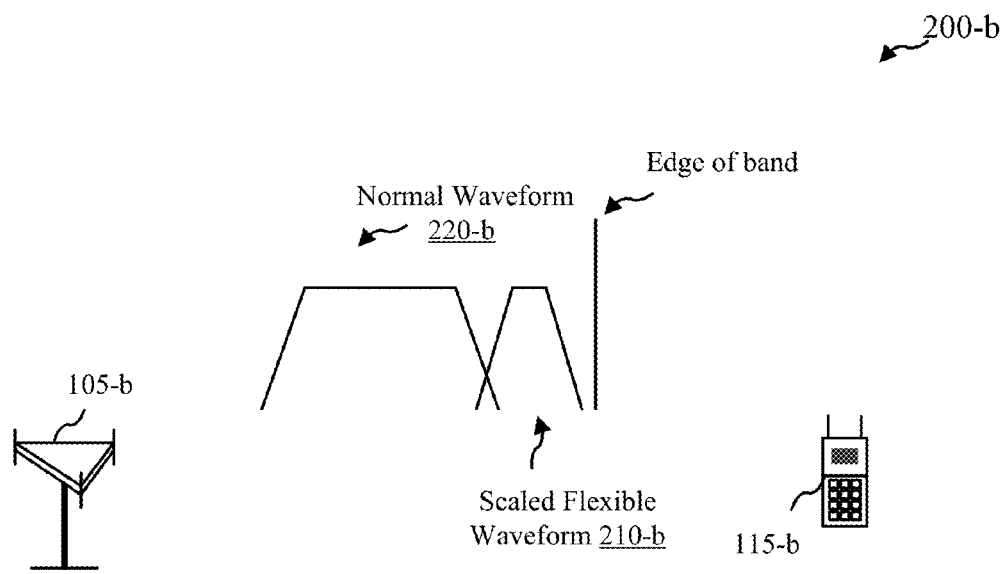
FIG. 2B shows an example of a wireless communications system where a flexible waveform fits into a portion of spectrum near an edge of a band in accordance with various embodiments.

FIG. 2A shows an example of a wireless communications system 200-a with a base station 105-a and a user equipment 115-a in accordance with various embodiments, where a flexible waveform 210-a fits into a portion of spectrum not broad enough to fit a normal waveform 220-a. System 200-a may be an example of system 100 of FIG. 1. In some embodiments, the flexible waveform 210-a may overlap with the normal waveform 220-a that either the base 105-a and/or the user equipment 115-a may transmit. Some embodiments may also utilize multiple flexible waveforms 210. In some embodiments, another base station and/or user equipment (not shown) may transmit the normal waveform 220-a and/or the flexible waveform 210-a. FIG. 2B shows an example of a wireless communications system 200-b with a base station 105-b and user equipment 115-b, where a flexible waveform 210-b fits into a portion of spectrum near an edge of a band, which may be a guard band, where normal waveform 220-b may not fit. System 200-b may be an example of system 100 of FIG. 1.

The user equipment 115-a/115-b and/or the base station 105-a/150-b may be configured for supporting signaling over a flexible bandwidth carrier in accordance with various embodiments. For example, user equipment 115-a/115-b and/or the base station 105-a/150-b may be configured to identify signaling rate for a signaling, such as an SRB, over a normal bandwidth carrier. A unit of time, such as a Transmission Time Interval (TTI), for signaling over the flexible bandwidth carrier may be determined to facilitate a signaling rate of the signaling over of the flexible bandwidth carrier that maintains at least the signaling rate for the signaling over the normal bandwidth carrier or a fraction of the signaling rate for the signaling over the normal bandwidth carrier. The fraction of the signaling rate for the signaling over the normal bandwidth carrier may exceed a dilated rate based on a bandwidth scaling factor or chip rate divider for the flexible bandwidth carrier system. The determined unit of time may be utilized for the signaling over the flexible bandwidth carrier by the user equipment 115-a/115-b and/or the base station 105-a/150-b. Similar techniques may be applied for control channels and/or broadcast channels in general.

In some embodiments, the user equipment 115-a/115-b and/or the base station 105-a/150-b may be configured for supporting a SRB rate over a flexible bandwidth carrier. For example, the user equipment 115 and/or the base stations 105 may be configured to: identifying a SRB rate for a SRB over for a normal bandwidth carrier; determining a TTI for a SRB over a flexible bandwidth carrier that facilitates a SRB rate of the SRB over the flexible bandwidth carrier that maintains at least the SRB rate for the SRB over the normal bandwidth carrier; and/or utilizing the determined TTI for the SRB over the flexible bandwidth carrier.

Figure 3:
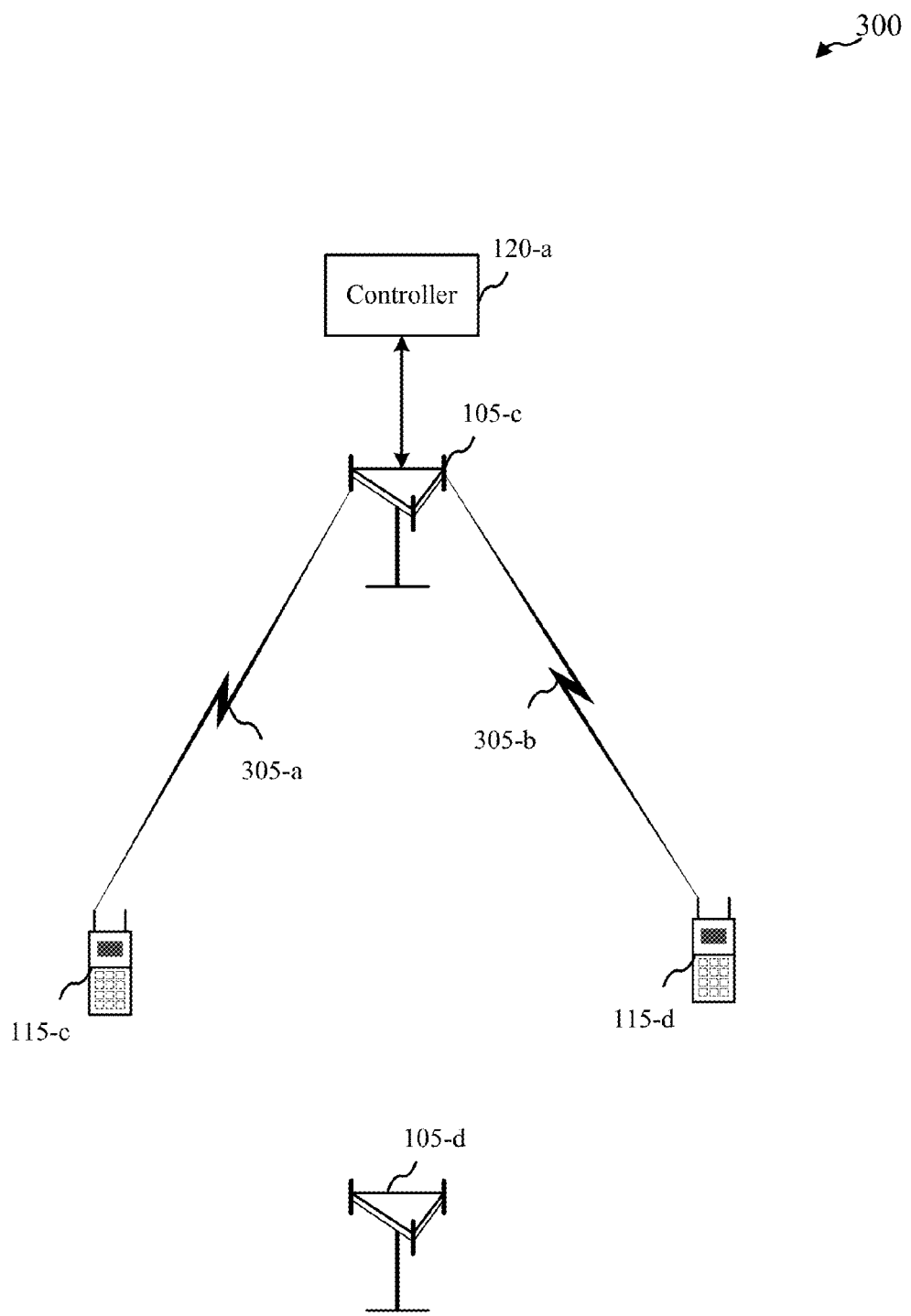
FIG. 3 shows a block diagram of a wireless communications system in accordance with various embodiments.

FIG. 3 shows a wireless communications system 300 with base station 105-c, base station 105-d, controller 120-a, user equipment 115-c, and user equipment 115-d, in accordance with various embodiments. In some embodiments, the base station 105-c and/or the user equipment 115-c/115-d may be configured for such that transmissions 305-a and/or 305-b between the user equipment 115-c and/or 115-d and the base station 105-c or base station 105-d (transmissions not shown) may utilize flexible waveforms that may be generated to occupy less (or more) bandwidth than a normal waveform. For example, at a band edge, including the edge of the operator's contiguous spectrum allocation, there may not be enough available spectrum to place a normal waveform. For a flexible waveform, as time gets dilated, the frequency occupied by a waveform goes down, thus making it possible to fit a flexible waveform into spectrum that may not be broad enough to fit a normal waveform. In some embodiments, the flexible waveform may be scaled utilizing a scaling factor N with respect to a normal waveform. Scaling factor N may be referred to as a bandwidth scaling factor. Scaling factor N may be utilized to scaling a bandwidth for a flexible bandwidth carrier. Scaling factor N may take on numerous different values including, but not limited to, integer values such as 1, 2, 3, 4, 8, etc. N, however, does not have to be an integer. In some cases, a chip rate divider (Dcr) may be utilized, which may have the same numerical value as a bandwidth scaling factor.

Some embodiments may utilize additional terminology. A new unit D may be utilized. The unit D is "dilated". The unit may be unitless and may have the value of N. One can talk about time in the flexible system in terms of "dilated time". For example, a slot of say 10 ms in normal time may be represented as 10 Dms in flexible time (note: even in normal time, this will hold true since N=1 in normal time: D has a value of 1, so 10 Dms=10 ms). In time scaling, one can replace most "seconds" with "dilated-seconds".

As discussed above, a flexible waveform may be a waveform that occupies less, or more, bandwidth than a normal waveform. Thus, in a flexible bandwidth carrier system, the same number of symbols and bits may be transmitted over a longer duration compared to a normal bandwidth system. This may result in time stretching, whereby slot duration, frame duration, etc., may increase by a scaling factor N. Scaling factor N may represent the ratio of the flexible bandwidth (BW) to a normal bandwidth. Thus, data rate in a flexible bandwidth system may equal Normal Rate×1/N, and delay may equal Normal Delay×N. In general, a flexible systems channel BW=channel BW of normal systems/N. Delay-Bandwidth product, Delay×BW, may remain unchanged. Furthermore, in some embodiments, a flexible waveform may be a waveform that occupies more bandwidth than a normal waveform.

Throughout this specification, the term normal system, subsystem, and/or waveform may be utilized to refer to systems, subsystems, and/or waveforms that involve embodiments that may utilize a scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a scaling factor that may be not equal to one (e.g., N=2, 3, 4, 8, ½, ¼, etc.). For N>1, or if a chip rate is decreased, the bandwidth of a waveform may decrease. Some embodiments may utilize scaling factors or chip rates that increase the bandwidth. For example, if N<1, or if the chip rate is increased, then a waveform may be expanded to cover bandwidth larger than a normal waveform. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system).

Base station 105-c, base station 105-d, user equipment 115-c, and/or user equipment 115-d may be configured for supporting signaling over a flexible bandwidth carrier. For example, user equipment 115 and/or base stations 105 may be configured to identify signaling rate for a signaling, such as an SRB, over a normal bandwidth carrier. A unit of time, such as a Transmission Time Interval (TTI), for signaling over the flexible bandwidth carrier may be determined to facilitate a signaling rate of the signaling over of the flexible bandwidth carrier that maintains at least the signaling rate for the signaling over the normal bandwidth carrier or a fraction of the signaling rate for the signaling over the normal bandwidth carrier. The fraction of the signaling rate for the signaling over the normal bandwidth carrier may exceed a dilated rate based on a bandwidth scaling factor or chip rate divider for the flexible bandwidth carrier system. The determined unit of time may be utilized for the signaling over the flexible bandwidth carrier by the base station 105-c, base station 105-d, user equipment 115-c, and/or user equipment 115-d. Similar techniques may be applied for control channels and/or broadcast channels in general.

In some embodiments, base station 105-c, base station 105-d, user equipment 115-c, and/or user equipment 115-d may be configured for supporting a SRB rate over a flexible bandwidth carrier. For example, user equipment 115-c, user equipment 115-d, base station 105-c, and/or base station 105-d may be configured to: identifying a SRB rate for a SRB over a normal bandwidth carrier; determining a TTI for a SRB over a flexible bandwidth carrier that facilitates a SRB rate of the SRB over the flexible bandwidth carrier that maintains at least the SRB rate for the SRB over the normal bandwidth carrier; and/or utilizing the determined TTI for the SRB over the flexible bandwidth carrier.

In some cases, user equipment 115-c, user equipment 115-d, base station 105-c, and/or base station 105-d may be configured for: identifying at least bandwidth scaling factor or a chip rate divider for the flexible bandwidth carrier; and/or utilizing at least the bandwidth scaling factor or the chip rate divider to determine the TTI for the SRB over the flexible bandwidth carrier. The user equipment 115 and/or the base stations 105 configured for: identifying a TTI for a SRB over the normal bandwidth carrier; and/or utilizing at least a bandwidth scaling factor or a chip rate divider to determine the TTI for the SRB over the flexible bandwidth carrier based on the TTI for the SRB over the normal bandwidth carrier.

User equipment 115-c, user equipment 115-d, base station 105-c, and/or base station 105-d may be configured for reducing a spreading factor of a physical channel carrying the SRB over the flexible bandwidth carrier. Reducing the spreading factor of the physical channel carrying the SRB over the flexible bandwidth carrier may include dividing a normal spreading factor by a bandwidth scaling factor for the flexible bandwidth carrier, where the normal spreading factor includes a spreading factor of the physical channel carrying the SRB over the normal bandwidth carrier.

User equipment 115-c, user equipment 115-d, base station 105-c, and/or base station 105-d may be configured for increasing a transmission power for the SRB over the flexible bandwidth carrier with respect to a normal bandwidth carrier system with a same power spectrum density. This may compensate for at least the reduced spreading factor in some cases. User equipment 115-c, user equipment 115-d, base station 105-c, and/or base station 105-d may be configured for concatenating multiple transport blocks to maintain the SRB rate of the SRB over the flexible bandwidth carrier. The multiple concatenated transport blocks may include two or more transport blocks from a same logical channel. The multiple concatenated transport blocks may include at least two transport blocks from different logical channels.

User equipment 115-c, user equipment 115-d, base station 105-c, and/or base station 105-d may be configured for, but not limited to, SRB rates of 13.6 kbps, 13.6/2 kbps, 3.4 kbps, and/or 1.7 kbps. The user equipment 115 and/or the base stations 105 may be configured to utilize different bandwidth scaling factors and/or chip rate dividers including, but not limited to, 2 and/or 4.

Figure 4A:
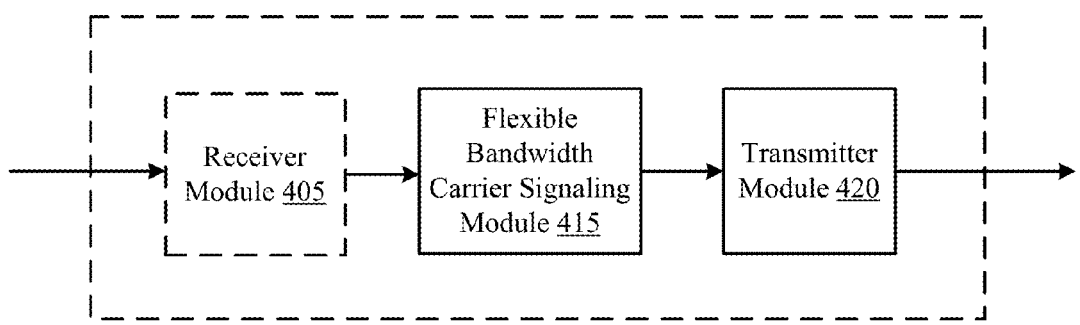
FIG. 4A shows a block diagram of a device configured for supporting SRB rates in accordance with various embodiments.
Figure 4B:
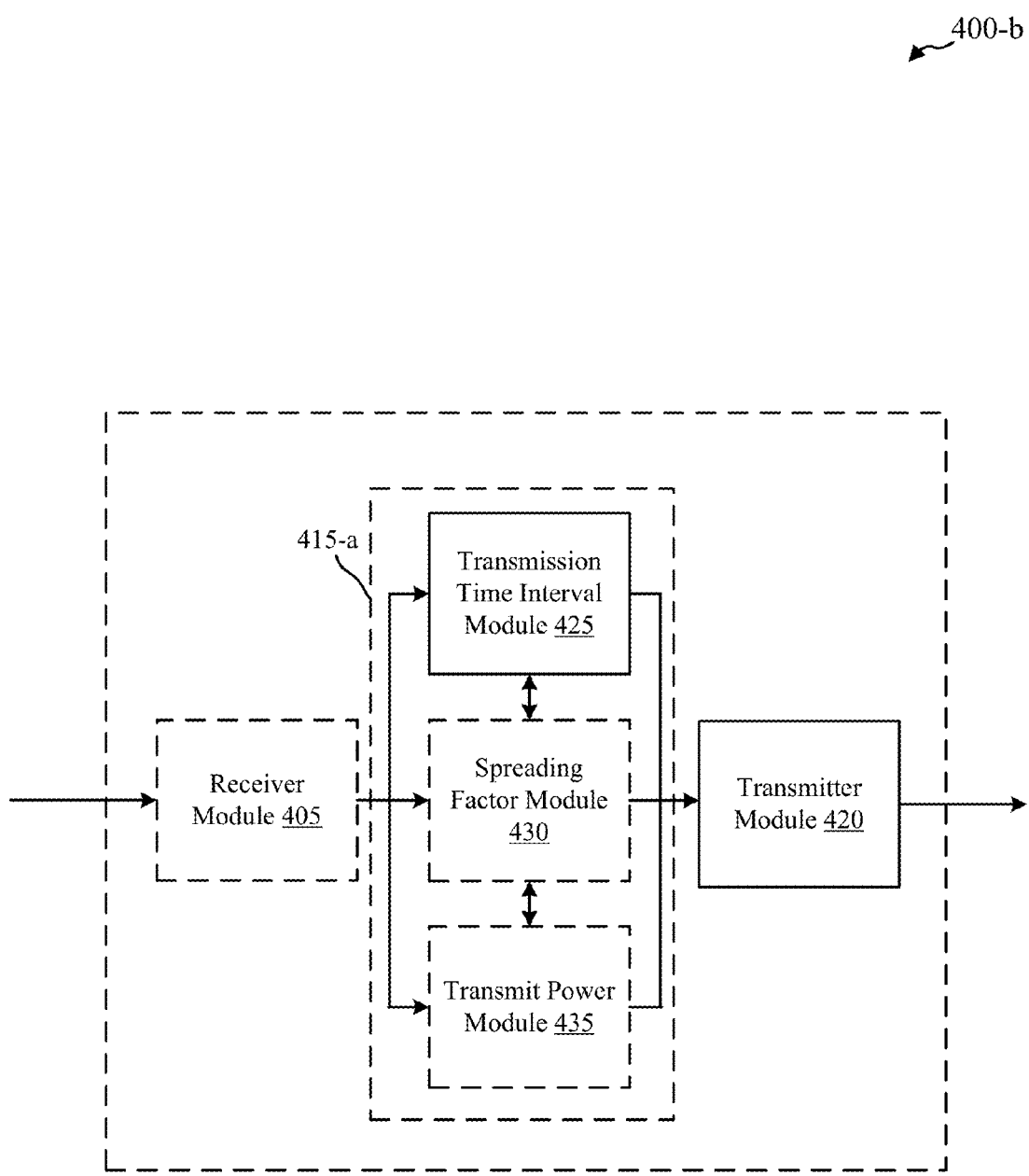
FIG. 4B shows a block diagram of a device configured for supporting SRB rates in accordance with various embodiments.

Turning next to FIG. 4A and FIG. 4B, block diagrams illustrates a device 400-*a* and device 400-*b*, respectively, for supporting signaling over a flexible bandwidth carrier in accordance with various embodiments. The devices 400-*a* and/or 400-*b* may be an example of one or more aspects of user equipment 115 described with reference to FIG. 1, FIG. 2, FIG. 3, FIG. 11, FIG. 12 and/or FIG. 13; and/or base stations 105 described with reference to FIG. 1, FIG. 2, FIG. 3, FIG. 11, and/or FIG. 13. The devices 400-*a* and/or 400-*b* may also be a processor. The device 400-*a* may include a receiver module 405, a flexible bandwidth carrier signaling module 415, and/or a transmitter module 420. The device 400-*b* may include a receiver module 405, a flexible bandwidth carrier SRB module 415-*a*, and/or a transmitter module 420. The flexible bandwidth carrier SRB module 415-*a* may include a transmission time interval module 425, a spreading factor module 430, and/or a transmit power module 434. In some cases, the transmit power module 430 may be part of transmitter module 420. Device 400-*a* may also include a concatenation module (not shown; see FIG. 11 and/or FIG. 12). Each of these components may be in communication with each other.

These components of the device devices 400-*a* and/or 400-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405 may receive information such as packet, data, and/or signaling information regarding what device devices 400-*a* and/or 400-*b* has received or transmitted. The received information may be utilized by flexible bandwidth carrier signaling module 415 and/or flexible bandwidth carrier SRB module 415-*a* for a variety of purposes.

The flexible bandwidth carrier signaling module 415, for example, may be configured for supporting signaling over a flexible bandwidth carrier. A signaling rate for a signaling, such as an SRB, over a normal bandwidth carrier may be identified by the flexible bandwidth carrier signaling module 415. A unit of time, such as a Transmission Time Interval (TTI), for signaling over the flexible bandwidth carrier may be identified by the flexible bandwidth carrier signaling module 415 to facilitate a signaling rate of the signaling over the flexible bandwidth carrier that maintains at least the signaling rate for the signaling over the normal bandwidth carrier or a fraction of the signaling rate for the signaling over the normal bandwidth carrier. The fraction of the signaling rate for the signaling over the normal bandwidth carrier may exceed a dilated rate based on a bandwidth scaling factor or chip rate divider for the flexible bandwidth carrier system. The determined unit of time may be utilized for the signaling over the flexible bandwidth carrier by the flexible bandwidth carrier signaling module 415 and/or transmitter 420.

For example, flexible bandwidth carrier signaling module 415 and/or flexible bandwidth carrier SRB module 415-*a*, through TTI module 425 for example, may be configured to identify a SRB rate for a SRB over a normal bandwidth carrier. Flexible bandwidth carrier SRB module 415 and/or flexible bandwidth carrier SRB module 415-*a*, through TTI module 425 for example, may be configured to determine a TTI for a SRB over the flexible bandwidth carrier that facilitates a SRB rate of the SRB over the flexible bandwidth carrier that maintains at least the SRB rate for the SRB over the normal bandwidth carrier. Flexible bandwidth carrier signaling module 415 and/or flexible bandwidth carrier SRB module 415-*a*, through TTI module 425 for example, or transmitter module 420 may be configured to utilize the determined TTI for the SRB over the flexible bandwidth carrier.

In some embodiments, flexible bandwidth carrier signaling module 415 and/or flexible bandwidth carrier SRB module 415-*a*, through TTI module 425 for example, may be configured to identify at least a bandwidth scaling factor or a chip rate divider for the flexible bandwidth carrier; and/or utilize at least the bandwidth scaling factor or the chip rate divider to determine the TTI for the SRB over the flexible bandwidth carrier. Flexible bandwidth carrier signaling module 415 and/or flexible bandwidth carrier SRB module 415-*a*, through TTI module 425 for example, may be configured to identify a TTI for the SRB over the normal bandwidth carrier; and/or utilize at least a bandwidth scaling factor or a chip rate divider to determine the TTI for the SRB over the flexible bandwidth carrier based on the TTI for the SRB over the normal bandwidth carrier.

Flexible bandwidth carrier signaling module 415 and/or flexible bandwidth carrier SRB module 415-*a*, through spreading factor module 430 for example, may be configured to reduce a spreading factor of a physical channel carrying the SRB over the flexible bandwidth carrier. Reducing the spreading factor of the physical channel carrying the SRB over the flexible bandwidth carrier may include dividing a normal spreading factor by a bandwidth scaling factor for the flexible bandwidth carrier, where the normal spreading factor includes a spreading factor of the physical channel carrying the SRB over the normal bandwidth carrier. Flexible bandwidth carrier signaling module 415 and/or flexible bandwidth carrier SRB module 415-*a*, through transmit power module 435 for example, or transmitter module may be configured to increase a transmission power for the SRB over the flexible bandwidth carrier with respect to a normal bandwidth carrier system with a same power spectrum density. This power increase may compensate for at least the reduced spreading factor. The determined TTI may be a valid TTI with respect to a normal bandwidth carrier system.

In some cases, flexible bandwidth carrier signaling module 415 and/or flexible bandwidth carrier SRB module 415-*a* may utilize configurations where at least the bandwidth scaling factor or the chip rate divider equals 2, a TTI for the SRB over the normal bandwidth carrier is 40 ms, and the TTI for the SRB over the flexible bandwidth carrier is 20 ms. Some aspects may include where at least the bandwidth scaling factor or the chip rate divider equals 4, a TTI for the SRB over the normal bandwidth carrier is 40 ms, and the TTI for the SRB over the flexible bandwidth carrier is 10 ms. For these cases, the SRB rate for the SRB over the normal bandwidth carrier may be 3.4 kbps. Other examples include where at least the bandwidth scaling factor or the chip rate divider equals 2, a TTI for the SRB over the normal bandwidth carrier is 80 ms, and the TTI for the SRB over the flexible bandwidth carrier is 40 ms. Further cases include situations where at least the bandwidth scaling factor or the chip rate divider equals 4, a TTI for the SRB over the normal bandwidth carrier is 80 ms, and the TTI for the SRB over the flexible bandwidth carrier is 20 ms. For these cases, the SRB rate for the SRB over the normal bandwidth carrier may be 1.7 kbps. The flexible bandwidth carrier may include flexible bandwidth UMTS carrier, for example.

Some embodiments include a flexible bandwidth carrier signaling module 415 and/or flexible bandwidth carrier SRB module 415-a that may be configured to concatenate multiple transport blocks to help maintain the SRB rate for the SRB over the flexible bandwidth carrier. This may involve a concatenation module (not shown; see, however, FIGS. 11 and/or 12). The multiple concatenated transport blocks may include two or more transport blocks from a same logical channel. The multiple concatenated transport blocks may include at least two transport blocks from different logical channels. Some embodiments include a flexible bandwidth carrier signaling module 415 and/or flexible bandwidth carrier SRB module 415-a, such as through spreading factor module 430, that is configured to reduce the spreading factor for the SRB over the flexible bandwidth by at least the bandwidth scaling factor or the chip rate divider. Some embodiments include a flexible bandwidth carrier signaling module 415 and/or flexible bandwidth carrier SRB module 415-a, such as through transmit power module 434, or transmitter module 420 that is configured to increase a transmission power for the SRB over the flexible bandwidth carrier. This may compensate for at least the reduced spreading factor.

In some cases, flexible bandwidth carrier signaling module 415 and/or flexible bandwidth carrier SRB module 415-a may utilize a configuration where at least the bandwidth scaling factor or the chip rate divider equals 2, a TTI for the SRB over the normal bandwidth carrier is 10 ms; and the TTI for the SRB over the flexible bandwidth carrier is 20 ms. Some cases may include where at least the bandwidth scaling factor or the chip rate divider equals 4, the TTI for the SRB over the normal bandwidth carrier is 10 ms, and the TTI for the SRB over the flexible bandwidth carrier is 40 ms. For these examples, the SRB rate for the SRB over the normal bandwidth carrier may be 13.6 kbps.

Some examples may also include situations where the SRB rate for the SRB over the normal bandwidth carrier is 13.6/2 kbps. This may provide an example of a fraction of the signaling rate for the signaling over the normal bandwidth carrier, which is still higher than the naturally dilated rate (i.e. 13.6/4 kbps when N=4). These examples may not achieve the same SRB rate as over normal bandwidth carrier but a fraction of that (but higher than naturally dilated rate). For example with N=4, the dilated SRB rate may be 13.6/4 kbps. Some embodiments achieve the same SRB rate as over normal like 13.6 kbps or a fraction of that higher than the naturally dilated rate i.e. 13.6/2 kbps.

The following provides different specific embodiments that may be implemented by devices such as device 400-a of FIG. 4A and/or device 400-b of FIG. 4B in accordance with various embodiments.

For example, some embodiments provide support for 3.4 kbps stand-alone SRB in Uplink (UL) and Downlink (DL) over Flexible Bandwidth UMTS (F-UMTS). In UMTS, the following Signaling Radio Bearer rates are generally supported:

1.7 kbps: TTI—80 ms, SF 512/256 (DL/UL)
3.4 kbps: TTI—40 ms, SF 256/256 (DL/UL)
13.6 kbps: TTI—10 ms, SF 128/64 (DL/UL)

In F-UMTS, slot duration, frame duration, sub frame duration, radio frame duration, TTI may get dilated by a factor of Dcr due to time dilation, where Dcr may be the chip rate divider used for F-UMTS. The value of Dcr may be equal to the bandwidth scaling factor in F-UMTS (i.e. N). As result, the data rate may get scaled down by factor Dcr and additional delay may get introduced due to TTI scaling in F-UMTS. Hence, the SRB rates in F-UMTS may become, for example:

1.7/Dcr kbps: TTI—80×Dcr ms, SF 512/256 (DL/UL);
3.4/Dcr kbps: TTI—40×Dcr ms, SF 256/256 (DL/UL);
13.6/Dcr kbps: TTI—10×Dcr ms SF 128/64 (DL/UL).

In one example, for ½ BW flexible UMTS system (e.g., N=2), the following configurations may be utilized:

1.7/2 kbps (=0.85 kbps): TTI—80×2 ms (=160 ms), SF 512/256 (DL/UL);
3.4/2 kbps (=1.7 kbps): TTI—40×2 ms (=80 ms), SF 256/256 (DL/UL);
13.6/2 kbps (=6.8 kbps): TTI—10×2 ms (=20 ms) SF 128/64 (DL/UL).

It is to be noted that the TTI for the SRBs may remain unchanged in dilated ms but may get scaled up in absolute values while the Spreading Factors (SF) may remain unchanged in DL and UL.

Reduced SRB rates may impact the delay in the signaling procedures as it increases transmission time of signaling messages over the air, for example. This may result in increased call setup delay, increased latency for handover etc. It is to be noted that call setup-related signaling between the RNC and core NW, inside the CN etc. may not affected. Also, the supporting CS voice (e.g. AMR 12.2 kbps) over F-UMTS may maintain the SRB rates once CS RABs are established in some embodiments.

Thus there may be a motivation to maintain stand-alone SRB rates in F-UMTS during start-up as compared to UMTS. In that case, there may be no additional delay for signaling procedures. While the following provides examples with respect to 3.4 kbps SRB, these tools and techniques may be extended 1.7 kbps SRB or other data rates.

Some embodiments provide tools and techniques for stand-alone UL; 3.4 kbps SRBs for DCCH in N=2 or ½ BW F-UMTS. For example, the TTI of the transport channel may be changed from 40 ms to 20×Dcr ms for N=2 or ½ BW F-UMTS:

4 SRBs→4 DCCHs→1 DCH using 20×Dcr i.e. 20×2 ms=40 ms TTI

This scheme has to be applied to both the UE, such as UEs 115, and base stations, such as base stations 105.

The change in TTI value may help in maintaining the SRB rate over F-UMTS. This may imply the SF to be reduced by factor Dcr (i.e. N) in some cases to accommodate the additional encoded bits per radio frame. An example of this is the UL SF for 3.4 kbps SRB may be changed from 256 for normal UMTS to 128 in N=2 or ½ BW F-UMTS. In other cases, the SF reduction may not need to accommodate the additional encoded bits per radio frame and the number of bits in the slot format used may be sufficient. An example of this is the DL SF for 3.4 kbps SRB may stay unchanged at 256. However, in this case, the number of repetitions may be less for F-UMTS compared to normal UMTS.

During radio frame segmentation, the 20×Dcr i.e. 20×2 ms=40 ms DCCH TTI may be broken into two 10×Dcr=20 ms radio frames. Table 1 shows an example of downlink and uplink parameters in accordance with various embodiments.

TABLE 1

|  | 1.7 kbps (80 ms TTI) | 3.4 kbps (40 ms TTI) |
|---|---|---|
| DL SF | 256 | 256 |
| DL data bits/slot | 14 | 14 |
| DL data bits/frame | 210 | 210 |
| DL data bits/TTI | 840 | 420 |
| UL SF | 256 | 128 |
| UL data bits/slot | 10 | 20 |
| UL data bits/frame | 150 | 300 |
| UL data bits/TTI | 600 | 600 |

Table 2 shows transport channel parameters for UL:3.4 kbps SRBs for DCCH in accordance with various embodiments.

TABLE 2

| Higher layer | RAB/signalling RB User of Radio Bearer | | SRB#1 RRC | SRB#2 RRC | SRB#3 NAS_DT High priority | SRB#4 NAS_DT Low priority |
|---|---|---|---|---|---|---|
| RLC | Logical channel type | | DCCH | DCCH | DCCH | DCCH |
| | RLC mode | | UM | AM | AM | AM |
| | Payload sizes, bit | | 136 | 128 | 128 | 128 |
| | Max data rate, bps | | 3 400 | 3 200 | 3 200 | 3 200 |
| | AMD/UMD PDU header, bit | | 8 | 16 | 16 | 16 |
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 (alt 0, 148) | | | |
| | TFS | TF0, bits | 0 × 148 (alt 1 × 0) | | | |
| | | TF1, bits | 1 × 148 | | | |
| | TTI, ms | | 20 × Dcr = 20 × 2 | | | |
| | Coding type | | CC 1/3 | | | |
| | CRC, bit | | 16 | | | |
| | Max number of bits/TTI before rate matching | | 516 | | | |
| | Uplink: Max number of bits/radio frame before rate matching | | 258 | | | |
| | RM attribute | | 155 to 185 | | | |

Table 3 shows uplink TFCS parameters in accordance with various embodiments.

TABLE 3

| TFCS size | 2 |
|---|---|
| TFCS | SRBs for DCCH = TF0, TF1 |

Table 4 shows uplink physical parameters in accordance with various embodiments.

TABLE 4

| DPCH Uplink | Min spreading factor | 128 |
|---|---|---|
| | Max number of DPDCH data bits/radio frame | 300 |
| | Puncturing Limit | 1 |

Table 5 shows downlink transport channel parameters for DL:3.4 kbps SRBs for DCCH in accordance with various embodiments.

TABLE 5

| Higher layer | RAB/signalling RB User of Radio Bearer | | SRB#1 RRC | SRB#2 RRC | SRB#3 NAS_DT High priority | SRB#4 NAS_DT Low priority |
|---|---|---|---|---|---|---|
| RLC | Logical channel type | | DCCH | DCCH | DCCH | DCCH |
| | RLC mode | | UM | AM | AM | AM |
| | Payload sizes, bit | | 136 | 128 | 128 | 128 |
| | Max data rate, bps | | 3 400 | 3 200 | 3 200 | 3 200 |
| | AMD/UMD PDU header, bit | | 8 | 16 | 16 | 16 |
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 (alt 0, 148)(note) | | | |
| | TFS | TF0, bits | 0x148 (alt 1x0)(note) | | | |
| | | TF1, bits | 1x148 | | | |
| | TTI, ms | | 20 × Dcr = 20x2 | | | |
| | Coding type | | CC 1/3 | | | |
| | CRC, bit | | 16 | | | |
| | Max number of bits/TTI before rate matching | | 516 | | | |
| | RM attribute | | 155 to 230 | | | |

NOTE:
Alternative parameters may enable the measurement "transport channel BLER" in the UE.

Table 6 shows downlink TFCS parameters in accordance with various embodiments.

TABLE 6

| TFCS size | 2 |
|---|---|
| TFCS | SRBs for DCCH = TF0, TF1 |

Table 7 shows downlink physical channel parameters in accordance with various embodiments.

TABLE 7

| DPCH Downlink | DTX position | | Fixed |
|---|---|---|---|
| | Spreading factor | | 256 |
| | DPCCH | Number of TFCI bits/slot | 0 |
| | | Number of TPC bits/slot | 2 |
| | | Number of Pilot bits/slot | 4 |
| | DPDCH | Number of data bits/slot | 14 |
| | | Number of data bits/frame | 210 |

In either cases where SF may be reduced and where SF may not be reduced, but where repetitions may be reduced, to maintain the same reliability, the transmission power may be increased. For example, some embodiments may increase transmission power roughly by a factor log 2(Dcr)×3 dB i.e. 3 dB for N=2 or ½ BW F-UMTS, which may compensate for the SF reduction or other aspects. Other notation and similar values may be used (e.g., 10 log 10(Dcr), floor(10 log 10(Dcr)), or a table lookup). The same formulation can be used in other cases described herein. This transmission power increase may be done both at the UE 115 and/or base station 105. This increase in transmit power may be over the level required for same Power Spectral Density and hence there may be no increase in absolute terms over normal UMTS.

As the TTI values stays unchanged in absolute time, there may be no additional latency.

Some embodiments provide tools and techniques for stand-alone UL 3.4 kbps DL 3.4 kbps SRBs for DCCH in N=4 or ¼ BW F-UMTS. For example, the TTI of the transport channel may be changed from 40 ms to 10×Dcr ms for N=4 or ¼ BW F-UMTS:

4 SRBs→4 DCCHs→1 DCH using 10×Dcr i.e. 10×4 ms=40 ms TTI.

This scheme may be applied to both the user equipment 115 and/or base station 105. Note that in some respects, 3.4 kbps SRB over N=4 or ¼ BW F-UMTS may be analogous to 13.6 kbps SRB over normal i.e. N=1 UMTS.

The change in TTI value may help in maintaining the SRB rate over F-UMTS. In some cases, the SF may be reduced by factor Dcr (i.e. N) to accommodate the additional encoded bits per radio frame. An example of this is the UL SF for 3.4 kbps SRB may be changed from 256 for normal UMTS and 128 in N=2 or ½ BF-UMTS to 64 in N=4 or ¼ BW F-UMTS. In other cases, the SF reduction may not be needed to accommodate the additional encoded bits per radio frame and the number of bits in the slot format used is sufficient. An example of this is the DL SF for 1.7 kbps SRB may stay unchanged for N=4 or ¼ BW F-UMTS as N=–2-UMTS. In this case, the number of repetitions may be less for F-UMTS compared to normal UMTS.

There may be no need for radio frame segmentation as the 10×Dcr i.e. 10×4 ms=40 ms DCCH TTI fits into one 10×Dc=40 ms radio frame. Table 8 shows an example of downlink and uplink parameters in accordance with various embodiments.

TABLE 8

|  | 1.7 kbps (80 ms TTI) | 3.4 kbps (40 ms TTI) |
| --- | --- | --- |
| DL SF | 256 | 128 |
| DL data bits/slot | 14 | 14 |
| DL data bits/frame | 210 | 510 |
| DL data bits/TTI | 420 | 510 |
| UL SF | 128 | 64 |
| UL data bits/slot | 20 | 40 |
| UL data bits/frame | 300 | 600 |
| UL data bits/TTI | 600 | 600 |

Table 9 shows transport channel parameters for UL:3.4 kbps SRBs for DCCH in accordance with various embodiments.

TABLE 9

| Higher layer | RAB/signalling RB User of Radio Bearer | SRB#1 RRC | SRB#2 RRC | SRB#3 NAS_DT High priority | SRB#4 NAS_DT Low priority |
| --- | --- | --- | --- | --- | --- |
| RLC | Logical channel type | DCCH | DCCH | DCCH | DCCH |
|  | RLC mode | UM | AM | AM | AM |
|  | Payload sizes, bit | 136 | 128 | 128 | 128 |
|  | Max data rate, bps | 3 400 | 3 200 | 3 200 | 3 200 |
|  | AMD/UMD PDU header, bit | 8 | 16 | 16 | 16 |
| MAC | MAC header, bit | 4 | 4 | 4 | 4 |
|  | MAC multiplexing | 4 logical channel multiplexing | | | |
| Layer 1 | TrCH type | DCH | | | |
|  | TB sizes, bit | 148 (alt 0, 148) | | | |
|  | TFS  TF0, bits | 0x148 (alt 1x0) | | | |
|  |    TF1, bits | 1x148 | | | |
|  | TTI, ms | 10 x Dcr = 10x4 | | | |
|  | Coding type | CC 1/3 | | | |
|  | CRC, bit | 16 | | | |
|  | Max number of bits/TTI before rate matching | 516 | | | |
|  | Uplink: Max number of bits/radio frame before rate matching | 516 | | | |
|  | RM attribute | 155 to 185 | | | |

Table 10 shows uplink TFCS parameters in accordance with various embodiments.

TABLE 10

| TFCS size | 2 |
| --- | --- |
| TFCS | SRBs for DCCH = TF0, TF1 |

Table 11 shows uplink physical channel parameters in accordance with various embodiments.

TABLE 11

| DPCH Uplink | Min spreading factor | 64 |
| --- | --- | --- |
|  | Max number of DPDCH data bits/radio frame | 600 |
|  | Puncturing Limit | 1 |

Table 12 shows downlink transport channel parameters for DL:3.4 kbps SRBs for DCCH in accordance with various embodiments.

TABLE 12

| Higher layer | RAB/signalling RB User of Radio Bearer | SRB#1 RRC | SRB#2 RRC | SRB#3 NAS_DT High priority | SRB#4 NAS_DT Low priority |
| --- | --- | --- | --- | --- | --- |
| RLC | Logical channel type | DCCH | DCCH | DCCH | DCCH |
|  | RLC mode | UM | AM | AM | AM |
|  | Payload sizes, bit | 136 | 128 | 128 | 128 |
|  | Max data rate, bps | 3 400 | 3 200 | 3 200 | 3 200 |
|  | AMD/UMD PDU header, bit | 8 | 16 | 16 | 16 |
| MAC | MAC header, bit | 4 | 4 | 4 | 4 |
|  | MAC multiplexing | logical channel multiplexing | | | |
| Layer 1 | TrCH type | DCH | | | |
|  | TB sizes, bit | 148 (alt 0, 148)(note) | | | |
|  | TFS  TF0, bits | 0x148 (alt 1x0)(note) | | | |
|  |    TF1, bits | 1x148 | | | |
|  | TTI, ms | 10 x Dcr = 10x4 | | | |
|  | Coding type | CC 1/3 | | | |
|  | CRC, bit | 16 | | | |
|  | Max number of bits/TTI before rate matching | 516 | | | |
|  | RM attribute | 155 to 230 | | | |

NOTE:
Alternative parameters may enable the measurement "transport channel BLER" in the UE.

Table 13 shows downlink TFCS parameters in accordance with various embodiments.

TABLE 12

| TFCS size | 2 |
| --- | --- |
| TFCS | SRBs for DCCH = TF0, TF1 |

Table 13 shows downlink physical channel parameters in accordance with various embodiments.

TABLE 13

| DPCH Downlink | DTX position | | Fixed |
| --- | --- | --- | --- |
|  | Spreading factor | | 128 |
|  | DPCCH | Number of TFCI bits/slot | 0 |
|  |  | Number of TPC bits/slot | 2 |
|  |  | Number of Pilot bits/slot | 4 |
|  | DPDCH | Number of data bits/slot | 34 |
|  |  | Number of data bits/frame | 510 |

In some embodiments, such as where SF is reduced or where SF is not reduced but repetitions may be reduced, to maintain the same reliability, the transmission power may be increased. In some embodiments, the transmission power may be increase roughly by a factor log 2(Dcr)×3 dB i.e. 6 dB for N=4 or ¼ BW F-UMTS, which may compensate for the SF reduction, for example. This can be done at both the user equipment 115 and/or base station 105. This increase in transmit power may be over the level required for same Power Spectral Density and hence there is no increase in absolute terms over normal UMTS.

In some embodiments as the TTI values stay unchanged in absolute time, there is no additional latency. When SRB rates are maintained for flexible bandwidth carrier systems, such as F-UMTS, there may be different impacts. For example, RLC timers may or may not be impacted. For example, as the TTI for 3.4 kbps SRB may be kept constant for F-UMTS as in UMTS, the RTT may remain unchanged in absolute value. With the TTI and RTT values remaining same, the values of RLC timers may remain same in absolute time.

The tools and techniques for supporting 3.4 kbps SRB over N=2 and N=4 or ¼ BW F-UMTS can be extended in a straightforward way to support 1.7 kbps, or even other rates. For 1.7 kbps, for example, the TTI may be 80 ms instead of 40 ms in normal UMTS and the TTI value can be modified to 40×Dcr=80 ms for N=2 or ½ BW F-UMTS and 20×Dcr=80 ms for N=4 or ¼ BW F-UMTS.

As discussed above, some embodiments may maintain 3.4 kbps stand-alone SRB rate (and/or 1.7 kbps stand-alone SRB rate) at startup in F-UMTS instead of 3.4/Dcr kbps (or 1.7/Dcr kbps). Different factors may impact this decision including, but not limited to:

Stand-alone SRB rate decreased by Dcr may increase call setup time and other signaling procedures.
  If at startup, 3.4 kbps (or 1.7 kbps) stand-alone SRB is not maintained, TTI may remain unchanged in dilated ms while getting stretched in absolute time. The TTI for SRB may be signaled during RRC connection setup. When CS RABs for CS voice are established, the TTI for SRB may be reconfigured so that TTI for SRB may be unchanged in absolute time. Maintaining stand-alone SRB rates from startup may help avoid the reconfiguration of SRB TTI.
  When stand-alone SRB rates are maintained, TTI and RTT may remain the same in absolute time. As a result, the RLC timer values in absolute time remain same. In dilated time, a simple translation is needed Some embodiments provide support for 13.6 kbps stand-alone SRB in Uplink (UL) and Downlink (DL) over Flexible Bandwidth UMTS (F-UMTS). For example, in UMTS, the following Signaling Radio Bearer rates may be supported:
  1.7 kbps: TTI—80 ms, SF 512/256 (DL/UL)
  3.4 kbps: TTI—40 ms, SF 256/256 (DL/UL)
  13.6 kbps: TTI—10 ms, SF 128/64 (DL/UL)
The SRB rates in F-UMTS may become:
  1.7/Dcr kbps: TTI—80×Dcr ms, SF 512/256 (DL/UL)
  3.4/Dcr kbps: TTI—40×Dcr ms, SF 256/256 (DL/UL)
  13.6/Dcr kbps: TTI—10×Dcr ms SF 128/64 (DL/UL)

Some embodiments provide tools and techniques for Stand-alone UL:13.6 DL:13.6 kbps SRBs for DCCH in N=2 or ½ BW F-UMTS. For example, the TTI of the transport channel may be changed from 10 ms to 10×Dcr ms for N=2 or ½ BW F-UMTS:
  4 SRBs→4 DCCHs→1 DCH using 10×Dcr i.e. 10×2 ms=20 ms TTI.
This scheme may be applied at both the user equipment 115 and/or base station 105.

As the TTI is increased from 10 ms in UMTS to 20 ms in N=2 or ½ BW F-UMTS, for example, to maintain the SRB rate, two transport blocks may be concatenated. This implies the SF may be reduced by factor Dcr (i.e. N) to accommodate the additional encoded bits per radio frame. As the TTI and radio frame are both 10×Dcr=10×2=20 ms in this example, there may be no radio frame segmentation and the 1$^{st}$ interleaving may be identity (output=input) as in UMTS.

Figure 5A:
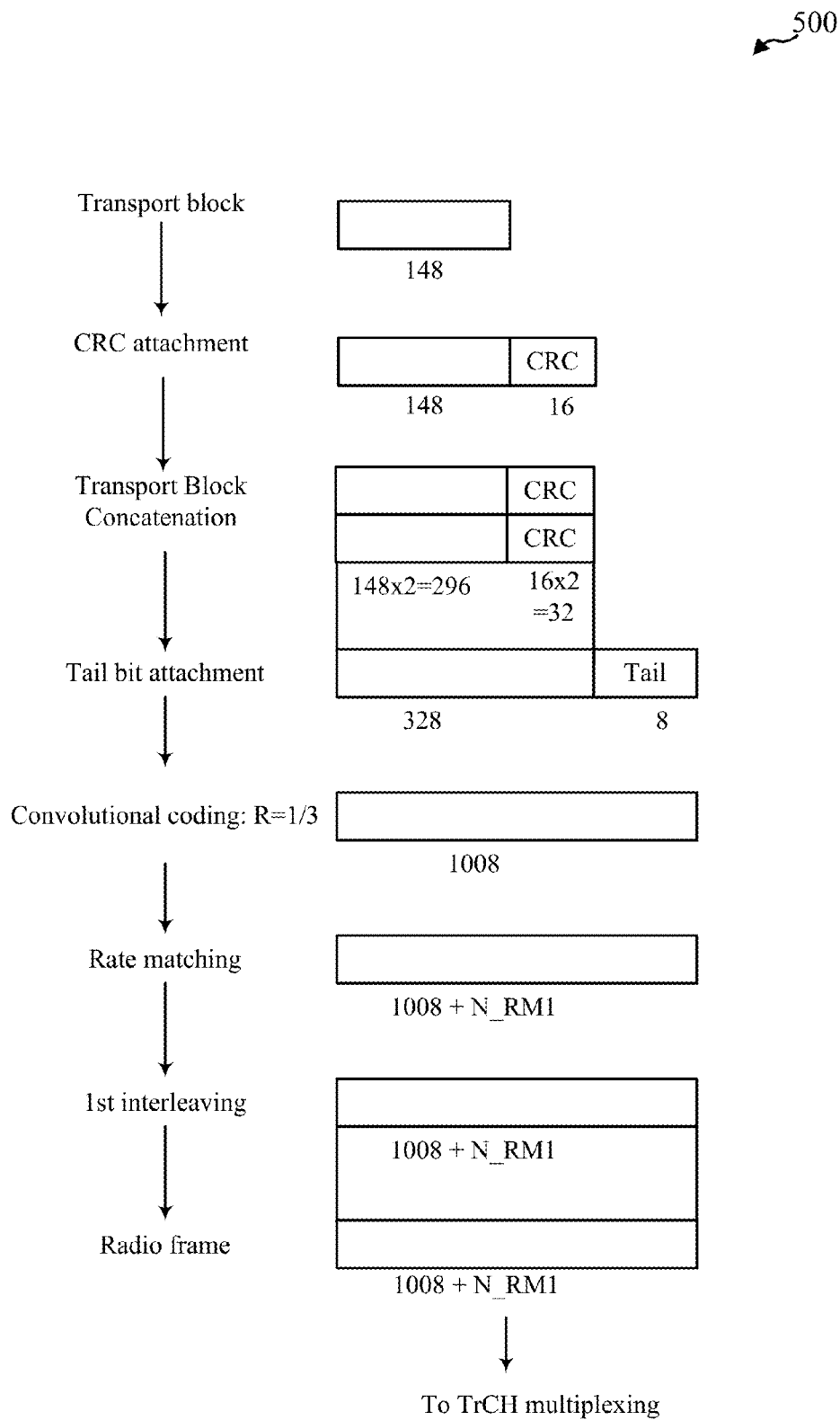
FIG. 5A shows a TrCH procedure for DL: 13.6 kbps SRB in N=2 or ½ BW (Bandwidth) F-UMTS in accordance with various embodiments.
Figure 5B:
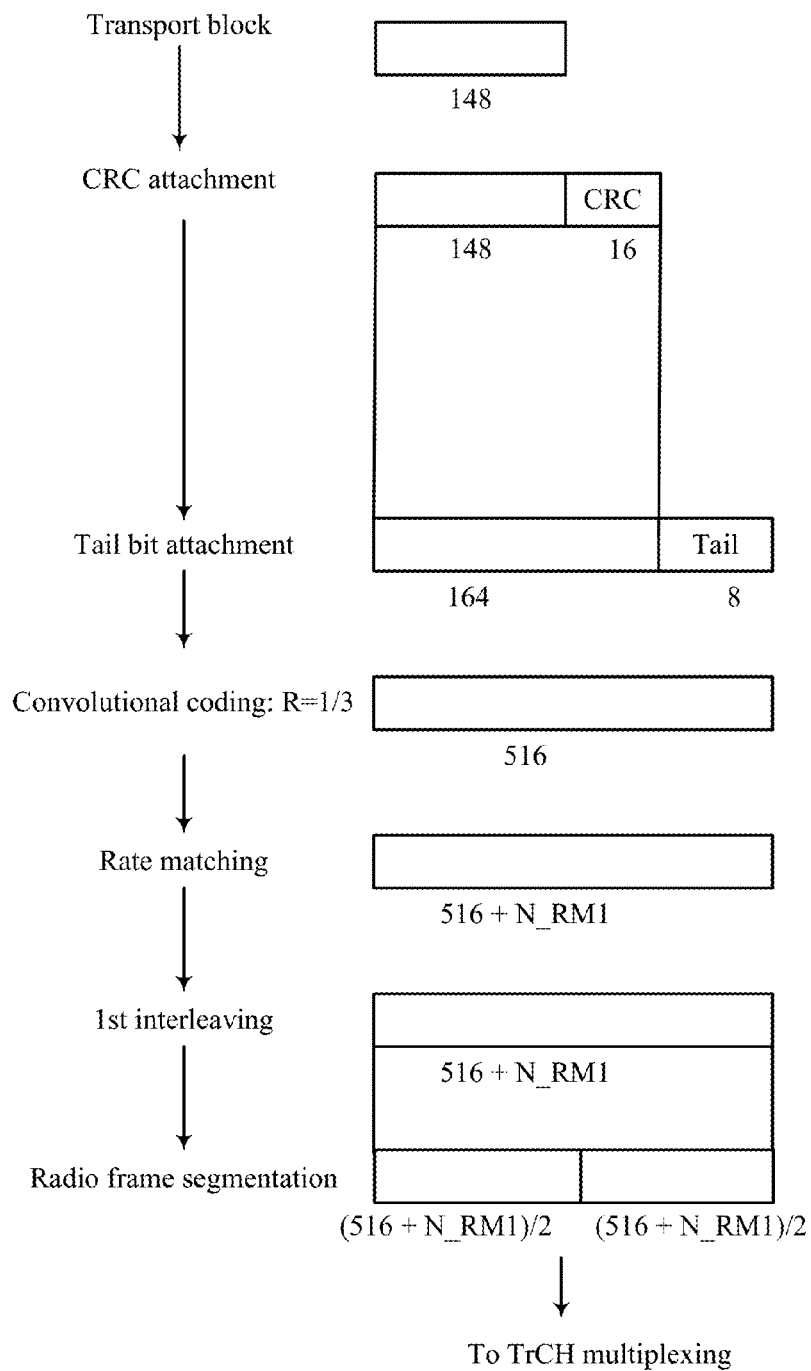
FIG. 5B shows a TrCH procedure for DL: 3.4 kbps SRB in N=2 or ½ BW F-UMTS in accordance with various embodiments.

In some embodiments, all transport blocks in a TTI may be serially concatenated. If the number of bits in a TTI is larger than the maximum size of a code block in question, then code block segmentation may be performed after the concatenation of the transport blocks. The maximum size of the code blocks for convolutional coding may be 504, for example. For N=2 or ½ BW F-UMTS, the code block size may be less than 504 and hence there may be no need for code block segmentation. FIG. 5A shows a TrCH procedure 500 for DL: 13.6 kbps SRB in N=2 or ½ BW F-UMTS in accordance with various embodiments. For comparison, FIG. 5B shows a TrCH procedure 550 for DL: 3.4 kbps SRB in N=2 or ½ BW F-UMTS in accordance with various embodiments.

With SF scaling to maintain SRB rate at 13.6 kbps, there may be the same number of bits in same absolute time. However, as the TTI is increased in absolute time, the Transmission Window Size for RLC AM may be increased as there can be more RLC PDUs sent without getting ACK. It is to be noted that the maximum value of transmission window size as per the spec may be 4K, which may be more than sufficient for 13.6 kbps SRB over N=2 or ½ BW F-UMTS.

It is to be noted that transport blocks from the same logical channel as well as from different logical channels may be concatenated. The reason is that MAC header (4 bits) of each transport block may convey the C/T field (i.e. which logical channel the RLC PDU belongs to). Thus the two transport blocks concatenated could be from same logical channel or from different logical channels. If more than one channel has data, MAC may use the configured logical channel priorities to decide which RLC PDU to send. FIG. 6 shows an example 600 of concatenation of Transport Blocks for 13.6 kbps SRB in N=2 or ½ BW UMTS in accordance with various embodiments.

Two alternative configurations for uplink in accordance with various embodiments are shown Table 14 and Table 15. The configuration of Table 15 may result in reduced TFCS size without any disadvantage. Table 14 shows transport channel parameters for UL:13.6 kbps SRBs for DCCH in N=2 or ½ BW F-UMTS in accordance with various embodiments.

TABLE 14

| Higher layer | RAB/signalling RB User of Radio Bearer | SRB#1 RRC | SRB#2 RRC | SRB#3 NAS_DT High priority | SRB#4 NAS_DT Low priority |
|---|---|---|---|---|---|
| RLC | Logical channel type | DCCH | DCCH | DCCH | DCCH |
|  | RLC mode | UM | AM | AM | AM |
|  | Payload sizes, bit | 136 | 128 | 128 | 128 |
|  | Max data rate, bps | 13 600 | 12 800 | 12 800 | 12 800 |
|  | AMD/UMD PDU header, bit | 8 | 16 | 16 | 16 |
| MAC | MAC header, bit | 4 | 4 | 4 | 4 |
|  | MAC multiplexing | 4 logical channel multiplexing | | | |
| Layer 1 | TrCH type | DCH | | | |
|  | TB sizes, bit | 148 (alt 0, 148) | | | |
|  | TFS  TF0, bits | 0x148, 0x148 (alt 1x0, 1x0) | | | |
|  | TF1, bits | 0x148, 1x148 (alt 1x0, 1x148) | | | |
|  | TF2, bits | 1x148, 0x148 (alt 1x148, 1x0) | | | |
|  | TF3, bits | 1x148, 1x 148 | | | |
|  | TTI, ms | 10 × Dcr = 10 × 2 | | | |
|  | Coding type | CC 1/3 | | | |
|  | CRC, bit | 16 | | | |
|  | Max number of bits/TTI before rate matching | 1008 | | | |
|  | Uplink: Max number of bits/radio frame before rate matching | 1008 | | | |

The TFS in the Table 14 may be a permutation of the different possibilities. In the alternative configuration as shown in Table 15, the TFS may be a combination of the different possibilities. Table 15 provides an alternative transport channel parameters for UL:13.6 kbps SRBs for DCCH in N=2 or ½ BW F-UMTS in accordance with various embodiments.

TABLE 15

| Higher layer | RAB/signalling RB | | SRB#1 | SRB#2 | SRB#3 | SRB#4 |
|---|---|---|---|---|---|---|
| | User of Radio Bearer | | RRC | RRC | NAS_DT High priority | NAS_DT Low priority |
| RLC | Logical channel type | | DCCH | DCCH | DCCH | DCCH |
| | RLC mode | | UM | AM | AM | AM |
| | Payload sizes, bit | | 136 | 128 | 128 | 128 |
| | Max data rate, bps | | 13 600 | 12 800 | 12 800 | 12 800 |
| | AMD/UMD PDU header, bit | | 8 | 16 | 16 | 16 |
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 (alt 0, 148) | | | |
| | TFS | TF0, bits | 0x148 (alt 1x0) | | | |
| | | TF1, bits | 1x148 (alt 1x148, 1x0) | | | |
| | | TF2, bits | 1x148, 1x 148 | | | |
| | TTI, ms | | 10 x Dcr = 10 x 2 | | | |
| | Coding type | | CC 1/3 | | | |
| | CRC, bit | | 16 | | | |
| | Max number of bits/TTI before rate matching | | 1008 | | | |
| | Uplink: Max number of bits/radio frame before rate matching | | 1008 | | | |

For the configuration, the TFCS size is 3 and TFCS entries can be TF0, TF1 or TF2. However, this is not shown again in the TFCS Table 16, which is shown for the configuration considered earlier.

TABLE 16

| TFCS size | 4 |
|---|---|
| TFCS | SRBs for DCCH = TF0, TF1, TF2, TF3 |

Table 17 shows downlink physical channel parameters in accordance with various embodiments.

TABLE 17

| DPCH Uplink | Min spreading factor | 32 |
|---|---|---|
| | Max number of DPDCH data bits/radio frame | 1200 |
| | Puncturing Limit | 1 |

For downlink, Tables 18 and 19 provide alternative configurations in accordance with various embodiments. For example, Table 18 provides transport channel parameters for DL:13.6 kbps SRBs for DCCH in N=2 or ½ BW F-UMTS in accordance with various embodiments.

TABLE 18

| Higher layer | RAB/signalling RB | | SRB#1 | SRB#2 | SRB#3 | SRB#4 |
|---|---|---|---|---|---|---|
| | User of Radio Bearer | | RRC | RRC | NAS_DT High priority | NAS_DT Low priority |
| RLC | Logical channel type | | DCCH | DCCH | DCCH | DCCH |
| | RLC mode | | UM | AM | AM | AM |
| | Payload sizes, bit | | 136 | 128 | 128 | 128 |
| | Max data rate, bps | | 13 600 | 12 800 | 12 800 | 12 800 |
| | AMD/UMD PDU header, bit | | 8 | 16 | 16 | 16 |
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 (alt 0, 148)(note) | | | |
| | TFS | TF0, bits | 0x148, 0x148 (alt 1x0, 1x0) | | | |
| | | TF1, bits | 0x148, 1x148 (alt 1x0, 1x148) | | | |
| | | TF2, bits | 1x148, 0x148 (alt 1x148, 1x0) | | | |
| | | TF3, bits | 1x148, 1x 148 | | | |
| | TTI, ms | | 10 X Dcr = 10 x2 | | | |
| | Coding type | | CC 1/3 | | | |
| | CRC, bit | | 16 | | | |
| | Max number of bits/TTI before rate matching | | 1008 | | | |

NOTE:
alternative parameters may enable the measurement "transport channel BLER" in the UE.

The TFS in the Table 18 may be a permutation of the different possibilities. In the alternative configuration as shown in Table 19, the TFS may be a combination of the different possibilities. For example, Table 19 provides alternative Transport channel parameters for DL:13.6 kbps SRBs for DCCH in N=2 or ½ BW F-UMTS in accordance with various embodiments.

TABLE 19

| Higher layer | RAB/signalling RB | | SRB#1 | SRB#2 | SRB#3 | SRB#4 |
|---|---|---|---|---|---|---|
| | User of Radio Bearer | | RRC | RRC | NAS_DT High priority | NAS_DT Low priority |
| RLC | Logical channel type | | DCCH | DCCH | DCCH | DCCH |
| | RLC mode | | UM | AM | AM | AM |
| | Payload sizes, bit | | 136 | 128 | 128 | 128 |
| | Max data rate, bps | | 13 600 | 12 800 | 12 800 | 12 800 |
| | AMD/UMD PDU header, bit | | 8 | 16 | 16 | 16 |
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 (alt 0, 148)(note) | | | |
| | TFS | TF0, bits | 0x148 (alt 1x0) | | | |
| | | TF1, bits | 1x148 (alt 1x148, 1x0) | | | |
| | | TF2, bits | 1x148, 1x 148 | | | |
| | TTI, ms | | 10 X Dcr = 10 x2 | | | |
| | Coding type | | CC 1/3 | | | |
| | CRC, bit | | 16 | | | |
| | Max number of bits/TTI before rate matching | | 1008 | | | |

NOTE:
alternative parameters may enable the measurement "transport channel BLER" in the UE.

For the configuration of Table 19, the TFCS size may be 3 and TFCS entries can be TF0, TF1 or TF2. However, this may not be shown again in the TFCS Table 20, which is shown for the configuration considered earlier.

TABLE 20

| TFCS size | 4 |
|---|---|
| TFCS | SRBs for DCCH = TF0, TF1, TF2, TF3 |

Table 21 provides physical channel parameters in accordance with various embodiments.

TABLE 21

| DPCH Downlink | DTX position | | Fixed |
|---|---|---|---|
| | Spreading factor | | 64 |
| | DPCCH | Number of TFCI bits/slot | 0 |
| | | Number of TPC bits/slot | 4 |
| | | Number of Pilot bits/slot | 8 |
| | DPDCH | Number of data bits/slot | 68 |
| | | Number of data bits/frame | 1020 |

Table 22 provides DL Slot Format—DPDCH and DPCCH Fields—in accordance with various embodiments.

The slot format 8 used in Table 22 may correspond to slot format 8B in DL DPDCH+DPCCH used in current UMTS specification for compressed mode. For N=2 or ½ BW F-UMTS system, as there may be less bandwidth and the timing and bit requirements of SRB 13.6 kbps may be the same, the spreading factor may be reduced to increase the bits/slot and accordingly bits/frame. However, the channel bitrate or channel symbols rate may stay unchanged as time is dilated for N=2 or ½ BW F-UMTS. The rate matching tuning method also may stay unchanged in N=2 or ½ BW F-UMTS as compared to normal UMTS (i.e. N=1 UMTS). The DL DPCH slot format 8 in Table 22 may be the same as the DL DPCH slot format used for AMR 12.2 kbps for N=2 or ½ BW F-UMTS normal mode.

In UMTS (N=1), Blind Transport Format Detection (BTFD) may be used for DL: 13.6 kbps SRB as no Transport Format Combination Indicator (TFCI) may be sent in downlink. Slot format 8 (SF 128) as shown in Table 23, which shows DL Slot Format—DPDCH and DPCCH Fields, may be used in the DL reference configuration and may have no TFCI. In some cases, the TFCI-existence may be set to False in Downlink.

TABLE 22

| Slot Format #i | Channel Bitrate (kbps) | Channel Symbol Rate (ksps) | SF | Bits/ Slot | DPCCH Bits/Slot | | | DPDCH Bits/Slot | | Transmit slots per radio frame |
|---|---|---|---|---|---|---|---|---|---|---|
| | | | | | $N_{TPC}$ | $N_{TFCI}$ | $N_{Pilot}$ | $N_{Data1}$ | $N_{Data2}$ | |
| 8 | 120/Dcr = 60 | 60/Dcr = 30 | 64 | 80 | 4 | 0 | 8 | 12 | 56 | 15 |

TABLE 23

| Slot Format #i | Channel Bitrate (kbps) | Channel Symbol Rate (ksps) | SF | Bits/ Slot | DPCCH Bits/Slot | | | DPDCH Bits/Slot | | Transmit slots per radio frame |
|---|---|---|---|---|---|---|---|---|---|---|
| | | | | | $N_{TPC}$ | $N_{TFCI}$ | $N_{Pilot}$ | $N_{Data1}$ | $N_{Data2}$ | |
| 8 | 60 | 30 | 128 | 40 | 2 | 0 | 4 | 6 | 28 | 15 |

For N=2, the re-interpreted slot format 8 as shown in Table 23 also may have no TFCI. In some cases, a number of restriction may be utilized be fulfilled for BTFD. In order to allow BTFD for DL 13.6 kbps for N=2 or ½ BW F-UMTS following restriction may need to be changed:

The number of CCTrCH bits received per radio frame is 600×Dcr or less.

This restriction may be similar as for AMR 12.2 kbps over N=2 or ½ BW F-UMTS for DL BTFD operation. Some implementations may be expected to not have a problem to perform BTFD with the larger number of CCTrCH bits received per radio frame.

The number of TFCs may have increased from 2 (for N=1) to 4 for N=2 due to two transport channel blocks being concatenated per radio frame 10×2=40 ms. However, the TFCS size may limit to 64 for BTFD and hence the restriction may not be changed:

the number of transport format combinations of the CCTrCH is 64 or less.

Some embodiments may utilize restrictions such as:

The sum of the transport format set sizes of all explicitly detectable TrCHs, is 16 or less. The transport format set size is defined as the number of transport formats within the transport format set.

For N=2 or ½ BW F-UMTS, the TFS size may be 4 and the TrCH may be explicitly detectable as CRC with non-zero length may be appended to all transport blocks on this TrCHs. Hence the restriction also may not be changed.

TABLE 24

| Slot Format #i | Channel Bitrate (kbps) | Channel Symbol Rate (ksps) | SF | Bits/ Frame | Bits/ Slot | Ndata |
|---|---|---|---|---|---|---|
| 2 | 120/Dcr = 60 | 120/Dcr = 60 | 32 | 1200 | 80 | 80 |

Table 24 provides DL Slot Format—DPDCH and DPCCH Fields—in accordance with various embodiments. It is to be noted that the slot format used in Table 24 may correspond to slot format 3 used in UL DPDCH for current UMTS system. For N=2 or ½ BW F-UMTS system, as there may be less bandwidth and the timing and bit requirements of 13.6 kbps SRB may be the same, the spreading factor may be reduced to increase the bits/slot and accordingly bits/frame. However, the channel bitrate or channel symbols rate may stay unchanged as time is dilated for N=2 or ½ BW F-UMTS. The rate matching tuning method may stay unchanged in N=2 or ½ BW F-UMTS as compared to normal UMTS i.e. N=1 UMTS. The UL DPDCH slot format 2 in Table 25 may be the same as the UL DPDCH slot format used for AMR 12.2 kbps for N=2 or ½ BW F-UMTS normal mode.

Some embodiments provide for different RLC PDU Size for 13.6 kbps SRB over N=2 or ½ BW F-UMTS. For example, RLC SDU size may be 136 bits for RLC UM and 128 bits for RLC AM operation (RLC PDU size is 144 bits in both cases) for 13.6 kbps SRB in UMTS. A baseline solution may keep the RLC SDU and PDU sizes for N=2 or ½ BW F-UMTS same as that on normal UMTS. However, 13.6 kbps SRB over N=2 or ½ BW F-UMTS may use bigger RLC SDU size e.g. 320 bits. In that case, the transport block concatenation may not be used in some cases and padding may be used to make the SDU size 320 bits.

Some embodiments utilize transmission power adjustment. For example, as SF may be reduced in UL and DL by Dcr to maintain the SRB rate, the transmission power may be increased roughly by a factor log 2(Dcr)×3 dB i.e. 3 dB for N=2 or ½ BW F-UMTS to compensate for the SF reduction. This may be done both at the user equipment 115 and/or the base station 105. However, this increase in transmit power may be over the level required for same Power Spectral Density and hence there is no increase in absolute terms over normal UMTS.

Some embodiments may or may not have an impact on latency. For example, with each TTI, two concatenated transport blocks may be delivered to the PHY. After some PHY layer processing (assuming processing time does not scale with Dcr), the over-the-air transmission may be allowed to start only at the next radio frame boundary due to the current spec restriction. However, for N=2 or ½ BW F-UMTS system, as the TTI is 10×Dcr=20 ms and the radio frame may also be 10×Dcr=20 ms, there may be additional latency compared to normal UMTS system.

Some embodiments provide tools and techniques for supporting Stand-alone UL:13.6 DL:13.6 kbps SRBs for DCCH in N=4 or ¼ BW F-UMTS. For example, the TTI of the transport channel may be changed from 10 ms to 10×Dcr=40 ms for N=4 or ¼ BW F-UMTS:

4 SRBs→4 DCCHs→1 DCH using 10×Dcr i.e. 10×4 ms=40 ms TTI.

This scheme may be applied at both the user equipment 115 and/or base station 105.

Figure 7A:
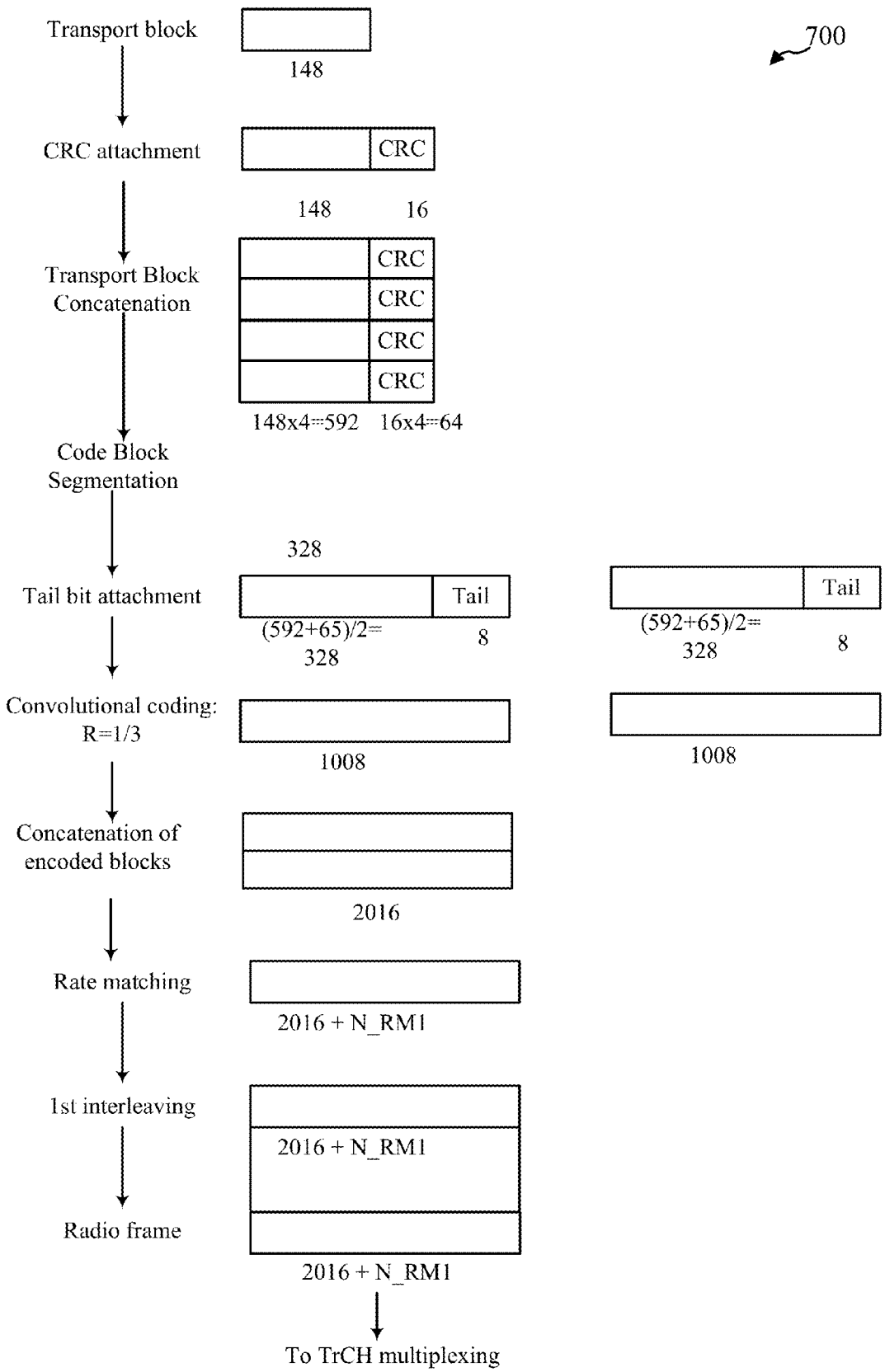
FIG. 7A shows an example of a TrCH procedure for DL: 13.6 kbps SRB in N=4 or ¼ BW F-UMTS in accordance with various embodiments.
Figure 7B:
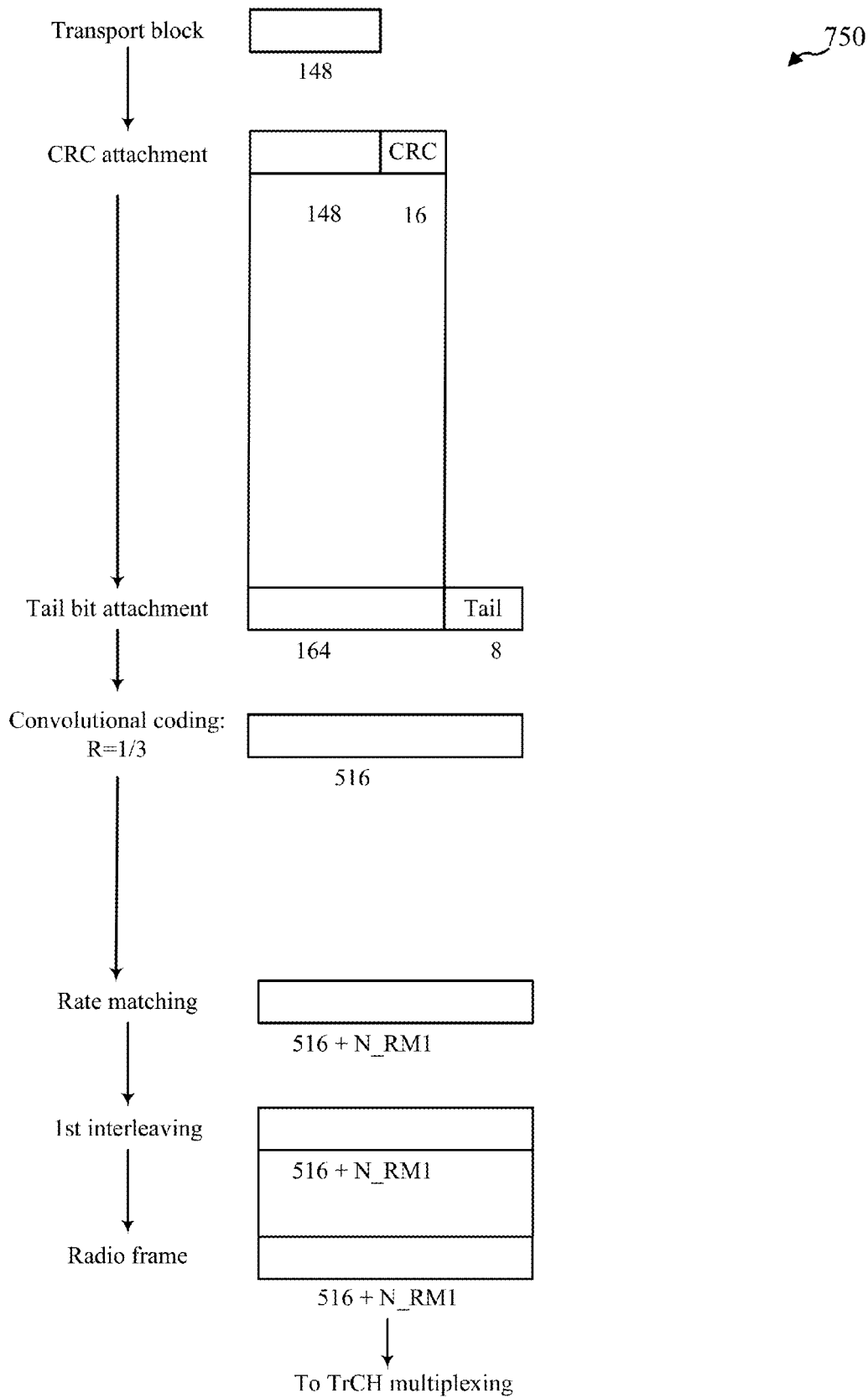
FIG. 7B shows an example of a TrCH procedure for DL: 3.4 kbps SRB in N=4 or ¼ BW F-UMTS in accordance with various embodiments.

As the TTI is increased from 10 ms in UMTS to 40 ms in N=4 or ¼ BW UMTS, to maintain the SRB rate, four transport blocks may be concatenated. The SF may be reduced by factor Dcr (i.e. N) to accommodate the additional encoded bits per radio frame in some cases. As the TTI and radio frame may be both 10×Dcr=10×4=40 ms, there may be no radio frame segmentation and the 1$^{st}$ interleaving may be identity (output=input) as in UMTS. FIG. 7A shows an example 700 of a TrCH procedure for DL: 13.6 kbps SRB in N=4 or ¼ BW F-UMTS in accordance with various embodiments. For comparison, FIG. 7B shows an example of a TrCH procedure 750 for DL: 3.4 kbps SRB in N=4 or ¼ BW F-UMTS in accordance with various embodiments;

Transport blocks in a TTI may be serially concatenated. If the number of bits in a TTI is larger than the maximum size of a code block in question, then code block segmentation may be performed after the concatenation of the transport blocks. The maximum size of the code blocks for convolutional coding may be 504. For N=4 or ¼ BW F-UMTS, the code block size may be more than 504 and code block segmentation may be utilized. After the channel coding for each code block, the encoded blocks may be serially concatenated.

With SF scaling to maintain SRB rate at 13.6 kbps, there may be the same number of bits in same absolute time as in normal UMTS. However, as the TTI may be increased in absolute time, the Transmission Window Size for RLC AM may be increased as there may be more RLC PDUs sent without getting ACK. It is to be noted that the maximum value of transmission window size as per the spec may be 4K, which may be more than sufficient for 13.6 kbps SRB over N=4 or ¼ BW F-UMTS. FIG. 8 shows an example 800 of concatenation of Transport Blocks for 13.6 kbps SRB in N=4 or ¼ BW UMTS in accordance with various embodiments.

It may be noted that transport blocks from the same logical channel as well as from different logical channels may be concatenated. The reason is that MAC header (4 bits) of each transport block may convey the C/T field (i.e. which logical channel the RLC PDU belongs to). Thus the four transport blocks concatenated could be from same logical channel or from different logical channels. If more than one channel has data, MAC may use the configured logical channel priorities to decide which RLC PDU to send.

Tables 26 and 27 provide uplink configurations in accordance with various embodiments. The recommended configuration is the latter as it results in reduced TFCS size without any disadvantage. For example, Table 26 provides transport channel parameters for UL:13.6 kbps SRBs for DCCH in N=4 or ¼ BW F-UMTS in accordance with various embodiments.

TABLE 25

| Higher layer | RAB/signalling RB | | SRB#1 | SRB#2 | SRB#3 | SRB#4 |
|---|---|---|---|---|---|---|
| | User of Radio Bearer | | RRC | RRC | NAS_DT High priority | NAS_DT Low priority |
| RLC | Logical channel type | | DCCH | DCCH | DCCH | DCCH |
| | RLC mode | | UM | AM | AM | AM |
| | Payload sizes, bit | | 136 | 128 | 128 | 128 |
| | Max data rate, bps | | 13 600 | 12 800 | 12 800 | 12 800 |
| | AMD/UMD PDU header, bit | | 8 | 16 | 16 | 16 |
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 (alt 0, 148) | | | |
| | TFS | TF0, bits | 0x148, 0x148, 0x148, 0x148 (alt 1x0, 1x0, 1x0, 1x0) | | | |
| | | TF1, bits | 0x148, 0x148, 0x148, 1x148 (alt 1x0, 1x0, 1x0, 1x148) | | | |
| | | TF2, bits | 0x148, 0x148, 1x148, 0x148 (alt 1x0, 1x0, 1x148, 1x0) | | | |
| | | TF3, bits | 0x148, 0x148, 1x148, 1x 148 (alt 1x0, 1x0, 1x148, 1x148) | | | |
| | | TF4, bits | 0x148, 1x148, 0x148, 0x148 (alt 1x0, 1x148, 1x0, 1x0) | | | |
| | | TF5, bits | 0x148, 1x148, 0x148, 1x148 (alt 1x0, 1x148, 1x0, 1x148) | | | |
| | | TF6, bits | 0x148, 1x148, 1x148, 0x148 (alt 1x0, 1x148, 1x148, 1x0) | | | |
| | | TF7, bits | 0x148, 1x148, 1x148, 1x148 (alt 1x0, 1x148, 1x148, 1x148) | | | |
| | | TF8, bits | 1x148, 0x148, 0x148, 0x148 (alt 1x148, 1x0, 1x0, 1x0) | | | |
| | | TF9, bits | 1x148, 0x148, 0x148, 1x148 (alt 1x148, 1x0, 1x0, 1x148) | | | |
| | | TF10, bits | 1x148, 0x148, 1x148, 0x148 (alt 1x148, 1x0, 1x148, 1x0) | | | |
| | | TF11, bits | 1x148, 0x148, 1x148, 1x148 (alt 1x148, 1x0, 1x148, 1x148) | | | |
| | | TF12, bits | 1x148, 1x148, 0x148, 0x148 (alt 1x148, 1x148, 1x0, 1x0) | | | |
| | | TF13, bits | 1x148, 1x148, 0x148, 1x148 (alt 1x148, 1x148, 1x0, 1x148) | | | |
| | | TF14, bits | 1x148, 1x148, 1x148, 0x148 (alt 1x148, 1x148, 1x148, 1x0) | | | |
| | | TF15, bits | 1x148, 1x148, 1x148, 1x148 (alt 1x148, 1x148, 1x148, 1x148) | | | |
| | TTI, ms | | 10 x Dcr = 10 x 4 | | | |
| | Coding type | | CC 1/3 | | | |
| | CRC, bit | | 16 | | | |
| | Max number of bits/TTI before rate matching | | 2016 | | | |
| | Uplink: Max number of bits/radio frame before rate matching | | 2016 | | | |

The TFS in Table 25 may be a permutation of the different possibilities. In an alternative configuration as shown in Table 26, the TFS may be a combination of the different possibilities. For example, Table 26 provides alternative transport channel parameters for UL:13.6 kbps SRBs for DCCH in N=4 or ¼ BW F-UMTS in accordance with various embodiments.

TABLE 26

| Higher layer | RAB/signalling RB | | SRB#1 | SRB#2 | SRB#3 | SRB#4 |
|---|---|---|---|---|---|---|
| | User of Radio Bearer | | RRC | RRC | NAS_DT High priority | NAS_DT Low priority |
| RLC | Logical channel type | | DCCH | DCCH | DCCH | DCCH |
| | RLC mode | | UM | AM | AM | AM |
| | Payload sizes, bit | | 136 | 128 | 128 | 128 |
| | Max data rate, bps | | 13 600 | 12 800 | 12 800 | 12 800 |
| | AMD/UMD PDU header, bit | | 8 | 16 | 16 | 16 |
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 (alt 0, 148) | | | |
| | TFS | TF0, bits | 0x148 (alt 1x0) | | | |
| | | TF1, bits | 1x148 (alt 1x148, 1x0, 1x0, 1x0) | | | |
| | | TF2, bits | 1x148, 1x148 (alt 1x148, 1x148, 1x0, 1x0) | | | |
| | | TF3, bits | 1x148, 1x148, 1x148 (alt 1x148, 1x148, 1x148, 1x0) | | | |
| | | TF4, bits | 1x148, 1x148, 1x148, 1x148 | | | |
| | TTI, ms | | 10 x Dcr = 10 x 4 | | | |
| | Coding type | | CC 1/3 | | | |
| | CRC, bit | | 16 | | | |
| | Max number of bits/TTI before rate matching | | 2016 | | | |
| | Uplink: Max number of bits/radio frame before rate matching | | 2016 | | | |

For Table 26, the TFCS size may be 5 and TFCS entries may be TF0, TF1, TF2, TF3 or TF4. However, this is not shown again in the TFCS Table 27, which is shown for the configuration considered earlier.

TABLE 27

| TFCS size | 16 |
|---|---|
| TFCS | SRBs for DCCH = TF0, TF1, TF2, TF3, TF4, TF5, TF6, TF7, TF8, TF9, TF10, TF11, TF12, TF13, TF14, TF15 |

Table 28 provides uplink physical channel parameters in accordance with various embodiments.

TABLE 28

| DPCH Uplink | Min spreading factor | 16 |
|---|---|---|
| | Max number of DPDCH data bits/radio frame | 2400 |
| | Puncturing Limit | 1 |

Tables 29 and 30 provide configurations for transport channel parameters for DL:13.6 kbps SRBs for DCCH in N=4 or ¼ BW F-UMTS in accordance with various embodiments. The configuration for Table 30 may reduce TFCS size without any disadvantage.

TABLE 29

| Higher layer | RAB/signalling RB | | SRB#1 | SRB#2 | SRB#3 | SRB#4 |
|---|---|---|---|---|---|---|
| | User of Radio Bearer | | RRC | RRC | NAS_DT High priority | NAS_DT Low priority |
| RLC | Logical channel type | | DCCH | DCCH | DCCH | DCCH |
| | RLC mode | | UM | AM | AM | AM |
| | Payload sizes, bit | | 136 | 128 | 128 | 128 |
| | Max data rate, bps | | 3 400 | 3 200 | 3 200 | 3 200 |
| | AMD/UMD PDU header, bit | | 8 | 16 | 16 | 16 |
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 (alt 0, 148)(note) | | | |
| | TFS | TF0, bits | 0 × 148, 0 × 148, 0 × 148, 0 × 148 (alt 1 × 0, 1 × 0, 1 × 0, 1 × 0) | | | |
| | | TF1, bits | 0 × 148, 0 × 148, 0 × 148, 1 × 148 (alt 1 × 0, 1 × 0, 1 × 0, 1 × 148) | | | |
| | | TF2, bits | 0 × 148, 0 × 148, 1 × 148, 0 × 148 (alt 1 × 0, 1 × 0, 1 × 148, 1 × 0) | | | |
| | | TF3, bits | 0 × 148, 0 × 148, 1 × 148, 1 × 148 (alt 1 × 0, 1 × 0, 1 × 148, 1 × 148) | | | |
| | | TF4, bits | 0 × 148, 1 × 148, 0 × 148, 0 × 148 (alt 1 × 0, 1 × 148, 1 × 0, 1 × 0) | | | |
| | | TF5, bits | 0 × 148, 1 × 148, 0 × 148, 1 × 148 (alt 1 × 0, 1 × 148, 1 × 0, 1 × 148) | | | |
| | | TF6, bits | 0 × 148, 1 × 148, 1 × 148, 0 × 148 (alt 1 × 0, 1 × 148, 1 × 148, 1 × 0) | | | |
| | | TF7, bits | 0 × 148, 1 × 148, 1 × 148, 1 × 148 (alt 1 × 0, 1 × 148, 1 × 148, 1 × 148) | | | |
| | | TF8, bits | 1 × 148, 0 × 148, 0 × 148, 0 × 148 (alt 1 × 148, 1 × 0, 1 × 0, 1 × 0) | | | |

TABLE 29-continued

| | |
|---|---|
| TF9, bits | 1 × 148, 0 × 148, 0 × 148, 1 × 148 (alt 1 × 148, 1 × 0, 1 × 0, 1 × 148) |
| TF10, bits | 1 × 148, 0 × 148, 1 × 148, 0 × 148 (alt 1 × 148, 1 × 0, 1 × 148, 1 × 0) |
| TF11, bits | 1 × 148, 0 × 148, 1 × 148, 1 × 148 (alt 1 × 148, 1 × 0, 1 × 148, 1 × 148) |
| TF12, bits | 1 × 148, 1 × 148, 0 × 148, 0 × 148 (alt 1 × 148, 1 × 148, 1 × 0, 1 × 0) |
| TF13, bits | 1 × 148, 1 × 148, 0 × 148, 1 × 148 (alt 1 × 148, 1 × 148, 1 × 0, 1 × 148) |
| TF14, bits | 1 × 148, 1 × 148, 1 × 148, 0 × 148 (alt 1 × 148, 1 × 148, 1 × 148, 1 × 0) |
| TF15, bits | 1 × 148, 1 × 148, 1 × 148, 1 × 148 (alt 1 × 148, 1 × 148, 1 × 148, 1 × 148) |
| TTI, ms | 10 × Dcr = 10 × 4 |
| Coding type | CC 1/3 |
| CRC, bit | 16 |
| Max number of bits/TTI before rate matching | 2016 |
| RM attribute | 155 to 230 |

NOTE:
Alternative parameters may enable the measurement "transport channel BLER" in the UE.

The TFS in the Table 30 may be a permutation of the different possibilities. In Table 31, the TFS may be a combination of the different possibilities.

TABLE 30

| | | SRB#1 | SRB#2 | SRB#3 | SRB#4 |
|---|---|---|---|---|---|
| Higher layer | RAB/signalling RB | SRB#1 | SRB#2 | SRB#3 | SRB#4 |
| | User of Radio Bearer | RRC | RRC | NAS_DT High priority | NAS_DT Low priority |
| RLC | Logical channel type | DCCH | DCCH | DCCH | DCCH |
| | RLC mode | UM | AM | AM | AM |
| | Payload sizes, bit | 136 | 128 | 128 | 128 |
| | Max data rate, bps | 3 400 | 3 200 | 3 200 | 3 200 |
| | AMD/UMD PDU header, bit | 8 | 16 | 16 | 16 |
| MAC | MAC header, bit | 4 | 4 | 4 | 4 |
| | MAC multiplexing | 4 logical channel multiplexing | | | |
| Layer 1 | TrCH type | DCH | | | |
| | TB sizes, bit | 148 (alt 0, 148)(note) | | | |
| | TFS  TF0, bits | 0 × 148 (alt 1 × 0) | | | |
| |        TF1, bits | 1 × 148 (alt 1 × 148, 1 × 0, 1 × 0, 1 × 0) | | | |
| |        TF2, bits | 1 × 148, 1 × 148 (alt 1 × 148, 1 × 148, 1 × 0, 1 × 0) | | | |
| |        TF3, bits | 1 × 148, 1 × 148, 1 × 148 (alt 1 × 148, 1 × 148, 1 × 148, 1 × 0) | | | |
| |        TF4, bits | 1 × 148, 1 × 148, 1 × 148, 1 × 148 | | | |
| | TTI, ms | 10 × Dcr = 10 × 4 | | | |
| | Coding type | CC 1/3 | | | |
| | CRC, bit | 16 | | | |
| | Max number of bits/TTI before rate matching | 2016 | | | |
| | RM attribute | 155 to 230 | | | |

NOTE:
Alternative parameters may enable the measurement "transport channel BLER" in the UE.

For the configuration of Table 30, the TFCS size may be 5 and TFCS entries may be TF0, TF1, TF2, TF3 or TF4. This may not be shown again in the TFCS Table 31, which is shown for the configuration considered earlier.

TABLE 31

| | |
|---|---|
| TFCS size | 16 |
| TFCS | SRBs for DCCH = TF0, TF1, TF2, TF3, TF4, TF5, TF6, TF7, TF8, TF9, TF10, TF11, TF12, TF13, TF14, TF15 |

Table 32 provides downlink physical channel parameters in accordance with various embodiments.

TABLE 32

| | | | |
|---|---|---|---|
| DPCH Downlink | DTX position | | Fixed |
| | Spreading factor | | 32 |
| | DPCCH | Number of TFCI bits/slot | 0 |
| | | Number of TPC bits/slot | 2 |
| | | Number of Pilot bits/slot | 4 |
| | DPDCH | Number of data bits/slot | 34 |
| | | Number of data bits/frame | 510 |

Table 33 provides DL Slot Format—DPDCH and DPCCH Fields—in accordance with various embodiments.

TABLE 33

| Slot Format #i | Channel Bitrate (kbps) | Channel Symbol Rate (ksps) | SF | Bits/ Slot | DPCCH Bits/Slot | | | DPDCH Bits/Slot | | Transmit slots per radio frame |
|---|---|---|---|---|---|---|---|---|---|---|
| | | | | | $N_{TPC}$ | $N_{TFCI}$ | $N_{Pilot}$ | $N_{Data1}$ | $N_{Data2}$ | |
| 8 | 240/Dcr = 60 | 120/Dcr = 30 | 32 | 160 | 8 | 0 | 16 | 24 | 112 | 15 |

The slot format 8 used in Table 33 may not correspond to any slot format in DL DPDCH+DPCCH used in current UMTS specification. However, it may correspond to slot format 8B in DL DPDCH+DPCCH for AMR 12.2 kbps over N=2 or ½ BW F-UMTS in compressed mode and the slot format for AMR 12.2 kbps over N=4 or ¼ BW F-UMTS in normal mode for some embodiments. For N=4 or ¼ BW F-UMTS system, as there may be less bandwidth and the timing and bit requirements of SRB 13.6 kbps may be the same, the spreading factor may be reduced to increase the bits/slot and accordingly bits/frame. The channel bitrate or channel symbols rate may stay unchanged as time may be dilated for N=4 or ¼ BW F-UMTS. The rate matching tuning method may stay unchanged in N=4 or ¼ BW F-UMTS as compared to normal UMTS (i.e. N=1 UMTS or N=2 or ½ BW F-UMTS).

In UMTS (N=1), Blind Transport Format Detection (BTFD) may be used for DL: 13.6 kbps SRB as no Transport Format Combination Indicator (TFCI) may be sent in downlink. Slot format 8 (SF 128) as shown in Table 33 may be used in a DL reference configuration and may have no TFCI in some embodiments. In some cases, the TFCI-existence may be set to False in Downlink.

For N=4, the re-interpreted slot format 8 as shown in Table 33 also may not have TFCI. Some embodiments may put a number of restriction that need to be fulfilled for BTFD. In some embodiments to allow BTFD for SRB 13.6 kbps for N=4 or ¼ BW F-UMTS, the following restriction may be changed:

The number of CCTrCH bits received per radio frame is 600×Dcr or less.

This restriction may be similar as for AMR 12.2 kbps over N=4 or ¼ BW F-UMTS for DL BTFD operation in some embodiments. Some embodiments may not have a problem to perform BTFD with the larger number of CCTrCH bits received per radio frame.

The number of TFCs may be increased from 2 (for N=1) to 16 for N=4 due to four transport channel blocks being concatenated per radio frame 10×4=40 ms. Some embodiments put the TFCS size limit to 64 for BTFD and the restriction may not be changed:

The number of transport format combinations of the CCTrCH is 64 or less.

Some embodiments may utilize the following restriction:

The sum of the transport format set sizes of all explicitly detectable TrCHs, may be 16 or less. The transport format set size may be defined as the number of transport formats within the transport format set.

For N=4 or ¼ BW F-UMTS size may be 16 and the TrCH may be explicitly detectable as CRC with non-zero length is appended to all transport blocks on this TrCHs. Hence the restriction also need not be changed.

Other slot formats may be utilized as alternative slot formats for AMR 12.2 kbps over N=2 or ½ BW F-UMTS. Table 34 provides UL Slot Format—DPDCH Fields—in accordance with various embodiments.

TABLE 34

| Slot Format #i | Channel Bitrate (kbps) | Channel Symbol Rate (ksps) | SF | Bits/ Frame | Bits/ Slot | Ndata |
|---|---|---|---|---|---|---|
| 2 | 240/Dcr = 60 | 120/Dcr = 60 | 16 | 2400 | 160 | 160 |

It may be noted that the slot format used in Table 34 may correspond to slot format 4 used in UL DPDCH current UMTS system. For N=4 or ¼ BW F-UMTS system, as there may be less bandwidth and the timing and bit requirements of 13.6 kbps SRB may be the same, the spreading factor may be reduced to increase the bits/slot and accordingly bits/frame. The channel bitrate or channel symbols rate may stay unchanged as time is dilated for N=4 or ¼ BW F-UMTS. The rate matching tuning method may stay unchanged in N=4 or ¼ BW F-UMTS as compared to normal UMTS i.e. N=1 UMTS or N=2 or ¼ BW F-UMTS.

Some embodiments may utilize different RLC PDU Size for 13.6 kbps SRB over N=2 or ½ BW F-UMTS. For example, RLC SDU size may be 136 bits for RLC UM and 128 bits for RLC AM operation (RLC PDU size is 144 bits in both cases) for 13.6 kbps SRB in UMTS. Some embodiments keep the RLC SDU and PDU sizes for N=2 or ½ BW F-UMTS same as mat on normal UMTS. 13.6 kbps SRB over N=4 or ¼ BW F-UMTS may use bigger RLC SDU size e.g. 320, 640 bits. In the case of 320 bit RLC SDU size, the transport block concatenation may still be needed and padding has to be used to make the SDU size 320 bits. In the case of 640 bit RLC SDU size, the transport block concatenation may not be used and padding may be used to make the SDU size 640 bits.

Some embodiments utilize transmission power adjustment. For example, as SF may be reduced in UL and DL by Dcr to maintain the SRB rate, the transmission power may be increased, such as roughly by a factor log 2(Dcr)×3 dB i.e. 6 dB for N=4 or ¼ BW F-UMTS, which may compensate for the SF reduction. The power adjustment may be done at both the user equipment 115 and/or base station 105. This increase in transmit power may be over the level required for same Power Spectral Density and there may be no increase in absolute terms over normal UMTS.

Some embodiments may or may not have impact on latency. For example, with the TTI, four concatenated transport blocks may be delivered to the PHY. After some PHY layer processing (assuming processing time does not scale with Dcr), the over-the-air transmission may be allowed to start only at the next radio frame boundary due to the current spec restriction. However, for N=4 or ¼ BW F-UMTS system, as the TTI may be 10×Dcr=40 ms and the radio frame may also be 10×Dcr=40 ms, there may be additional latency compared to normal UMTS system. It may be noted that in computing the additional latency UMTS, the processing delay may be assumed to remain constant as in normal UMTS.

Some embodiments provide support for stand-alone UL:13.6/2 DL:13.6/2 kbps SRBs for DCCH in N=4 or ¼ BW F-UMTS. For example, the TTI of the transport channel may be changed from 10 ms to 10×Dcr ms for N=4 or ¼ BW F-UMTS:

4 SRBs→4 DCCHs→1 DCH using 10×Dcr i.e. 10×4 ms=40 ms TTI.

This scheme may be applied at both the user equipment 114 and/or the base station 105.

As the TTI may be increased from 10 ms in UMTS to 40 ms in N=4 or ¼ BW F-UMTS, to maintain the SRB rate as 13.6/2 kbps, two transport blocks may be concatenated as opposed to four transport blocks being concatenated for maintaining 13.6 kbps. The SF may be reduced by factor Dcr/2 (i.e. N) to accommodate the additional encoded bits per radio frame. As the TTI and radio frame are both 10×Dcr=10×4=40 ms, there may be no radio frame segmentation and the 1$^{st}$ interleaving may be identity (output=input) as in UMTS.

Figure 9:
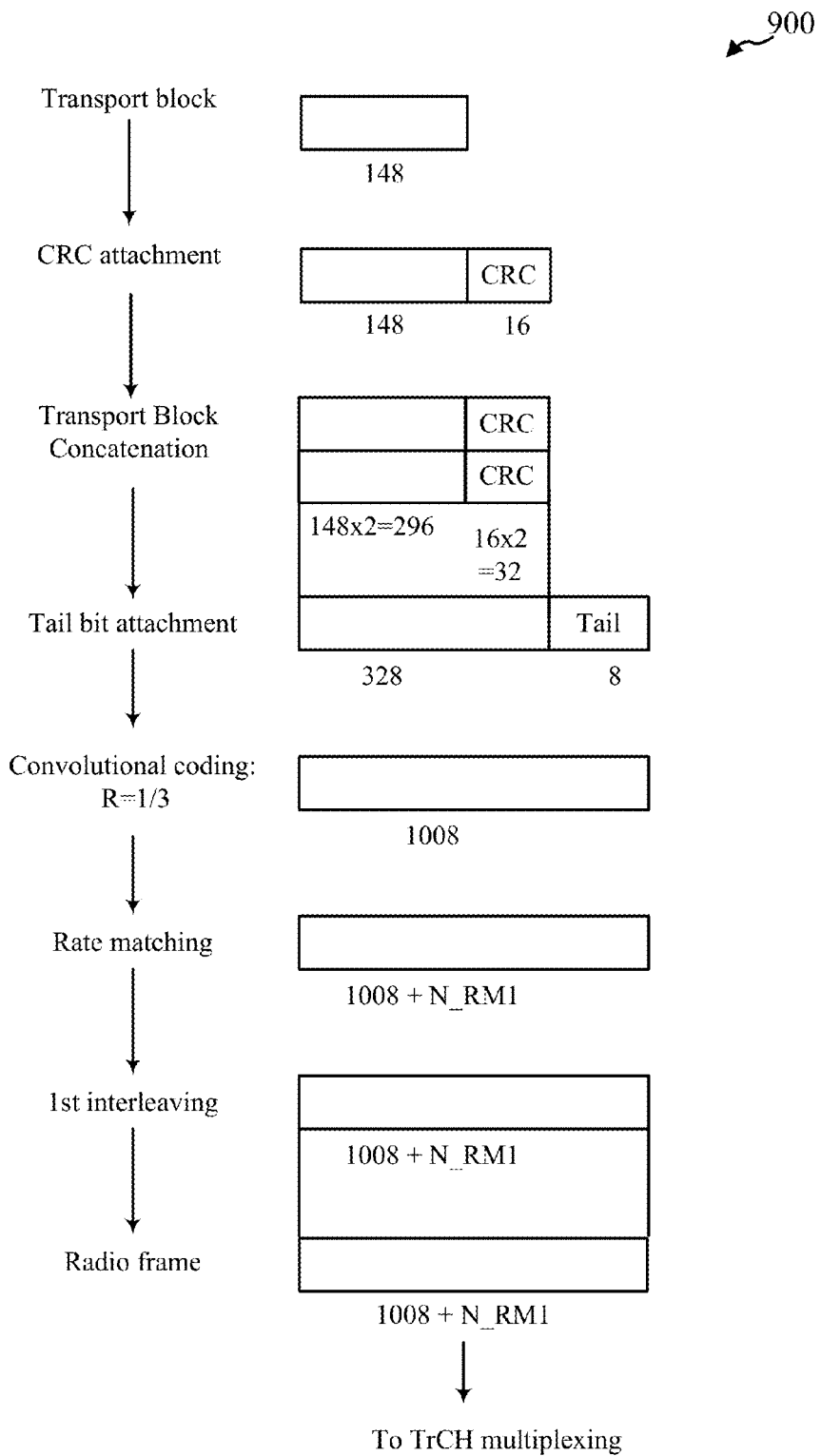
FIG. 9 shows an example of a TrCH procedure for DL: 13.6/2 kbps SRB in N=4 or ¼ BW F-UMTS in accordance with various embodiments.

FIG. 9 shows an example 900 of a TrCH procedure for DL: 13.6/2 kbps SRB in N=4 or ¼ BW F-UMTS in accordance with various embodiments. The blocks in a TTI may be serially concatenated. If the number of bits in a TTI may be larger than the maximum size of a code block in question, then code block segmentation may be performed after the concatenation of the transport blocks. The maximum size of the code blocks for convolutional coding may be 504. For N=4 or ¼ BW F-UMTS, and 13.6/2 kbps SRB, the code block size may be less than 504 and hence there may be no need for code block segmentation. One may note FIG. 9 may be the same as FIG. 5A.

With SF scaling to maintain SRB rate at 13.6/2 kbps, there may be half the number of bits in same absolute time as compared to 13.6 kbps SRB. As the TTI may be increased in absolute time, the Transmission Window Size for RLC AM may be increased as there can be more RLC PDUs sent without getting ACK. It may be noted that the maximum value of transmission window size as per the spec may be 4K, which may be more than sufficient for 13.6/2 kbps SRB over N=4 or ¼ BW F-UMTS.

FIG. 10 shows an example 1000 of concatenation of Transport Blocks for 13.6/2 kbps SRB in N=4 or ¼ BW UMTS in accordance with various embodiments. It may be noted that transport blocks from the same logical channel as well as from different logical channels may be concatenated. The reason is that MAC header (4 bits) of each transport block may convey the C/T field (i.e. which logical channel the RLC PDU belongs to). For example, two transport blocks concatenated may be from same logical channel or from different logical channels. If more than one channel has data, MAC may use the configured logical channel priorities to decide which RLC PDU to send. One may note that FIG. 10 may be the same as FIG. 6.

Table 35 and Table 36 provide alternative uplink configurations in accordance with various embodiments. Table 36 may provide a configuration that may result in reduced TFCS size without any disadvantage. Table 35 provides transport channel parameters for UL:13.6/2 kbps SRBs for DCCH in N=2 or ½ BW F-UMTS in accordance with various embodiments.

TABLE 35

| Higher layer | RAB/signalling RB User of Radio Bearer | | SRB#1 RRC | SRB#2 RRC | SRB#3 NAS_DT High priority | SRB#4 NAS_DT Low priority |
|---|---|---|---|---|---|---|
| RLC | Logical channel type | | DCCH | DCCH | DCCH | DCCH |
| | RLC mode | | UM | AM | AM | AM |
| | Payload sizes, bit | | 136 | 128 | 128 | 128 |
| | Max data rate, bps | | 13 600 | 12 800 | 12 800 | 12 800 |
| | AMD/UMD PDU header, bit | | 8 | 16 | 16 | 16 |
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 (alt 0, 148) | | | |
| | TFS | TF0, bits | 0 × 148, 0 × 148 (alt 1 × 0, 1 × 0) | | | |
| | | TF1, bits | 0 × 148, 1 × 148 (alt 1 × 0, 1 × 148) | | | |
| | | TF2, bits | 1 × 148, 0 × 148 (alt 1 × 148, 1 × 0) | | | |
| | | TF3, bits | 1 × 148, 1 × 148 | | | |
| | TTI, ms | | 10 × Dcr = 10 × 4 | | | |
| | Coding type | | CC 1/3 | | | |
| | CRC, bit | | 16 | | | |
| | Max number of bits/TTI before rate matching | | 1008 | | | |
| | Uplink: Max number of bits/radio frame before rate matching | | 1008 | | | |

TFS in Table 35 may be a permutation of the different possibilities. In the alternative configuration in Table 36, the TFS may be a combination of the different possibilities. Table 36 provides an alternative Transport channel parameters for UL:13.6/2 kbps (i.e., 6.8 kbps) SRBs for DCCH in N=2 or ½ BW F-UMTS in accordance with various embodiments.

TABLE 36

| Higher layer | RAB/signalling RB User of Radio Bearer | SRB#1 RRC | SRB#2 RRC | SRB#3 NAS_DT High priority | SRB#4 NAS_DT Low priority |
|---|---|---|---|---|---|
| RLC | Logical channel type | DCCH | DCCH | DCCH | DCCH |
| | RLC mode | UM | AM | AM | AM |
| | Payload sizes, bit | 136 | 128 | 128 | 128 |
| | Max data rate, bps | 13 600 | 12 800 | 12 800 | 12 800 |
| | AMD/UMD PDU header, bit | 8 | 16 | 16 | 16 |

TABLE 36-continued

| MAC | MAC header, bit | 4 | 4 | 4 | 4 |
|---|---|---|---|---|---|
| | MAC multiplexing | | 4 logical channel multiplexing | | |
| Layer 1 | TrCH type | | DCH | | |
| | TB sizes, bit | | 148 (alt 0, 148) | | |
| | TFS  TF0, bits | | 0 × 148 (alt 1 × 0) | | |
| | TF1, bits | | 1 × 148 (alt 1 × 148, 1 × 0) | | |
| | TF2, bits | | 1 × 148, 1 × 148 | | |
| | TTI, ms | | 10 × Dcr = 10 × 2 | | |
| | Coding type | | CC 1/3 | | |
| | CRC, bit | | 16 | | |
| | Max number of bits/TTI before rate matching | | 1008 | | |
| | Uplink: Max number of bits/radio frame before rate matching | | 1008 | | |

For the configuration of Table 36, the TFCS size may be 3 and TFCS entries may be TF0, TF1 or TF2. However, this may not be shown again in the TFCS Table 37, which is shown for the configuration considered earlier.

TABLE 37

| TFCS size | 4 |
|---|---|
| TFCS | SRBs for DCCH = TF0, TF1, TF2, TF3 |

Table 38 provides uplink physical channel parameters in accordance with various embodiments.

TABLE 38

| DPCH Uplink | Min spreading factor | 32 |
|---|---|---|
| | Max number of DPDCH data bits/radio frame | 1200 |
| | Puncturing Limit | 1 |

Table 39 and Table 40 provide downlink configurations in accordance with various embodiments. The configuration of Table 40 may result in reduced TFCS size without any disadvantage. Table 39 provides transport channel parameters for DL:13.6/2 kbps SRBs for DCCH in N=2 or ½ BW F-UMTS in accordance with various embodiments.

TABLE 39

| Higher layer | RAB/signalling RB | | SRB#1 | SRB#2 | SRB#3 | SRB#4 |
|---|---|---|---|---|---|---|
| | User of Radio Bearer | | RRC | RRC | NAS_DT High priority | NAS_DT Low priority |
| RLC | Logical channel type | | DCCH | DCCH | DCCH | DCCH |
| | RLC mode | | UM | AM | AM | AM |
| | Payload sizes, bit | | 136 | 128 | 128 | 128 |
| | Max data rate, bps | | 13 600 | 12 800 | 12 800 | 12 800 |
| | AMD/UMD PDU header, bit | | 8 | 16 | 16 | 16 |
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 (alt 0, 148)(note) | | | |
| | TFS | TF0, bits | 0 × 148, 0 × 148 (alt 1 × 0, 1 × 0) | | | |
| | | TF1, bits | 0 × 148, 1 × 148 (alt 1 × 0, 1 × 148) | | | |
| | | TF2, bits | 1 × 148, 0 × 148 (alt 1 × 148, 1 × 0) | | | |
| | | TF3, bits | 1 × 148, 1 × 148 | | | |
| | TTI, ms | | 10 × Dcr = 10 × 4 | | | |
| | Coding type | | CC 1/3 | | | |
| | CRC, bit | | 16 | | | |
| | Max number of bits/TTI before rate matching | | 1008 | | | |

NOTE:
alternative parameters may enable the measurement "transport channel BLER" in the UE.

The TFS in Table 39 may be a permutation of the different possibilities. In the alternative configuration as shown in Table 40, the TFS may be a combination of the different possibilities. Table 40 provides alternative Transport channel parameters for DL:13.6/2 kbps SRBs for DCCH in N=2 or ½ BW F-UMTS in accordance with various embodiments.

TABLE 40

| Higher layer | RAB/signalling RB | SRB#1 | SRB#2 | SRB#3 | SRB#4 |
|---|---|---|---|---|---|
| | User of Radio Bearer | RRC | RRC | NAS_DT High priority | NAS_DT Low priority |
| RLC | Logical channel type | DCCH | DCCH | DCCH | DCCH |
| | RLC mode | UM | AM | AM | AM |
| | Payload sizes, bit | 136 | 128 | 128 | 128 |
| | Max data rate, bps | 13 600 | 12 800 | 12 800 | 12 800 |
| | AMD/UMD PDU header, bit | 8 | 16 | 16 | 16 |

TABLE 40-continued

| | | | | | | |
|---|---|---|---|---|---|---|
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 (alt 0, 148)(note) | | | |
| | TFS | TF0, bits | 0 × 148 (alt 1 × 0) | | | |
| | | TF1, bits | 1 × 148 (alt 1 × 148, 1 × 0) | | | |
| | | TF2, bits | 1 × 148, 1 × 148 | | | |
| | TTI, ms | | 10 × Dcr = 10 × 2 | | | |
| | Coding type | | CC 1/3 | | | |
| | CRC, bit | | 16 | | | |
| | Max number of bits/TTI before rate matching | | 1008 | | | |

NOTE:
alternative parameters may enable the measurement "transport channel BLER" in the UE.

For the configuration of Table 40, the TFCS size may be 3 and TFCS entries may be TF0, TF1 or TF2. This may not be shown again in the TFCS Table 41, which may be shown for the configuration considered earlier.

TABLE 41

| | |
|---|---|
| TFCS size | 4 |
| TFCS | SRBs for DCCH = TF0, TF1, TF2, TF3 |

Table 42 provides downlink physical channel parameters in accordance with various embodiments.

TABLE 42

| | | | |
|---|---|---|---|
| DPCH Downlink | DTX position | | Fixed |
| | Spreading factor | | 64 |
| | DPCCH | Number of TFCI bits/slot | 0 |
| | | Number of TPC bits/slot | 4 |
| | | Number of Pilot bits/slot | 8 |
| | DPDCH | Number of data bits/slot | 68 |
| | | Number of data bits/frame | 1020 |

Table 43 provides DL Slot Format—DPDCH and DPCCH Fields—in accordance with various embodiments.

TABLE 43

| Slot Format #i | Channel Bitrate (kbps) | Channel Symbol Rate (ksps) | SF | Bits/ Slot | DPCCH Bits/Slot | | | DPDCH Bits/Slot | | Transmit slots per radio frame |
|---|---|---|---|---|---|---|---|---|---|---|
| | | | | | $N_{TPC}$ | $N_{TFCI}$ | $N_{Pilot}$ | $N_{Data1}$ | $N_{Data2}$ | |
| 8 | 120/Dcr = 30 | 60/Dcr = 15 | 64 | 80 | 4 | 0 | 8 | 12 | 56 | 15 |

The slot format 8 used in Table 43 may be similar to the slot format used for 13.6 kbps SRB for N=2 or ½ BW F-UMTS. It may also be similar to the slot format 8B in DL DPDCH+DPCCH used for AMR 12.2 kbps over UMTS in compressed mode and AMR 12.2 kbps over N=2 or ½ BW F-UMTS in normal mode. The difference with all the above slot formats may be that the channel bit rate (kbps) and channel symbol rate (ksps) may be slowed down by factor of 2 because of more time dilation due to higher Dcr in N=4.

In UMTS (N=1), Blind Transport Format Detection (BTFD) may be used for "DL: 13.6 kbps SRB" as no Transport Format Combination Indicator (TFCI) may be sent in downlink. Slot format 8 (SF 128) may be used in the DL reference configuration in some embodiments and may have no TFCI. In some cases, the TFCI-existence may be set to False in Downlink.

For N=4, the re-interpreted slot format 8 may have no TFCI. A number of restrictions may be fulfilled for BTFD. In some embodiments, in order to allow BTFD for DL 13.6/2 kbps for N=4 or ¼ BW F-UMTS, the following restriction may be changed:

The number of CCTrCH bits received per radio frame is 600×Dcr or less.

The restriction may be the number of CCTrCH bits received per radio frame may be 600×Dcr/2 or less. To maintain 13.6 kbps SRB over N=4 or ¼ BW F-UMTS, the above restriction may be kept in some embodiments. Some embodiments may not have a problem to perform BTFD with the larger number of CCTrCH bits received per radio frame.

The number of TFCs may have increased from 2 (for N=1) to 4 for N=4 or ¼ BW F-UMTS 13.6/2 kbps SRB due to two transport channel blocks being concatenated per radio frame 10×4=40 ms. In some embodiments, the TFCS size limit to 64 for BTFD and the restriction may need not be changed:

The number of transport format combinations of the CCTrCH is 64 or less.

Some embodiments may utilize another restriction:

The sum of the transport format set sizes of all explicitly detectable TrCHs, is 16 or less. The transport format set size is defined as the number of transport formats within the transport format set.

For N=4 or ¼ BW F-UMTS 13.6/2 kbps SRB, the TFS size may be 4 and the TrCH may be explicitly detectable as CRC with non-zero length may be appended to all transport blocks on this TrCHs. The restriction also may not be changed.

Table 44 provides UL Slot Format—DPDCH Fields—in accordance with various embodiments.

TABLE 44

| Slot Format #i | Channel Bitrate (kbps) | Channel Symbol Rate (ksps) | SF | Bits/ Frame | Bits/ Slot | Ndata |
|---|---|---|---|---|---|---|
| 2 | 120/Dcr = 30 | 120/Dcr = 30 | 32 | 1200 | 80 | 80 |

It may be noted that the slot format used in Table 44 may correspond to slot format 3 used in UL DPDCH for current UMTS system with the exception that the channel bit rate (kbps) and channel symbol rate (ksps) may be slowed down by factor of 2 because of more time dilation due to higher Dcr in N=4.

The UL DPDCH slot format 2 may be similar to the UL DPDCH slot format used for AMR 12.2 kbps for N=2 or ½ BW F-UMTS normal mode with the exception that the channel bit rate (kbps) and channel symbol rate (ksps) may be slowed down by factor of 2.

Some embodiments may utilize different RLC PDU Size for 13.6/2 kbps SRB over N=4 or ¼ BW F-UMTS. For example, RLC SDU size may be 136 bits for RLC UM and 128 bits for RLC AM operation (RLC PDU size may be 144 bits in both cases) for 13.6 kbps SRB in UMTS. Some embodiments may keep the RLC SDU and PDU sizes for N=2 or ½ BW F-UMTS same as that on normal UMTS. 13.6/2 kbps SRB over N=4 or ¼ BW F-UMTS may use bigger RLC SDU size e.g. 320 bits. In that case, the transport block concatenation may not be utilized and padding may be used to make the SDU size 320 bits.

Some embodiments utilize transmission power adjustment. As SF may be reduced in UL and DL by Dcr/2 to have the SRB rate as 13.6 kbps, the transmission power may be increased roughly by a factor log 2(Dcr/2)×3 dB i.e. 3 dB for N=4 or ¼ BW F-UMTS, which may compensate for the SF reduction. This may be done at both the user equipment 115 and/or base station 104. This increase in transmit power may be over the level required for same Power Spectral Density and there may be a decrease in absolute terms over that required for 13.6 kbps SRB in normal UMTS. Some embodiments achieve a same SRB rate as over normal bandwidth carrier and may utilize SF reduction by Dcr and transmission power increase accordingly. Some other embodiments achieve scaled SRB rate (e.g. SRB rate over normal BW carrier divided by a factor). The SF reduction may be by Dcr/factor and transmission power accordingly.

Some embodiments may have an impact on latency. For example, for TTI, two concatenated transport channel blocks may be delivered to the PHY. After some PHY layer processing (assuming processing time does not scale with Dcr), the over-the-air transmission may be allowed to start only at the next radio frame boundary due to the current spec restriction. For N=4 or ¼ BW F-UMTS system, as the TTI may be 10×Dcr=40 ms and the radio frame may also be 10×Dcr=40 ms, there may be additional latency compared to normal UMTS system. It may be noted that in computing the additional latency UMTS, the processing delay may be assumed to remain constant as in normal UMTS.

In some embodiments, as discussed above, 13.6 kbps stand-alone SRB rate may be maintained at startup in F-UMTS instead of 13.6/Dcr (i.e. 13.6/2 kbps for N=2 or ½ BW F-UMTS). This may be because stand-alone SRB rate decreased by Dcr may increase call setup time and other signaling procedures, for example. For N=4 or ¼ BW F-UMTS, 13.6 kbps stand-alone SRB as well as 13.6/2 kbps stand-alone SRB may be utilized at start-up instead of 13.6// Dcr (i.e. 13.6/4 kbps for similar reasons).

Some embodiments provide support for stand-alone UL:13.6 DL:13.6 kbpDs SRBs for DCCH in N=2 or ½ BW F-UMTS. For example, a stand-alone UL:13.6 DL:13.6 kbps SRBs for DCCH for normal UMTS may become stand-alone UL:13.6 DL:13.6 kbpDs (13.6/2 kbps) SRBs for DCCH for N=2 or ½ BW F-UMTS due to TTI dilation. The following shows the transport channel parameters, TFCs and physical channel parameters both in UL and DL for 13.6 kbpDs SRB for N=2 or ½ BW F-UMTS in accordance with various embodiments.

For example, Table 45 provides uplink transport channel parameters for UL:13.6 kbps SRBs for DCCH in accordance with various embodiments.

TABLE 45

| Higher layer | RAB/signalling RB | SRB#1 | SRB#2 | SRB#3 | SRB#4 |
|---|---|---|---|---|---|
| | User of Radio Bearer | RRC | RRC | NAS_DT High priority | NAS_DT Low priority |
| RLC | Logical channel type | DCCH | DCCH | DCCH | DCCH |
| | RLC mode | UM | AM | AM | AM |
| | Payload sizes, bit | 136 | 128 | 128 | 128 |
| | Max data rate, bps | 13 600 | 12 800 | 12 800 | 12 800 |
| | AMD/UMD PDU header, bit | 8 | 16 | 16 | 16 |
| MAC | MAC header, bit | 4 | 4 | 4 | 4 |
| | MAC multiplexing | 4 logical channel multiplexing | | | |
| Layer 1 | TrCH type | DCH | | | |
| | TB sizes, bit | 148 (alt 0, 148) | | | |
| | TFS   TF0, bits | 0 × 148 (alt 1 × 0) | | | |
| |        TF1, bits | 1 × 148 | | | |
| | TTI, ms | 10 × Dcr = 10 × 2 | | | |
| | Coding type | CC 1/3 | | | |
| | CRC, bit | 16 | | | |
| | Max number of bits/TTI before rate matching | 516 | | | |
| | Uplink: Max number of bits/radio frame before rate matching | 516 | | | |

Table 46 provides TFCS parameters in accordance with various embodiments.

TABLE 46

| TFCS size | 2 |
|---|---|
| TFCS | SRBs for DCCH = TF0, TF1 |

Table 47 provides uplink physical channel parameters in accordance with various embodiments.

TABLE 47

| DPCH Uplink | Min spreading factor | 64 |
|---|---|---|
| | Max number of DPDCH data bits/radio frame | 600 |
| | Puncturing Limit | 1 |

Table 48 provides downlink transport channel parameters for DL:13.6 kbps SRBs for DCCH in accordance with various embodiments.

TABLE 48

| Higher layer | RAB/signalling RB | | SRB#1 | SRB#2 | SRB#3 | SRB#4 |
|---|---|---|---|---|---|---|
| | User of Radio Bearer | | RRC | RRC | NAS_DT High priority | NAS_DT Low priority |
| RLC | Logical channel type | | DCCH | DCCH | DCCH | DCCH |
| | RLC mode | | UM | AM | AM | AM |
| | Payload sizes, bit | | 136 | 128 | 128 | 128 |
| | Max data rate, bps | | 13 600 | 12 800 | 12 800 | 12 800 |
| | AMD/UMD PDU header, bit | | 8 | 16 | 16 | 16 |
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 (alt 0, 148)(note) | | | |
| | TFS | TF0, bits | 0 × 148 (alt 1 × 0)(note) | | | |
| | | TF1, bits | 1 × 148 | | | |
| | TTI, ms | | 10 x Dcr = 10 × 2 | | | |
| | Coding type | | CC 1/3 | | | |
| | CRC, bit | | 16 | | | |
| | Max number of bits/TTI before rate matching | | 516 | | | |

NOTE:
alternative parameters may enable the measurement "transport channel BLER" in the UE.

Table 49 provides downlink TFCS parameters in accordance with various embodiments.

TABLE 49

| TFCS size | 2 |
|---|---|
| TFCS | SRBs for DCCH = TF0, TF1 |

Table 50 provides downlink physical channel parameters in accordance with various embodiments.

TABLE 50

| DPCH Downlink | DTX position | | Fixed |
|---|---|---|---|
| | Spreading factor | | 128 |
| | DPCCH | Number of TFCI bits/slot | 0 |
| | | Number of TPC bits/slot | 2 |
| | | Number of Pilot bits/slot | 4 |
| | DPDCH | Number of data bits/slot | 34 |
| | | Number of data bits/frame | 510 |

Some embodiments provide tools and techniques for supporting stand-alone UL:13.6 DL:13.6 kbpDs SRBs for DCCH in N=4 or ¼ BW F-UMTS. The stand-alone UL:13.6 DL:13.6 kbps SRBs for DCCH for normal UMTS may become stand-alone UL:13.6 DL:13.6 kbpDs (13.6/4 kbps) SRBs for DCCH for N=4 or ¼ BW F-UMTS due to TTI dilation. The following shows the transport channel parameters, TFCs and physical channel parameters both in UL and DL for 13.6 kbpDs SRB for N=4 or ¼ BW F-UMTS in accordance with various embodiments.

Table 51 provides uplink transport channel parameters for UL:13.6 kbps SRBs for DCCH in accordance with various embodiments.

TABLE 51

| Higher layer | RAB/signalling RB | | SRB#1 | SRB#2 | SRB#3 | SRB#4 |
|---|---|---|---|---|---|---|
| | User of Radio Bearer | | RRC | RRC | NAS_DT High priority | NAS_DT Low priority |
| RLC | Logical channel type | | DCCH | DCCH | DCCH | DCCH |
| | RLC mode | | UM | AM | AM | AM |
| | Payload sizes, bit | | 136 | 128 | 128 | 128 |
| | Max data rate, bps | | 13 600 | 12 800 | 12 800 | 12 800 |
| | AMD/UMD PDU header, bit | | 8 | 16 | 16 | V16 |
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 (alt 0, 148) | | | |
| | TFS | TF0, bits | 0 × 148 (alt 1 × 0) | | | |
| | | TF1, bits | 1 × 148 | | | |
| | TTI, ms | | 10 x Dcr = 10 × 4 | | | |
| | Coding type | | CC 1/3 | | | |
| | CRC, bit | | 16 | | | |
| | Max number of bits/TTI before rate matching | | 516 | | | |
| | Uplink: Max number of bits/radio frame before rate matching | | 516 | | | |

Table 52 provides uplink TFCS parameters in accordance with various embodiments.

TABLE 52

| TFCS size | 2 |
|---|---|
| TFCS | SRBs for DCCH = TF0, TF1 |

Table 53 provides uplink physical channel parameters in accordance with various embodiments.

TABLE 53

| DPCH Uplink | Min spreading factor | 64 |
|---|---|---|
| | Max number of DPDCH data bits/radio frame | 600 |
| | Puncturing Limit | 1 |

Table 54 provides downlink transport channel parameters for DL:13.6 kbps SRBs for DCCH in accordance with various embodiments.

TABLE 54

| | RAB/signalling RB | SRB#1 | SRB#2 | SRB#3 | SRB#4 |
|---|---|---|---|---|---|
| Higher layer | User of Radio Bearer | RRC | RRC | NAS_DT High priority | NAS_DT Low priority |
| RLC | Logical channel type | DCCH | DCCH | DCCH | DCCH |
| | RLC mode | UM | AM | AM | AM |
| | Payload sizes, bit | 136 | 128 | 128 | 128 |
| | Max data rate, bps | 13 600 | 12 800 | 12 800 | 12 800 |
| | AMD/UMD PDU header, bit | 8 | 16 | 16 | 16 |
| MAC | MAC header, bit | 4 | 4 | 4 | 4 |
| | MAC multiplexing | 4 logical channel multiplexing | | | |
| Layer 1 | TrCH type | DCH | | | |
| | TB sizes, bit | 148 (alt 0, 148)(note) | | | |
| | TFS   TF0, bits | 0 × 148 (alt 1 × 0)(note) | | | |
| |        TF1, bits | 1 × 148 | | | |
| | TTI, ms | 10 x Dcr = 10 × 4 | | | |
| | Coding type | CC 1/3 | | | |
| | CRC, bit | 16 | | | |
| | Max number of bits/TTI before rate matching | 516 | | | |

NOTE:
alternative parameters may enable the measurement "transport channel BLER" in the UE.

Table 55 provides downlink TFCS parameters in accordance with various embodiments.

TABLE 55

| TFCS size | 2 |
|---|---|
| TFCS | SRBs for DCCH = TF0, TF1 |

Table 56 provides downlink physical channel parameters in accordance with various embodiments.

TABLE 56

| DPCH Downlink | DTX position | | Fixed |
|---|---|---|---|
| | Spreading factor | | 128 |
| | DPCCH | Number of TFCI bits/slot | 0 |
| | | Number of TPC bits/slot | 2 |
| | | Number of Pilot bits/slot | 4 |
| | DPDCH | Number of data bits/slot | 34 |
| | | Number of data bits/frame | 510 |

Figure 11:
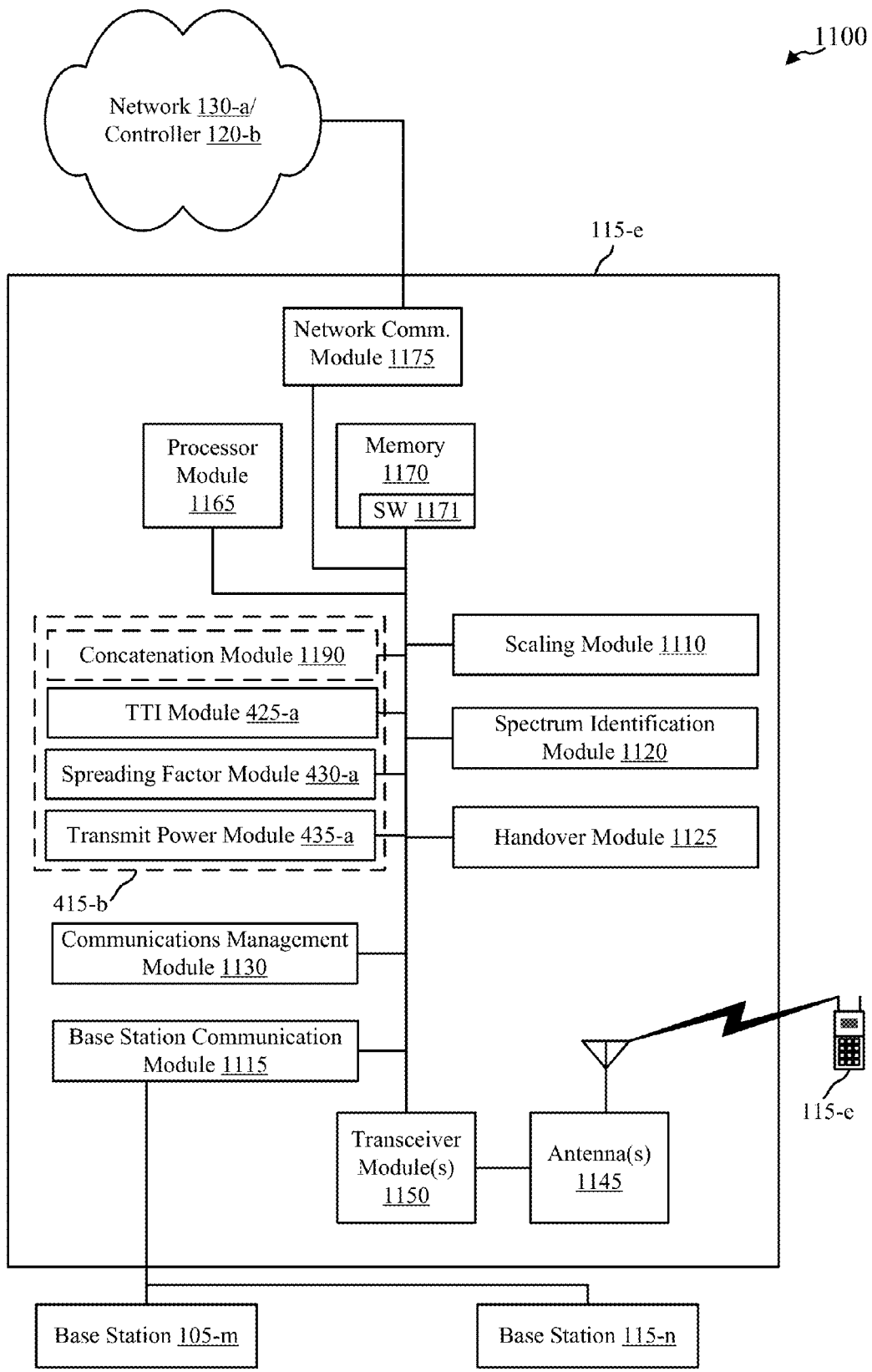
FIG. 11 shows a block diagram of a wireless communications system in accordance with various embodiments.

FIG. 11 shows a block diagram of a communications system 1100 that may be configured for supporting signaling over a flexible bandwidth carrier in accordance with various embodiments. This system 1100 may be an example of aspects of the system 100 depicted in FIG. 1, systems 200 of FIG. 2, system 300 of FIG. 3, and/or system 1300 of FIG. 13. The base station 105-e may include antennas 1145, a transceiver module 1150, memory 1170, and a processor module 1165, which each may be in communication, directly or indirectly, with each other (e.g., over one or more buses). The transceiver module 1150 may be configured to communicate bi-directionally, via the antennas 1145, with the user equipment 115-e, which may be a multi-mode user equipment. The transceiver module 1150 (and/or other components of the base station 105-e) may also be configured to communicate bi-directionally with one or more networks. In some cases, the base station 105-e may communicate with the network 130-a and/or controller 120-a through network communications module 1175. Base station 105-e may be an example of an eNodeB base station, a Home eNodeB base station, a NodeB base station, and/or a Home NodeB base station. Controller 120-b may be integrated into base station 105-e in some cases, such as with an eNodeB base station.

Base station 105-e may also communicate with other base stations 105, such as base station 105-m and base station 105-n. Each of the base stations 105 may communicate with user equipment 115-e using different wireless communications technologies, such as different Radio Access Technologies. In some cases, base station 105-e may communicate with other base stations such as 105-m and/or 105-n utilizing base station communication module 1115. In some embodiments, base station communication module 1115 may provide an X2 interface within an LTE wireless communication technology to provide communication between some of the base stations 105. In some embodiments, base station 105-e may communicate with other base stations through controller 120-b and/or network 130-a.

The memory 1170 may include random access memory (RAM) and read-only memory (ROM). The memory 1170 may also store computer-readable, computer-executable software code 1171 containing instructions that are configured to, when executed, cause the processor module 1165 to perform various functions described herein (e.g., call processing, database management, message routing, etc.). Alternatively, the software 1171 may not be directly executable by the processor module 1165 but be configured to cause the computer, e.g., when compiled and executed, to perform functions described herein.

The processor module 1165 may include an intelligent hardware device, e.g., a central processing unit (CPU) such as those made by Intel® Corporation or AMD®, a microcontroller, an application-specific integrated circuit (ASIC), etc. The processor module 1165 may include a speech encoder (not shown) configured to receive audio via a microphone, convert the audio into packets (e.g., 20 ms in length) representative of the received audio, provide the audio packets to the transceiver module 1150, and provide indications of whether a user is speaking. Alternatively, an encoder may only provide packets to the transceiver module 1150, with the provision or withholding/suppression of the packet itself providing the indication of whether a user is speaking.

The transceiver module 1150 may include a modem configured to modulate the packets and provide the modulated packets to the antennas 1145 for transmission, and to demodulate packets received from the antennas 1145. While some examples of the base station 115-e may include a single antenna 1145, the base station 105-e preferably includes multiple antennas 1145 for multiple links which may support carrier aggregation. For example, one or more links may be used to support macro communications with user equipment 115-e.

According to the architecture of FIG. 11, the base station 105-e may further include a communications management module 1130. The communications management module 1130 may manage communications with other base stations 105. By way of example, the communications management module 1130 may be a component of the base station 105-e in communication with some or all of the other components of the base station 105-e via a bus. Alternatively, functionality of the communications management module 1130 may be implemented as a component of the transceiver module 1150, as a computer program product, and/or as one or more controller elements of the processor module 1165.

The components for base station 105-e may be configured to implement aspects discussed above with respect to device 400-a in FIG. 4A and/or device 400-b of FIG. 4B and may not be repeated here for the sake of brevity. For example, base station 105-e may include a flexible bandwidth carrier signaling module 415-b, which may be an example of flexible bandwidth carrier signaling module 415 of FIG. 4A or flexible bandwidth carrier SRB module 415-a of FIG. 4B. Furthermore, transmission time interval module 425-a may be an example of transmission time interval module 425 of FIG. 4B, spreading factor module 430-a may be an example of spreading factor module 430 of FIG. 4B, and/or transmit power module 435-a may be an example of transmit power module 435 of FIG. 4B. Concatenation module 1190 may provide numerous functions as described with respect to device 400-a of FIG. 4A and/or device 400-b of FIG. 4B.

The base station 105-e may also include a spectrum identification module 1120. The spectrum identification module 1120 may be utilized to identify spectrum available for flexible waveforms. In some embodiments, a handover module 1125 may be utilized to perform handover procedures of the user equipment 115-e from one base station 105 to another. For example, the handover module 1125 may perform a handover procedure of the user equipment 115-e from base station 105-e to another where normal waveforms are utilized between the user equipment 115-e and one of the base stations and flexible waveforms are utilized between the user equipment and another base station. A scaling module 1110 may be utilized to scale and/or alter chip rates to generate flexible waveforms. In some embodiments, the controller 120-b may be configured to implement aspects as described above with respect handover module 1125, and may not be repeated here for the sake of brevity. Base station 105-e and controller 120-b may deployed as separate entities or as a combined entity.

In some embodiments, the transceiver module 1150 in conjunction with antennas 1145, along with other possible components of base station 105-e, may transmit information regarding flexible waveforms and/or scaling factors from the base station 105-e to the user equipment 115-e, to other base stations 105-m/105-n, or core network 130-a. In some embodiments, the transceiver module 1150 in conjunction with antennas 1145, along with other possible components of base station 105-e, may transmit information to the user equipment 115-e, to other base stations 105-m/105-n, or core network 130-a, such as flexible waveforms and/or scaling factors, such that these devices or systems may utilize flexible waveforms.

These components of the device 1100 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 1105 may receive information such as packet, data, and/or signaling information regarding what device 1100 has received or transmitted. The received information may be utilized by the assistance information utilization module 1115 for a variety of purposes. For example, the assistance information utilization module 1115 and/or receiver module 1105 may be configured for receiving assistance information regarding a first flexible bandwidth carrier to facilitate mobility management. The bandwidth scaling factor may be utilized to generate a first flexible bandwidth for the first flexible bandwidth carrier. The assistance information utilization module 1115 may be configured for utilizing the assistance information regarding the first flexible bandwidth carrier to facilitate mobility management.

Figure 12:
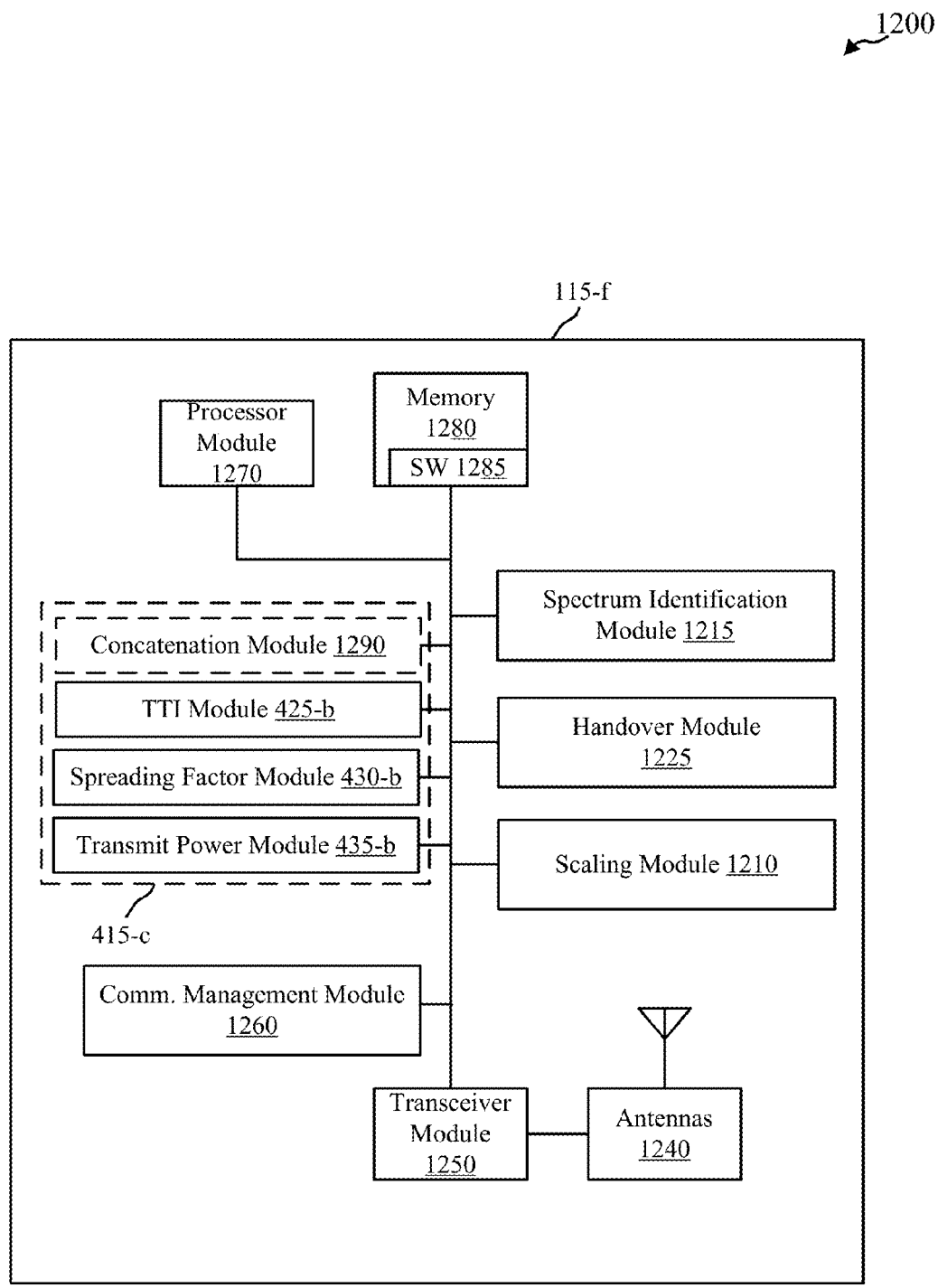
FIG. 12 shows a block diagram of a user equipment in accordance with various embodiments.

FIG. 12 is a block diagram 1200 of a user equipment 115-f configured to support a signaling over a flexible bandwidth carrier in accordance with various embodiments. The user equipment 115-f may have any of various configurations, such as personal computers (e.g., laptop computers, netbook computers, tablet computers, etc.), cellular telephones, PDAs, digital video recorders (DVRs), internet appliances, gaming consoles, e-readers, etc. The user equipment 115-f may have an internal power supply (not shown), such as a small battery, to facilitate mobile operation. In some embodiments, the user equipment 115-f may be the user equipment 115 of FIG. 1, FIG. 2, FIG. 3, FIG. 11, and/or FIG. 13, and/or the device 400-a of FIG. 4A and/or device 400-b of FIG. 4B. The user equipment 115-f may be a multi-mode user equipment. The user equipment 115-f may be referred to as a wireless communications device in some cases.

The user equipment 115-f may include antennas 1240, a transceiver module 1250, memory 1280, and a processor module 1270, which each may be in communication, directly or indirectly, with each other (e.g., via one or more buses). The transceiver module 1250 is configured to communicate bi-directionally, via the antennas 1240 and/or one or more wired or wireless links, with one or more networks, as described above. For example, the transceiver module 1250 may be configured to communicate bi-directionally with base stations 105 of FIG. 1, FIG. 2, FIG. 3, FIG. 11, and/or FIG. 13. The transceiver module 1250 may include a modem configured to modulate the packets and provide the modulated packets to the antennas 1240 for transmission, and to demodulate packets received from the antennas 1240. While the user equipment 115-f may include a single antenna, the user equipment 115-f will typically include multiple antennas 1240 for multiple links.

The memory 1280 may include random access memory (RAM) and read-only memory (ROM). The memory 1280 may store computer-readable, computer-executable software code 1285 containing instructions that are configured to, when executed, cause the processor module 1270 to perform various functions described herein (e.g., call processing, database management, message routing, etc.). Alternatively, the software 1285 may not be directly executable by the processor module 1270 but be configured to cause the computer (e.g., when compiled and executed) to perform functions described herein.

The processor module 1270 may include an intelligent hardware device, e.g., a central processing unit (CPU) such as those made by Intel® Corporation or AMD®, a microcontroller, an application-specific integrated circuit (ASIC), etc. The processor module 1270 may include a speech encoder (not shown) configured to receive audio via a microphone, convert the audio into packets (e.g., 20 ms in length) representative of the received audio, provide the audio packets to the transceiver module 1250, and provide indications of whether a user is speaking. Alternatively, an encoder may only provide packets to the transceiver module 1250, with the provision or withholding/suppression of the packet itself providing the indication of whether a user is speaking.

According to the architecture of FIG. 12, the user equipment 115-$f$ may further include a communications management module 1260. The communications management module 1260 may manage communications with other user equipment 115. By way of example, the communications management module 1260 may be a component of the user equipment 115-$f$ in communication with some or all of the other components of the user equipment 115-$f$ via a bus. Alternatively, functionality of the communications management module 1260 may be implemented as a component of the transceiver module 1250, as a computer program product, and/or as one or more controller elements of the processor module 1270.

The components for user equipment 115-$f$ may be configured to implement aspects discussed above with respect to device 400-$a$ of FIG. 4A and/or device 400-$b$ of FIG. 4B and may not be repeated here for the sake of brevity. For example, user equipment 115-$f$ may include a flexible bandwidth carrier signaling module 415-$c$, which may be an example of flexible bandwidth carrier signaling module 415 of FIG. 4A or flexible bandwidth carrier SRB module 415-$a$ of FIG. 4B. Furthermore, transmission time interval module 425-$a$ may be an example of transmission time interval module 425 of FIG. 4B, spreading factor module 430-$a$ may be an example of spreading factor module 430 of FIG. 4B, and/or transmit power module 435-$a$ may be an example of transmit power module 435 of FIG. 4B. Concatenation module 1190 may provide numerous functions as described with respect to device 400-$a$ of FIG. 4A and/or device 400-$b$ of FIG. 4B.

The user equipment 115-$f$ may also include a spectrum identification module 1215. The spectrum identification module 1215 may be utilized to identify spectrum available for flexible waveforms. In some embodiments, a handover module 1225 may be utilized to perform handover procedures of the user equipment 115-$f$ from one base station to another. For example, the handover module 1225 may perform a handover procedure of the user equipment 115-$f$ from one base station to another where normal and/or flexible waveforms are utilized between the user equipment 115-$f$ and one of the base stations and normal and/or flexible waveforms are utilized between the user equipment and another base station. A scaling module 1210 may be utilized to scale and/or alter chip rates to generate flexible waveforms.

In some embodiments, the transceiver module 1250 in conjunction with antennas 1240, along with other possible components of user equipment 115-$f$, may transmit information regarding flexible waveforms and/or scaling factors from the user equipment 115-$f$ to base stations or a core network. In some embodiments, the transceiver module 1250, in conjunction with antennas 1240 along with other possible components of user equipment 115-$f$, may transmit information, such as flexible waveforms and/or scaling factors, to base stations or a core network such that these devices or systems may utilize flexible waveforms.

Figure 13:
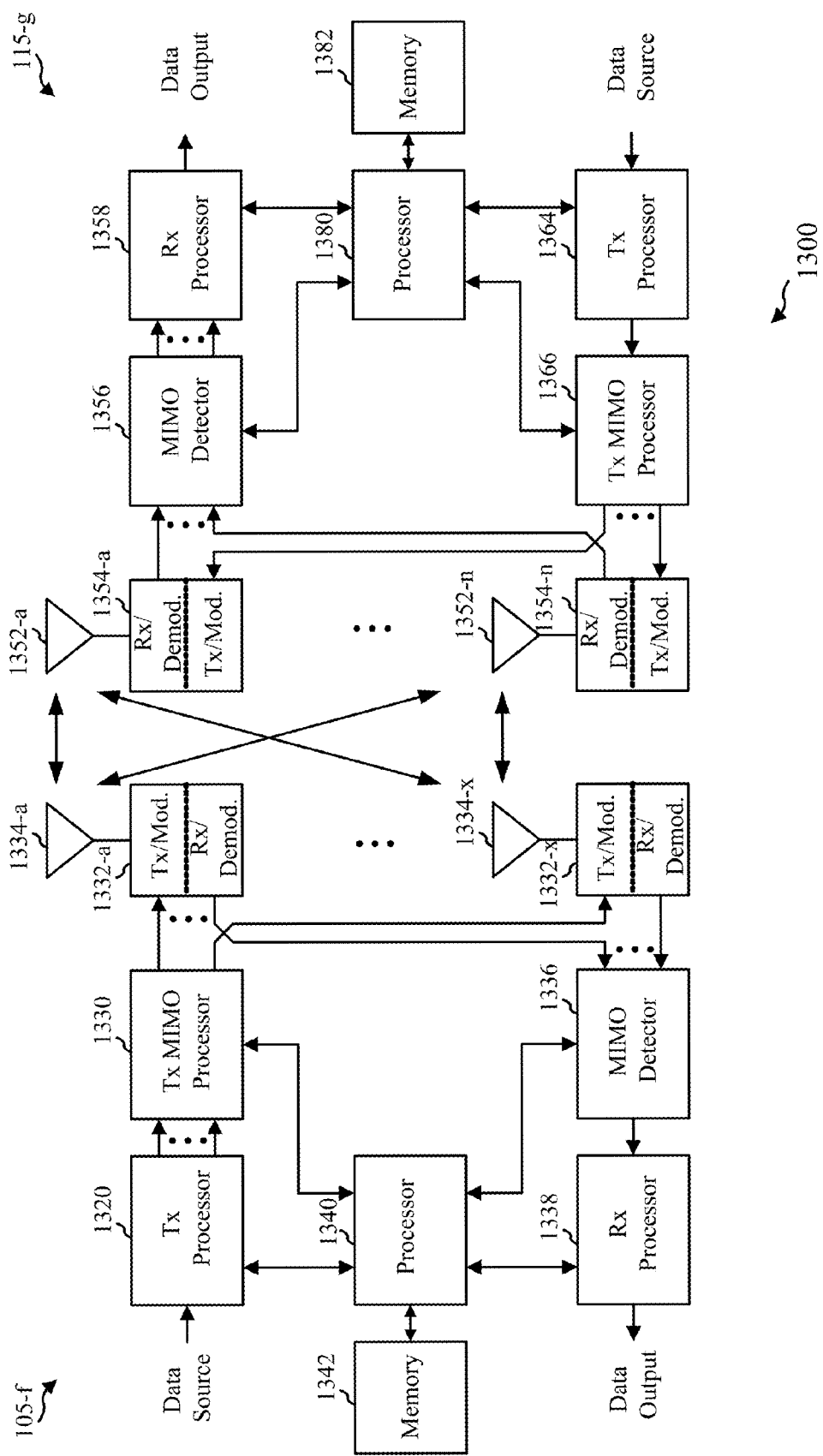
FIG. 13 shows a block diagram of a wireless communications system that includes a base station and a user equipment in accordance with various embodiments.

FIG. 13 is a block diagram of a system 1300 including a base station 105-$e$ and a user equipment 115-$g$ in accordance with various embodiments. This system 1300 may be an example of the system 100 of FIG. 1, systems 200 of FIG. 2, system 300 of FIG. 3, and/or system 1100 of FIG. 11. The base station 105-$f$ may be equipped with antennas 1334-$a$ through 1334-$x$, and the user equipment 115-$g$ may be equipped with antennas 1352-$a$ through 1352-$n$. At the base station 105-$f$, a transmit processor 1320 may receive data from a data source.

The transmitter processor 1320 may process the data. The transmitter processor 1320 may also generate reference symbols, and a cell-specific reference signal. A transmit (TX) MIMO processor 1330 may perform spatial processing (e.g., precoding) on data symbols, control symbols, and/or reference symbols, if applicable, and may provide output symbol streams to the transmit modulators 1332-$a$ through 1332-$x$. Each modulator 1332 may process a respective output symbol stream (e.g., for OFDM, etc.) to obtain an output sample stream. Each modulator 1332 may further process (e.g., convert to analog, amplify, filter, and upconvert) the output sample stream to obtain a downlink (DL) signal. In one example, DL signals from modulators 1332-$a$ through 1332-$x$ may be transmitted via the antennas 1334-$a$ through 1334-$x$, respectively. The transmitter processor 1320 may receive information from a processor 1340. The processor 1340 may be configured to generate flexible waveforms through altering a chip rate and/or utilizing a scaling factor; this may be done dynamically in some cases. The processor 1340 may also provide for different alignment and/or offsetting procedures. The processor 1340 may also utilize scaling and/or chip rate information to perform measurements on the other subsystems, perform handoffs to the other subsystems, perform reselection, etc. The processor 1340 may invert the effects of time stretching associated with the use of flexible bandwidth through parameter scaling. In some embodiments, the processor 1340 may be implemented as part of a general processor, the transmitter processor 1320, and/or the receiver processor 1338.

The processor 1340 and/or other components of base station 105-$f$ may be configured supporting signaling over a flexible bandwidth carrier in accordance with various embodiments. For example, the processor 1340 and/or other components of base station 105-$f$ may identify a signaling rate for signaling over a normal bandwidth carrier may be identified. A unit of time for signaling over the flexible bandwidth carrier may be determined by the processor 1340 and/or other components of base station 105-$f$ to facilitate a signaling rate of the signaling over of the flexible bandwidth carrier that maintains at least the signaling rate for the signaling over the normal bandwidth carrier or a fraction of the signaling rate for the signaling over the normal bandwidth carrier. The fraction of the signaling rate for the signaling over the normal bandwidth carrier may exceed a dilated rate based on a bandwidth scaling factor or chip rate divider for the flexible bandwidth carrier system. The determined unit of time may be utilized by the processor 1340 and/or other components of base station 105-$f$ for the signaling over the flexible bandwidth carrier. Similar techniques may be applied for control channels and/or broadcast channels in general.

In some embodiments, the processor 1340 and/or other components of base station 105-*f* are configured for supporting a signaling, rate, such as an SRB rate, over a flexible bandwidth carrier. The processor 1340 and/or other components of base station 105-*f* may be configured for: identifying a SRB rate for the SRB over a normal bandwidth carrier; determining a TTI for the SRB over the flexible bandwidth carrier that facilitates a SRB rate of the SRB over the flexible bandwidth carrier that maintains at least the SRB rate for the SRB over the normal bandwidth carrier; and/or utilizing the determined TTI for the SRB over the flexible bandwidth carrier. The processor 1340 and/or other components of base station 105-*f* may be further configured for identifying at least bandwidth scaling factor or a chip rate divider for the flexible bandwidth carrier; and/or utilizing at least the bandwidth scaling factor or the chip rate divider to determine the TTI for the SRB over the flexible bandwidth carrier. The processor 1340 and/or other components of base station 105-*f* may be configured in some cases for identifying a TTI for the SRB over the normal bandwidth carrier; and/or utilizing at least a bandwidth scaling factor or a chip rate divider to determine the TTI for the SRB over the flexible bandwidth carrier based on the TTI for the SRB over the normal bandwidth carrier.

The processor 1340 and/or other components of base station 105-*f* may be further configured for reducing a spreading factor of a physical channel carrying the SRB over the flexible bandwidth carrier. Reducing the spreading factor of the physical channel carrying the SRB over the flexible bandwidth carrier may include dividing a spreading factor for a physical channel for the SRB over the normal bandwidth carrier by at least a bandwidth scaling factor or a chip rate divider for the flexible bandwidth carrier. The processor 1340 and/or other components of base station 105-*f* may be further configured for increasing a transmission power for the SRB over the flexible bandwidth carrier. This may compensate for at least the reduced spreading factor. The processor 1340 and/or other components of base station 105-*f* may be further configured for concatenating multiple transport blocks to help maintain the SRB rate for the SRB over the flexible bandwidth carrier. The multiple concatenated transport blocks may include two or more transport blocks from a same logical channel. The multiple concatenated transport blocks may include at least two transport blocks from different logical channels.

The processor 1340 and/or other components of base station 105-*f* may be configured for, but not limited to, SRB rates of 13.6 kbps, 13.6/2 kbps, 3.4 kbps, and/or 1.7 kbps. The processor 1340 and/or other components of base station 105-*f* may be configured to utilize different bandwidth scaling factors and/or chip rate dividers including, but not limited to, 2 and/or 4.

At the user equipment 115-*g*, the user equipment antennas 1352-*a* through 1352-*n* may receive the DL signals from the base station 105-*f* and may provide the received signals to the demodulators 1354-*a* through 1354-*n*, respectively. Each demodulator 1354 may condition (e.g., filter, amplify, downconvert, and digitize) a respective received signal to obtain input samples. Each demodulator 1354 may further process the input samples (e.g., for OFDM, etc.) to obtain received symbols. A MIMO detector 1356 may obtain received symbols from all the demodulators 1354-*a* through 1354-*n*, perform MIMO detection on the received symbols if applicable, and provide detected symbols. A receive (Rx) processor 1358 may process (e.g., demodulate, deinterleave, and decode) the detected symbols, providing decoded data for the user equipment 115-*g* to a data output, and provide decoded control information to a processor 1380, or memory 1382.

On the uplink (UL), at the user equipment 115-*g*, a transmitter processor 1364 may receive and process data from a data source. The transmitter processor 1364 may also generate reference symbols for a reference signal. The symbols from the transmitter processor 1364 may be precoded by a transmit MIMO processor 1366 if applicable, further processed by the demodulators 1354-*a* through 1354-*n* (e.g., for SC-FDMA, etc.), and be transmitted to the base station 105-*f* in accordance with the transmission parameters received from the base station 105-E The transmitter processor 1364 may also be configured to generate flexible waveforms through altering a chip rate and/or utilizing a scaling factor; this may be done dynamically in some cases. The transmitter processor 1364 may receive information from processor 1380. The processor 1380 may provide for different alignment and/or offsetting procedures. The processor 1380 may also utilize scaling and/or chip rate information to perform measurements on the other subsystems, perform handoffs to the other subsystems, perform reselection, etc. The processor 1380 may invert the effects of time stretching associated with the use of flexible bandwidth through parameter scaling. At the base station 105-*f*, the UL signals from the user equipment 115-*g* may be received by the antennas 1334, processed by the demodulators 1332, detected by a MIMO detector 1336 if applicable, and further processed by a receive processor. The receive processor 1338 may provide decoded data to a data output and to the processor 1380. In some embodiments, the processor 1380 may be implemented as part of a general processor, the transmitter processor 1364, and/or the receiver processor 1358.

The processor 1380 and/or other components of user equipment 115-*g* may be configured for supporting signaling over a flexible bandwidth carrier in accordance with various embodiments. A signaling rate for signaling over a normal bandwidth carrier may be identified by the processor 1380 and/or other components of user equipment 115-*g*. A unit of time for signaling over the flexible bandwidth carrier may be determined by the processor 1380 and/or other components of user equipment 115-*g* to facilitate a signaling rate of the signaling over the flexible bandwidth carrier that maintains at least the signaling rate for the signaling over the normal bandwidth carrier or a fraction of the signaling rate for the signaling over the normal bandwidth carrier. The fraction of the signaling rate for the signaling over the normal bandwidth carrier may exceed a dilated rate based on a bandwidth scaling factor or chip rate divider for the flexible bandwidth carrier system. The determined unit of time may be utilized by the processor 1380 and/or other components of user equipment 115-*g* for the signaling over the flexible bandwidth carrier. Similar techniques may be applied for control channels and/or broadcast channels in general.

In some embodiments, the processor 1380 and/or other components of user equipment 115-*g* are configured for supporting a SRB rate over a flexible bandwidth carrier. The processor 1380 and/or other components of user equipment 115-*g* may be configured for: identifying a SRB rate for a SRB over a normal bandwidth carrier; determining a TTI for the SRB over the flexible bandwidth carrier that facilitates a SRB rate of the SRB over the flexible bandwidth carrier that maintains at least the SRB rate for the SRB over the normal bandwidth carrier; and/or utilizing the determined TTI for the SRB over the flexible bandwidth carrier. The processor 1380 and/or other components of user equipment 115-*g* may be further configured for identifying at least bandwidth scaling factor or a chip rate divider for the flexible bandwidth carrier;

and/or utilizing at least the bandwidth scaling factor or the chip rate divider to determine the TTI for the SRB over the flexible bandwidth carrier. The processor 1380 and/or other components of user equipment 115-*g* may be configured in some cases for identifying a TTI for the SRB over the normal bandwidth carrier; and/or utilizing at least a bandwidth scaling factor or a chip rate divider to determine the TTI for the SRB over the flexible bandwidth carrier based on the TTI for the SRB over the normal bandwidth carrier.

The processor 1380 and/or other components of user equipment 115-*g* may be further configured for reducing a spreading factor of a physical channel carrying the SRB over the flexible bandwidth carrier. Reducing the spreading factor of the physical channel carrying the SRB over the flexible bandwidth carrier may include dividing a spreading factor for a physical channel for the SRB over of the normal bandwidth carrier by at least a bandwidth scaling factor or a chip rate divider for the flexible bandwidth carrier. The processor 1380 and/or other components of user equipment 115-*g* may be further configured for increasing a transmission power for the SRB over the flexible bandwidth carrier. This may compensate for at least the reduced spreading factor. The processor 1380 and/or other components of user equipment 115-*g* may be further configured for concatenating multiple transport blocks to maintain the SRB rate for the SRB over the flexible bandwidth carrier. The multiple concatenated transport blocks may include two or more transport blocks from a same logical channel. The multiple concatenated transport blocks may include at least two transport blocks from different logical channels.

The processor 1380 and/or other components of user equipment 115-*g* may be configured for, but not limited to, SRB rates of 13.6 kbps, 13.6/2 kbps, 3.4 kbps, and/or 1.7 kbps. The processor 1380 and/or other components of user equipment 115-*g* may be configured to utilize different bandwidth scaling factors and/or chip rate dividers including, but not limited to, 2 and/or 4.

Figure 14A:
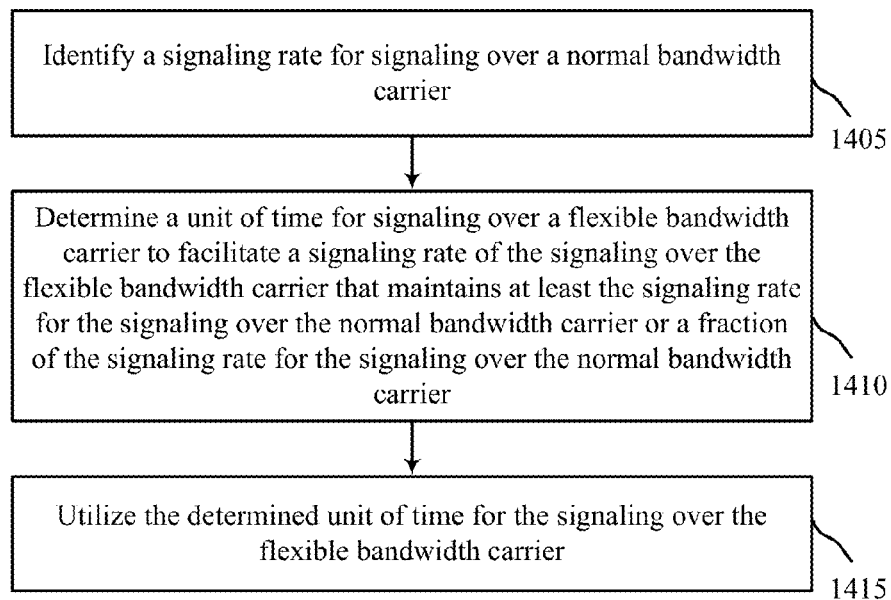
FIG. 14A shows a flow diagram of a method of supporting signaling rates in wireless communications systems in accordance with various embodiments.

Turning to FIG. 14A, a flow diagram of a method 1400-*a* for supporting signaling over a flexible bandwidth carrier for wireless communications systems in accordance with various embodiments. Method 1400-*a* may be implemented utilizing various wireless communications devices including, but not limited to: a base station 105 as seen in FIG. 1, FIG. 2, FIG. 3, FIG. 11, FIG. 11 and/or FIG. 13; a device 400 as seen in FIG. 4; and/or a UE 115 as seen in FIG. 1, FIG. 2, FIG. 3, FIG. 11, FIG. 12, and/or FIG. 13.

At block 1405, a signaling rate for signaling over a normal bandwidth carrier may be identified. At block 1410, a unit of time for a signaling over a flexible bandwidth carrier may be determined that facilitates a signaling rate of the signaling over the flexible bandwidth carrier that maintains at least the signaling rate of the signaling over the normal bandwidth carrier or a fraction of the signaling rate for the signaling over the normal bandwidth carrier. The fraction of the signaling rate for the signaling over the normal bandwidth carrier may exceed a dilated rate based on a bandwidth scaling factor or chip rate divider for the flexible bandwidth carrier system. At block 1415, the determined unit of time for the signaling over the flexible bandwidth carrier may be utilized.

Some embodiments of method 1400-*a* include: identifying at least a bandwidth scaling factor or a chip rate divider for the flexible bandwidth carrier; and/or utilizing at least the bandwidth scaling factor or the chip rate divider to determine the TTI for the SRB over the flexible bandwidth carrier. Some embodiments include: identifying a TTI for the SRB over the normal bandwidth carrier; and/or utilizing at least a bandwidth scaling factor or a chip rate divider to determine the TTI for the SRB over the flexible bandwidth carrier based on the TTI for the SRB over the normal bandwidth carrier.

Some embodiments of method 1400-*a* include reducing a spreading factor of a physical channel carrying the SRB over the flexible bandwidth carrier. Reducing the spreading factor of the physical channel carrying the SRB over the flexible bandwidth carrier may include dividing a spreading factor for a physical channel for the SRB over of the normal bandwidth carrier by at least a bandwidth scaling factor or a chip rate divider for the flexible bandwidth carrier. Some embodiments include increasing a transmission power for the SRB over the flexible bandwidth carrier. In some cases, the transmission power may compensate for at least the reduced spreading factor. The determined TTI may be a valid TTI with respect to a normal bandwidth carrier system.

In some cases, at least the bandwidth scaling factor or the chip rate divider equals 2, a TTI for the SRB over the normal bandwidth carrier is 40 ms, and the TTI for the SRB over the flexible bandwidth carrier is 20 ms. Some aspects may include where at least the bandwidth scaling factor or the chip rate divider equals 4, a TTI for the SRB over the normal bandwidth carrier is 40 ms, and the TTI for the SRB over the flexible bandwidth carrier is 10 ms. For these cases, the SRB rate for the SRB the normal bandwidth carrier may be 3.4 kbps.

Other examples include where at the bandwidth scaling factor or the chip rate divider equals 2, a TTI for the SRB over the normal bandwidth carrier is 80 ms, and the TTI for the SRB over the flexible bandwidth carrier is 40 ms. Further cases include situations where at least the bandwidth scaling factor or the chip rate divider equals 4, a TTI for the SRB over the normal bandwidth carrier is 80 ms, and the TTI for the SRB over the flexible bandwidth carrier is 20 ms. For these cases, the SRB rate for the SRB over the normal bandwidth carrier may be 1.7 kbps.

The flexible bandwidth carrier may include flexible bandwidth UMTS carrier, for example.

Some embodiments of method 1400-*a* include concatenating multiple transport blocks to help maintain the SRB rate. The multiple concatenated transport blocks may include two or more transport blocks from a same logical channel. The multiple concatenated transport blocks may include at least two transport blocks from different logical channels. Some embodiments include reducing the spreading factor of a physical channel carrying the SRB over the flexible bandwidth by the at least the bandwidth scaling factor or the chip rate divider. Some embodiments include increasing a transmission power of the SRB over the flexible bandwidth carrier. The transmission power increase may compensate for at least the reduced spreading factor.

In some cases, at least the bandwidth scaling factor or the chip rate divider equals 2, a TTI for the SRB over the normal bandwidth carrier is 10 ms; and the TTI for the SRB over the flexible bandwidth carrier is 20 ms. Some cases may include where at the bandwidth scaling factor or the chip rate divider equals 4, the TTI for the SRB over the normal bandwidth carrier is 10 ms, and the TTI for the SRB over the flexible bandwidth carrier is 40 ms. For these examples, the SRB rate for the SRB over the normal bandwidth carrier may be 13.6 kbps. Some examples may also include situations where the SRB rate for SRB over the normal bandwidth carrier is 13.6/2 kbps.

Figure 14B:
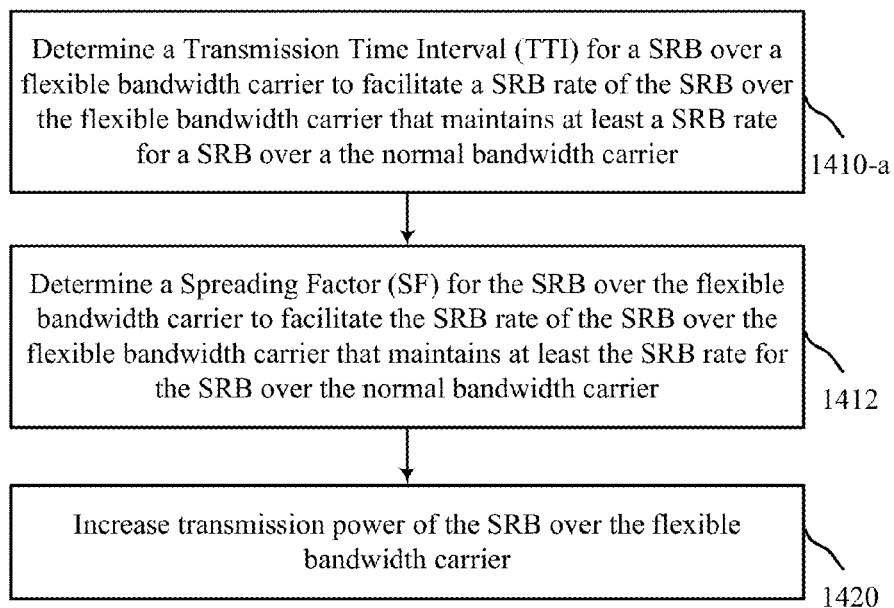
FIG. 14B shows a flow diagram of a method of supporting SRB rates in wireless communications systems in accordance with various embodiments.

Turning to FIG. 14B, a flow diagram of a method 1400-*b* for supporting a SRB over a flexible bandwidth carrier for wireless communications systems in accordance with various embodiments. Method 1400-*b* may be implemented utilizing various wireless communications devices including, but not limited to: a base station 105 as seen in FIG. 1, FIG. 2, FIG. 3, FIG. 11, FIG. 11 and/or FIG. 13; a device 400 as seen in FIG. 4; and/or a UE 115 as seen in FIG. 1, FIG. 2, FIG. 3, FIG. 11, FIG. 12, and/or FIG. 13. Method 1400-b may be an example of aspects of method 1400-a of FIG. 14A.

At block 1410-a, a TTI for a SRB over the flexible bandwidth carrier may be determined that facilitates a SRB rate of the SRB over the flexible bandwidth carrier that maintains at least a SRB rate for a SRB over the normal bandwidth carrier. At block 1412, a Spreading Factor (SF) for the SRB over the flexible bandwidth carrier may be determined to facilitate the SRB rate of the SRB over the flexible bandwidth carrier that maintains at least the SRB rate for the SRB over the normal bandwidth carrier. At block 1420, a transmission power of the SRB over the flexible bandwidth carrier may be increased. In some cases, this may compensate for at least a reduced spreading factor. The transmission power increase may be done to compensate for reduced SF gain when SF may be reduced for flexible bandwidth carrier with respect to normal bandwidth carrier. The SF reduction may increase the number of bits per slot and may maintain the same number of bits for a flexible bandwidth carrier compared to normal bandwidth carrier in a given absolute time. Transmission power increase may also be done when SF is kept constant with respect to normal bandwidth carrier, which may compensate for reduced redundancy due to lower number of bits for a flexible bandwidth carrier compared to normal bandwidth carrier in a given absolute time, for example.

Figure 14C:
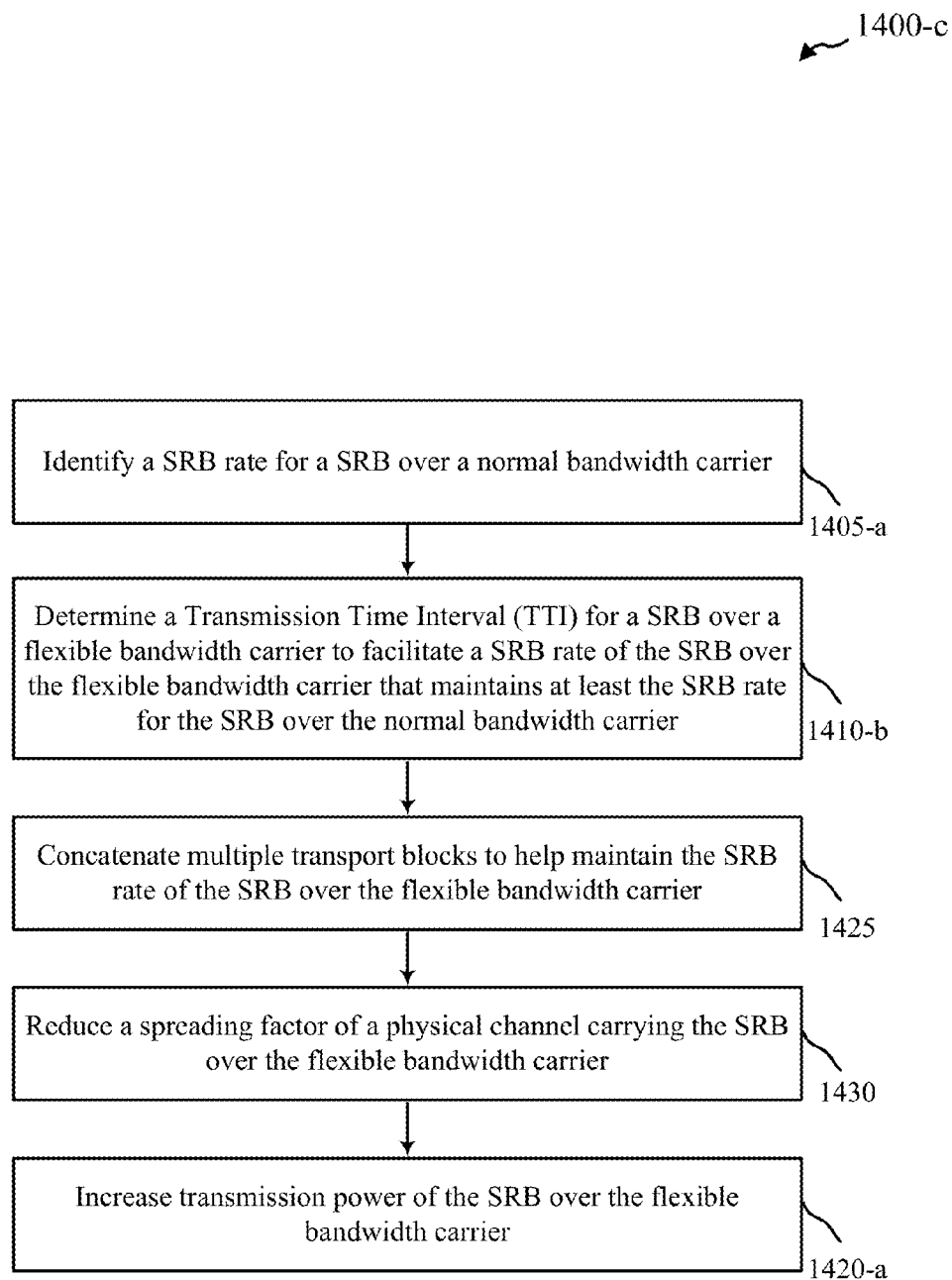
FIG. 14C shows a flow diagram of a method of supporting SRB rates in wireless communications systems in accordance with various embodiments.

Turning to FIG. 14C, a flow diagram of a method 1400-c for support a SRB over a flexible bandwidth carrier for wireless communications systems in accordance with various embodiments. Method 1400-c may be implemented utilizing various wireless communications devices including, but not limited to: a base station 105 as seen in FIG. 1, FIG. 2, FIG. 3, FIG. 11, FIG. 11 and/or FIG. 13; a device 400 as seen in FIG. 4; and/or a UE 115 as seen in FIG. 1, FIG. 2, FIG. 3, FIG. 11, FIG. 12, and/or FIG. 13. Method 1400-c may be an example of aspects of method 1400-a of FIG. 14A.

At block 1405-a, a SRB rate for a SRB over a normal bandwidth carrier may be identified. At block 1410-a, a TTI for a SRB over the flexible bandwidth carrier may be determined that facilitates a SRB rate of the SRB over the flexible bandwidth carrier that maintains at least the SRB rate for the SRB over the normal bandwidth carrier. At block 1425, multiple transport blocks may be concatenated to help maintain the SRB rate of the SRB over the flexible bandwidth carrier. The multiple concatenated transport blocks may include two or more transport blocks from a same logical channel. The multiple concatenated transport blocks may include at least two transport blocks from different logical channels. At block 1430, a spreading factor for a physical channel for the SRB over the flexible bandwidth carrier may be reduced. At block 1420-a, a transmission power of the SRB over the flexible bandwidth carrier may be increased.

Figure 14D:
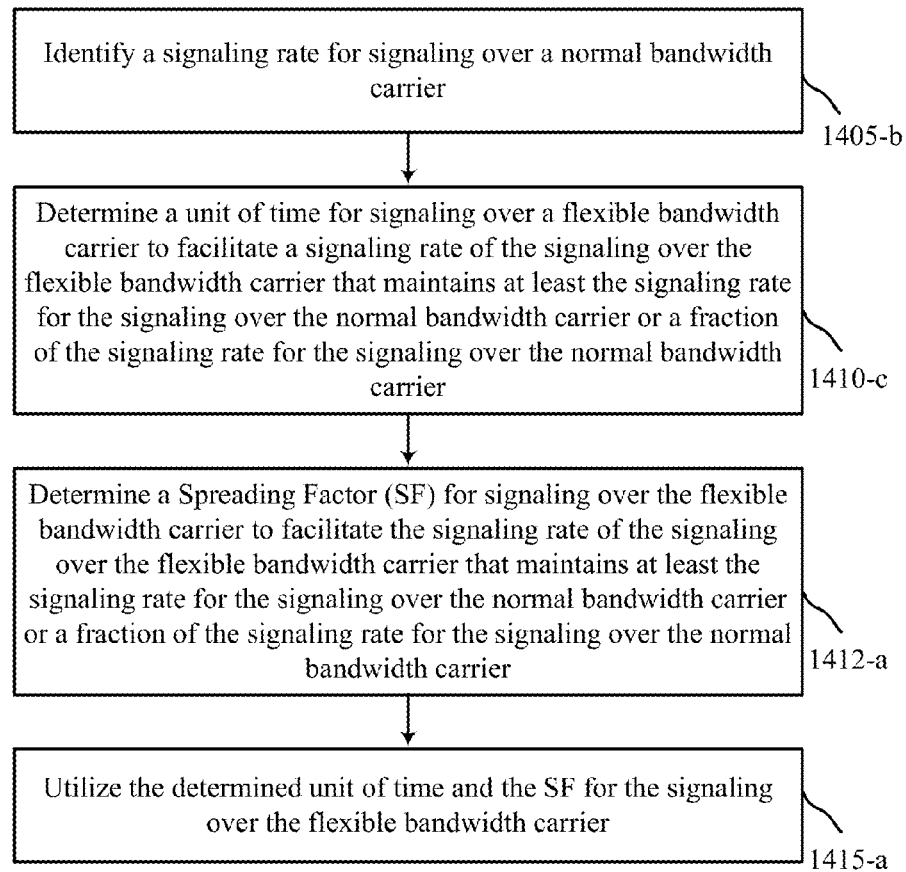
FIG. 14D shows a flow diagram of a method of supporting signaling rates in wireless communications systems in accordance with various embodiments.

Turning to FIG. 14D, a flow diagram of a method 1400-d for supporting signaling over a flexible bandwidth carrier for wireless communications systems in accordance with various embodiments. Method 1400-d may be implemented utilizing various wireless communications devices including, but not limited to: a base station 105 as seen in FIG. 1, FIG. 2, FIG. 3, FIG. 11, FIG. 11 and/or FIG. 13; a device 400 as seen in FIG. 4; and/or a UE 115 as seen in FIG. 1, FIG. 2, FIG. 3, FIG. 11, FIG. 12, and/or FIG. 13. Method 1400-d may be an example of aspects of method 1400-a of FIG. 14A.

At block 1405-b, a signaling rate for signaling over a normal bandwidth carrier may be identified. At block 1410-c, a unit of time for a signaling over a flexible bandwidth carrier may be determined that facilitates a signaling rate of the signaling over the flexible bandwidth carrier that maintains at least the signaling rate of the signaling over the normal bandwidth carrier or a fraction of the signaling rate for the signaling over the normal bandwidth carrier. At block 1412-a, a Spreading Factor (SF) for signaling over the flexible bandwidth carrier may be determined to facilitate the signaling rate of the signaling over the flexible bandwidth carrier that maintains at least the signaling rate for the signaling over the normal bandwidth carrier or a fraction of the signaling rate for the signaling over the normal bandwidth carrier. At block 1415-a, the determined unit of time and the SF for the signaling over the flexible bandwidth carrier may be utilized.

Figure 14E:
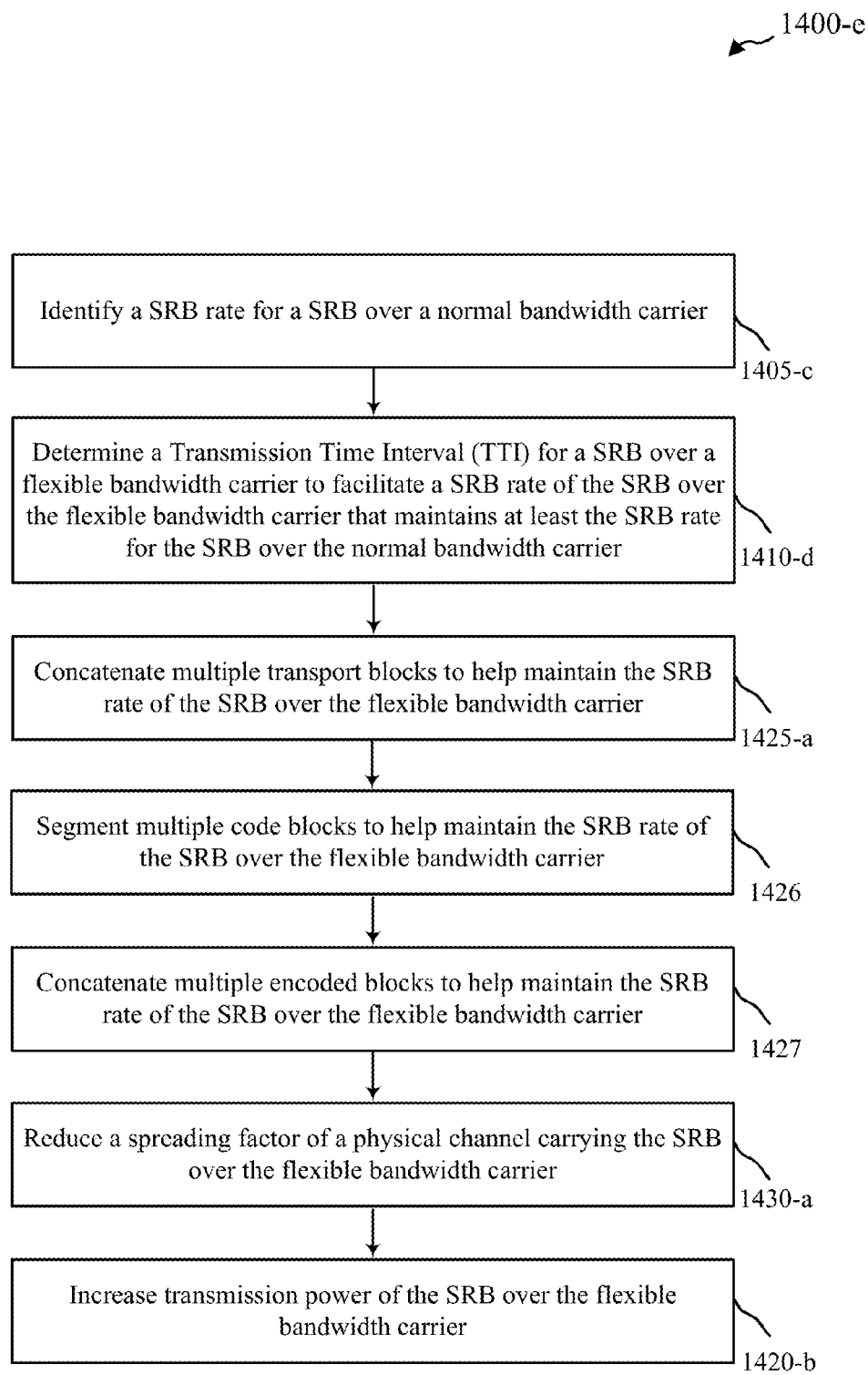
FIG. 14E shows a flow diagram of a method of supporting SRB rates in wireless communications systems in accordance with various embodiments.

Turning to FIG. 14E, a flow diagram of a method 1400-e for support a SRB over a flexible bandwidth carrier for wireless communications systems in accordance with various embodiments. Method 1400-e may be implemented utilizing various wireless communications devices including, but not limited to: a base station 105 as seen in FIG. 1, FIG. 2, FIG. 3, FIG. 11, FIG. 11 and/or FIG. 13; a device 400 as seen in FIG. 4; and/or a UE 115 as seen in FIG. 1, FIG. 2, FIG. 3, FIG. 11, FIG. 12, and/or FIG. 13. Method 1400-e may be an example of aspects of method 1400-a of FIG. 14A.

At block 1405-c, a SRB rate for a SRB over a normal bandwidth carrier may be identified. At block 1410-d, a TTI for a SRB over the flexible bandwidth carrier may be determined that facilitates a SRB rate of the SRB over the flexible bandwidth carrier that maintains at least the SRB rate for the SRB over the normal bandwidth carrier. At block 1425-a, multiple transport blocks may be concatenated to help maintain the SRB rate of the SRB over the flexible bandwidth carrier. The multiple concatenated transport blocks may include two or more transport blocks from a same logical channel. The multiple concatenated transport blocks may include at least two transport blocks from different logical channels. At block 1426, multiple code blocks may be segmented to help maintain the SRB rate of the SRB over the flexible bandwidth carrier. At 1427, multiple encoded blocks may be concatenated to help maintain the SRB rate of the SRB over the flexible bandwidth carrier. At block 1430-a, a spreading factor for a physical channel for the SRB over the flexible bandwidth carrier may be reduced. At block 1420-a, a transmission power of the SRB over the flexible bandwidth carrier may be increased.

Some embodiments of the above methods 1400-a, 1400-b, 1400-c, 1400-d, and/or 1400-e achieve same SRB rate as over normal bandwidth carrier and may utilize SF reduction by Dcr and transmission power increase accordingly. Some other embodiments achieve scaled SRB rate (e.g. SRB rate over normal BW carrier divided by a scaling factor). SF reduction by Dcr or scaling factor and transmission power accordingly may be utilized. These tools and techniques may be implemented both on the mobile side and network side.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for supporting signaling over a flexible bandwidth carrier, the method comprising:
    identifying a signaling rate for signaling over a normal bandwidth carrier;
    determining a unit of time for signaling over the flexible bandwidth carrier to facilitate a signaling rate for the signaling over the flexible bandwidth carrier that maintains at least the signaling rate for the signaling over the normal bandwidth carrier or a fraction of the signaling rate for the signaling over the normal bandwidth carrier; and
    utilizing the determined unit of time for the signaling over the flexible bandwidth carrier.

2. The method of claim 1, wherein the signaling over the normal bandwidth carrier comprises a signaling radio bearer (SRB) over the normal bandwidth carrier, the signaling over the flexible bandwidth carrier comprises an SRB over the flexible bandwidth carrier, the signaling rate for the signaling over the normal bandwidth carrier comprises an SRB rate for the SRB over the normal bandwidth carrier, and the signaling rate for the signaling over the flexible bandwidth carrier comprises an SRB rate for the SRB over the flexible bandwidth carrier.

3. The method of claim 2, wherein the unit of time comprises a Transmission Time Interval (TTI).

4. The method of claim 3, wherein determining the TTI for the SRB over the flexible bandwidth carrier to facilitate the SRB rate for the SRB over the flexible bandwidth carrier that maintains at least the SRB rate for the SRB over the normal bandwidth carrier or a fraction of the signaling rate for the SRB over the normal bandwidth carrier comprises:
    identifying at least a bandwidth scaling factor for the flexible bandwidth carrier; and
    utilizing at least the bandwidth scaling factor to determine the TTI for the SRB over the flexible bandwidth carrier.

5. The method of claim 3, wherein determining the TTI for the SRB over the flexible bandwidth carrier to facilitate the SRB rate for the SRB over the flexible bandwidth carrier that maintains at least the SRB rate for the SRB over the normal bandwidth carrier or a fraction of the signaling rate for the SRB over the normal bandwidth carrier comprises:
    identifying a TTI for the SRB over for the normal bandwidth carrier; and
    utilizing at least a bandwidth scaling factor associated with the flexible bandwidth carrier to determine the TTI for the SRB over the flexible bandwidth carrier based on the TTI for the SRB over the normal bandwidth carrier.

6. The method of claim 3, further comprising:
    reducing a spreading factor of a physical channel carrying the SRB over the flexible bandwidth carrier.

7. The method of claim 6, wherein reducing the spreading factor of the physical channel carrying the SRB over the flexible bandwidth carrier comprises:

dividing a normal spreading factor by a bandwidth scaling factor for the flexible bandwidth carrier, wherein the normal spreading factor comprises a spreading factor of the physical channel carrying the SRB over the normal bandwidth carrier.

8. The method of claim 6, further comprising:
increasing a transmission power for the SRB over the flexible bandwidth carrier with respect to a normal bandwidth carrier system with a same power spectrum density.

9. The method of claim 8, wherein increasing the transmission power compensates for at least the reduced spreading factor.

10. The method of claim 4, wherein the bandwidth scaling factor for the flexible bandwidth carrier equals a chip rate divider for the flexible bandwidth carrier.

11. The method of claim 3, wherein the determined TTI is a valid TTI with respect to a normal bandwidth carrier system.

12. The method of claim 3, further comprising:
concatenating a plurality of transport blocks to facilitate maintaining the SRB rate for the SRB over the flexible bandwidth carrier.

13. The method of claim 12, wherein the plurality of concatenated transport blocks includes two or more transport blocks from a same logical channel.

14. The method of claim 12, wherein the plurality of concatenated transport blocks includes at least two transport blocks from different logical channels.

15. The method of claim 1, wherein the fraction of the signaling rate for the signaling over the normal bandwidth carrier exceeds a dilated rate based on a bandwidth scaling factor or chip rate divider for the flexible bandwidth carrier.

16. A wireless communications system, the system comprising:
means for identifying a signaling rate for signaling over a normal bandwidth carrier;
means for determining a unit of time for signaling over a flexible bandwidth carrier to facilitate a signaling rate for the signaling over the flexible bandwidth carrier that maintains at least the signaling rate for the signaling over the normal bandwidth carrier or a fraction of the signaling rate for the signaling over the normal bandwidth carrier; and
means for utilizing the determined unit of time for the signaling over the flexible bandwidth carrier.

17. The wireless communications system of claim 16, wherein the signaling over the normal bandwidth carrier comprises a signaling radio bearer (SRB) over the normal bandwidth carrier, the signaling over the flexible bandwidth carrier comprises an SRB over the flexible bandwidth carrier, the signaling rate for the signaling over the normal bandwidth carrier comprises an SRB rate for the SRB over the normal bandwidth carrier, and the signaling rate for the signaling over the flexible bandwidth carrier comprises an SRB rate for the SRB over the flexible bandwidth carrier.

18. The wireless communications system of claim 17, wherein the unit of time comprises a Transmission Time Interval (TTI).

19. The wireless communications system of claim 18, wherein the means for determining the TTI for the SRB over the flexible bandwidth carrier to facilitate the SRB rate of the SRB over the flexible bandwidth carrier that maintains at least the SRB rate for the SRB over the normal bandwidth carrier or a fraction of the signaling rate for the SRB over the normal bandwidth carrier comprises:
means for identifying at least a bandwidth scaling factor for the flexible bandwidth carrier; and
means for utilizing at least the bandwidth scaling factor to determine the TTI for the SRB over the flexible bandwidth carrier.

20. The wireless communications system of claim 18, wherein the means for determining the TTI for the SRB over the flexible bandwidth carrier to facilitate the SRB rate of the SRB over the flexible bandwidth carrier that maintains at least the SRB rate for the SRB over the normal bandwidth carrier or a fraction of the signaling rate for the SRB over the normal bandwidth carrier comprises:
means for identifying a TTI for the SRB over for the normal bandwidth carrier; and
means for utilizing at least a bandwidth scaling factor associated with the flexible bandwidth carrier to determine the TTI for the SRB over the flexible bandwidth carrier based on the TTI for the SRB over the normal bandwidth carrier.

21. The wireless communications system of claim 18, further comprising:
means for reducing a spreading factor of a physical channel carrying the SRB over the flexible bandwidth carrier.

22. The wireless communications system of claim 21, wherein the means for reducing the spreading factor of the physical channel carrying the SRB over the flexible bandwidth carrier comprises:
means for dividing a normal spreading factor by a bandwidth scaling factor for the flexible bandwidth carrier, wherein the normal spreading factor comprises a spreading factor of the physical channel carrying the SRB over the normal bandwidth carrier.

23. The wireless communications system of claim 21, further comprising:
means for increasing a transmission power for the SRB over the flexible bandwidth carrier with respect to a normal bandwidth carrier system with a same power spectrum density.

24. The wireless communications system of claim 23, wherein the means for increasing the transmission power compensates for at least the reduced spreading factor.

25. The wireless communications system of claim 19, wherein the bandwidth scaling factor for the flexible bandwidth carrier equals a chip rate divider for the flexible bandwidth carrier.

26. The wireless communications system of claim 18, wherein the determined TTI is a valid TTI with respect to a normal bandwidth carrier system.

27. The wireless communications system of claim 18, further comprising:
means for concatenating a plurality of transport blocks to facilitate maintaining the SRB rate for the SRB over the flexible bandwidth carrier.

28. The wireless communications system of claim 27, wherein the plurality of concatenated transport blocks includes two or more transport blocks from a same logical channel.

29. The wireless communications system of claim 27, wherein the plurality of concatenated transport blocks includes at least two transport blocks from different logical channels.

30. The wireless communications system of claim 16, wherein the fraction of the signaling rate for the signaling over the normal bandwidth carrier exceeds a dilated rate based on a bandwidth scaling factor or chip rate divider for the flexible bandwidth carrier.

31. A computer program product for wireless communications systems comprising:
a non-transitory computer-readable medium comprising:
code for identifying a signaling rate for signaling over a normal bandwidth carrier;

code for determining a unit of time for signaling over a flexible bandwidth carrier to facilitate a signaling rate for the signaling over the flexible bandwidth carrier that maintains at least the signaling rate for the signaling over the normal bandwidth carrier or a fraction of the signaling rate for the signaling over the normal bandwidth carrier; and code for utilizing the determined unit of time for the signaling over the flexible bandwidth carrier.

32. The computer program product of claim 31, wherein the signaling over the normal bandwidth carrier comprises a signaling radio bearer (SRB) over the normal bandwidth carrier, the signaling over the flexible bandwidth carrier comprises an SRB over the flexible bandwidth carrier, the signaling rate for the signaling over the normal bandwidth carrier comprises an SRB rate for the SRB over the normal bandwidth carrier, and the signaling rate for the signaling over the flexible bandwidth carrier comprises an SRB rate for the SRB over the flexible bandwidth carrier.

33. The computer program product of claim 32, wherein the unit of time is a Transmission Time Interval (TTI).

34. The computer program product of claim 33, wherein the code for determining the TTI for the SRB over the flexible bandwidth carrier to facilitate the SRB rate of the SRB over the flexible bandwidth carrier that maintains at least the SRB rate for the SRB over the normal bandwidth carrier or a fraction of the signaling rate for the SRB over the normal bandwidth carrier comprises:

code for identifying at least a bandwidth scaling factor for the flexible bandwidth carrier; and code for utilizing at least the bandwidth scaling factor to determine the TTI for the SRB over the flexible bandwidth carrier.

35. The computer program product of claim 33, wherein the code for determining the TTI for the SRB over the flexible bandwidth carrier to facilitate the SRB rate of the SRB over the flexible bandwidth carrier that maintains at least the SRB rate for the SRB over the normal bandwidth carrier or a fraction of the signaling rate for the SRB over the normal bandwidth carrier comprises:

code for identifying a TTI for the SRB over for the normal bandwidth carrier; and code for utilizing at least a bandwidth scaling factor associated with the flexible bandwidth carrier to determine the TTI for the SRB over the flexible bandwidth carrier based on the TTI for the SRB over the normal bandwidth carrier.

36. The computer program product of claim 33, wherein the non-transitory computer-readable medium further comprising:

code for reducing a spreading factor of a physical channel carrying the SRB over the flexible bandwidth carrier.

37. The computer program product of claim 36, wherein the code for reducing the spreading factor of the physical channel carrying the SRB over the flexible bandwidth carrier comprises:

code for dividing a normal spreading factor by a bandwidth scaling factor for the flexible bandwidth carrier, wherein the normal spreading factor comprises a spreading factor of the physical channel carrying the SRB over the normal bandwidth carrier.

38. The computer program product of claim 37, wherein the non-transitory computer-readable medium further comprising:

code for increasing a transmission power for the SRB over the flexible bandwidth carrier with respect to a normal bandwidth carrier system with a same power spectrum density.

39. The computer program product of claim 38, wherein increasing the transmission power compensates for at least the reduced spreading factor.

40. The computer program product of claim 34, wherein the bandwidth scaling factor for the flexible bandwidth carrier equals a chip rate divider for the flexible bandwidth carrier.

41. The computer program product of claim 33, wherein the determined TTI is a valid TTI with respect to a normal bandwidth carrier system.

42. The computer program product of claim 33, wherein the non-transitory computer-readable medium further comprising:

code for concatenating a plurality of transport blocks to facilitate maintaining the SRB rate for the SRB over the flexible bandwidth carrier.

43. The computer program product of claim 42, wherein the plurality of concatenated transport blocks includes two or more transport blocks from a same logical channel.

44. The computer program product of claim 42, wherein the plurality of concatenated transport blocks includes at least two transport blocks from different logical channels.

45. The computer program product of claim 31, wherein the fraction of the signaling rate for the signaling over the normal bandwidth carrier exceeds a dilated rate based on a bandwidth scaling factor or chip rate divider for the flexible bandwidth carrier.

46. A wireless communications device comprising:

at least one processor configured to:

identify a signaling rate for signaling over a normal bandwidth carrier;

determine a unit of time for signaling over a flexible bandwidth carrier to facilitate a signaling rate for the signaling over the flexible bandwidth carrier that maintains at least the signaling rate for the signaling over the normal bandwidth carrier or a fraction of the signaling rate for the signaling over the normal bandwidth carrier; and utilize the determined unit of time for the signaling over the flexible bandwidth carrier; and at least one memory coupled with the at least one processor.

47. The wireless communications device of claim 46, wherein the signaling over the normal bandwidth carrier comprises a signaling radio bearer (SRB) over the normal bandwidth carrier, the signaling over the flexible bandwidth carrier comprises an SRB over the flexible bandwidth carrier, the signaling rate for the signaling over the normal bandwidth carrier comprises an SRB rate for the SRB over the normal bandwidth carrier, and the signaling rate for the signaling over the flexible bandwidth carrier comprises an SRB rate for the SRB over the flexible bandwidth carrier.

48. The wireless communications device of claim 47, wherein the unit of time is a Transmission Time Interval (TTI).

49. The wireless communications device of claim 48, wherein the at least one processor configured to determine the TTI for the SRB over the flexible bandwidth carrier to facilitate the SRB rate of the SRB over the flexible bandwidth carrier that maintains at least the SRB rate for the SRB over the normal bandwidth carrier or a fraction of the signaling rate for the SRB over the normal bandwidth carrier is configured to:

identify at least a bandwidth scaling factor for the flexible bandwidth carrier; and utilize at least the bandwidth scaling factor to determine the TTI for the SRB over the flexible bandwidth carrier.

50. The wireless communications device of claim 48, wherein the at least one processor configured to determine the TTI for the SRB over the flexible bandwidth carrier to facilitate the SRB rate of the SRB over the flexible bandwidth carrier that maintains at least the SRB rate for the SRB over the normal bandwidth carrier or a fraction of the signaling rate for the SRB over the normal bandwidth carrier is configured:
- identify a TTI for the SRB over for the normal bandwidth carrier; and
- utilize at least a bandwidth scaling factor associated with the flexible bandwidth carrier to determine the TTI for the SRB over the flexible bandwidth carrier based on the TTI for the SRB over the normal bandwidth carrier.

51. The wireless communications device of claim 48, wherein the at least one processor is further configured to:
- reduce a spreading factor of a physical channel carrying the SRB over the flexible bandwidth carrier.

52. The wireless communications device of claim 51, wherein the at least one processor configured to reduce the spreading factor of the physical channel carrying the SRB over the flexible bandwidth carrier is configured to:
- divide a normal spreading factor by a bandwidth scaling factor for the flexible bandwidth carrier, wherein the normal spreading factor comprises a spreading factor of the physical channel carrying the SRB over the normal bandwidth carrier.

53. The wireless communications device of claim 52, wherein the at least one processor is further configured to:
- increase a transmission power for the SRB over the flexible bandwidth carrier with respect to a normal bandwidth carrier system with a same power spectrum density.

54. The wireless communications device of claim 53, wherein the at least one processor configured to increase the transmission power compensates for at least the reduced spreading factor.

55. The wireless communications device of claim 49, wherein the bandwidth scaling factor for the flexible bandwidth carrier equals a chip rate divider for the flexible bandwidth carrier.

56. The wireless communications device of claim 48, wherein the determined TTI is a valid TTI with respect to a normal bandwidth carrier system.

57. The wireless communications device of claim 48, wherein the at least one processor is further configured to:
- concatenate a plurality of transport blocks to facilitate maintaining the SRB rate for the SRB over the flexible bandwidth carrier.

58. The wireless communications device of claim 57, wherein the plurality of concatenated transport blocks includes two or more transport blocks from a same logical channel.

59. The wireless communications device of claim 57, wherein the plurality of concatenated transport blocks includes at least two transport blocks from different logical channels.

60. The wireless communications device of claim 46, wherein the fraction of the signaling rate for the signaling over the normal bandwidth carrier exceeds a dilated rate based on a bandwidth scaling factor or chip rate divider for the flexible bandwidth carrier.

* * * * *